(12) United States Patent
Deyle et al.

(10) Patent No.: US 11,460,849 B2
(45) Date of Patent: Oct. 4, 2022

(54) AUTOMATED ROUTE SELECTION BY A MOBILE ROBOT

(71) Applicant: Cobalt Robotics Inc., Palo Alto, CA (US)

(72) Inventors: Travis J. Deyle, San Jose, CA (US); Erik Schluntz, Mountain View, CA (US); Peregrine Badger, San Mateo, CA (US); Sarvagya Vaish, Albany, CA (US); Michael J. O'Kelly, Mountain View, CA (US)

(73) Assignee: COBALT ROBOTICS INC., San Mateo, CA (US)

( * ) Notice: Subject to any disclaimer, the term of this patent is extended or adjusted under 35 U.S.C. 154(b) by 253 days.

(21) Appl. No.: 16/059,036

(22) Filed: Aug. 9, 2018

(65) Prior Publication Data
US 2020/0050206 A1 Feb. 13, 2020

(51) Int. Cl.
*G05D 1/02* (2020.01)
*G05D 1/00* (2006.01)
(Continued)

(52) U.S. Cl.
CPC ....... *G05D 1/0219* (2013.01); *G01C 21/3453* (2013.01); *G05D 1/0088* (2013.01); *H04N 7/185* (2013.01); *G05D 2201/0209* (2013.01)

(58) Field of Classification Search
CPC .. G05D 1/0214; G05D 1/0217; G05D 1/0219; G05D 1/0221; G05D 2201/0209; B25J 9/1679; B25J 9/1674
See application file for complete search history.

(56) References Cited

U.S. PATENT DOCUMENTS

| 3,088,157 A | 5/1963 | Aguilar |
| 5,202,661 A * | 4/1993 | Everett, Jr. ......... G08B 29/188 340/565 |

(Continued)

FOREIGN PATENT DOCUMENTS

| CN | 1593859 A | 3/2005 |
| CN | 102253673 A | 11/2011 |

(Continued)

OTHER PUBLICATIONS

Jain, A. et al., "Behaviors for Robust Door Opening and Doorway Traversal with a Force-Sensing Mobile Manipulator," Robotics: Science & Systems 2008 Manipulation Workshop—Intelligence in Human Environments, Jun. 28, 2008, 6 pages.

(Continued)

*Primary Examiner* — Jeff A Burke
*Assistant Examiner* — Joshua Alexander Garza
(74) *Attorney, Agent, or Firm* — Fenwick & West LLP

(57) ABSTRACT

A mobile robot is configured for operation in a commercial or industrial setting, such as an office building or retail store. The robot can patrol one or more routes within a building, and can detect violations of security policies by objects, building infrastructure and security systems, or individuals. In response to the detected violations, the robot can perform one or more security operations. The robot can include a removable fabric panel, enabling sensors within the robot body to capture signals that propagate through the fabric. In addition, the robot can scan RFID tags of objects within an area, for instance coupled to store inventory. Likewise, the robot can generate or update one or more semantic maps for use by the robot in navigating an area and for measuring compliance with security policies.

18 Claims, 36 Drawing Sheets

Mobile robot
100

(51) Int. Cl.
*G01C 21/34* (2006.01)
*H04N 7/18* (2006.01)

(56) References Cited

U.S. PATENT DOCUMENTS

| | | | |
|---|---|---|---|
| 8,009,013 B1 | 8/2011 | Hirschfeld et al. | |
| 8,111,156 B2* | 2/2012 | Song | G08B 25/009 |
| | | | 340/541 |
| 8,255,092 B2 | 8/2012 | Phillips et al. | |
| 8,428,777 B1 | 4/2013 | Poursohi et al. | |
| 9,031,697 B2 | 5/2015 | Huang et al. | |
| 9,069,356 B2 | 6/2015 | Papaefstathiou et al. | |
| 9,216,509 B2 | 12/2015 | Renkis | |
| 9,307,568 B2* | 4/2016 | Gassend | H04W 36/14 |
| 9,323,250 B2 | 4/2016 | Wang et al. | |
| 9,329,597 B2 | 5/2016 | Stoschek et al. | |
| 9,393,686 B1 | 7/2016 | Bradski et al. | |
| 9,436,926 B2 | 9/2016 | Cousins et al. | |
| 9,535,421 B1 | 1/2017 | Canoso et al. | |
| 9,643,722 B1 | 5/2017 | Myslinski | |
| 9,781,575 B1* | 10/2017 | Wan | H04L 67/303 |
| 9,792,434 B1* | 10/2017 | Li | G06F 21/577 |
| 9,830,798 B2 | 11/2017 | Poursohi et al. | |
| 9,844,879 B1 | 12/2017 | Cousins et al. | |
| 9,939,814 B1 | 4/2018 | Bauer et al. | |
| 9,987,745 B1 | 6/2018 | Berard et al. | |
| 10,012,996 B1 | 7/2018 | Canoso et al. | |
| 10,124,491 B2* | 11/2018 | Erhart | B25J 9/1697 |
| 10,252,419 B2 | 4/2019 | Fritz et al. | |
| 10,306,403 B2* | 5/2019 | Meganathan | G08B 13/19682 |
| 10,325,461 B1* | 6/2019 | Roberts | H04W 4/02 |
| 2001/0037163 A1 | 11/2001 | Allard | |
| 2003/0025599 A1 | 2/2003 | Monroe | |
| 2005/0200487 A1 | 9/2005 | O'Donnell et al. | |
| 2005/0216126 A1 | 9/2005 | Koselka et al. | |
| 2006/0112034 A1 | 5/2006 | Okamoto et al. | |
| 2007/0192910 A1 | 8/2007 | Vu et al. | |
| 2008/0302200 A1 | 12/2008 | Tobey | |
| 2010/0139995 A1 | 6/2010 | Rudakevych | |
| 2010/0268383 A1 | 10/2010 | Wang et al. | |
| 2011/0035054 A1 | 2/2011 | Gal et al. | |
| 2011/0148633 A1 | 6/2011 | Kohlenberg et al. | |
| 2012/0083923 A1 | 4/2012 | Matsumoto et al. | |
| 2012/0197464 A1* | 8/2012 | Wang | B25J 9/1689 |
| | | | 701/2 |
| 2012/0215383 A1 | 8/2012 | Yoon et al. | |
| 2012/0313779 A1 | 12/2012 | Papaefstathiou et al. | |
| 2013/0014219 A1 | 1/2013 | Kraus et al. | |
| 2013/0034295 A1 | 2/2013 | Tsuchinaga et al. | |
| 2013/0215266 A1 | 8/2013 | Trundle et al. | |
| 2013/0270017 A1 | 10/2013 | Wolf et al. | |
| 2013/0324166 A1* | 12/2013 | Mian | H04W 4/029 |
| | | | 455/457 |
| 2014/0207282 A1 | 7/2014 | Angle et al. | |
| 2014/0266669 A1 | 9/2014 | Fadell et al. | |
| 2014/0366676 A1 | 12/2014 | Kim et al. | |
| 2015/0170509 A1 | 6/2015 | Artes et al. | |
| 2015/0205297 A1 | 7/2015 | Stevens et al. | |
| 2015/0205298 A1* | 7/2015 | Stoschek | B60L 50/60 |
| | | | 701/23 |
| 2015/0242806 A1 | 8/2015 | Cousins et al. | |
| 2015/0290808 A1* | 10/2015 | Renkis | H04L 67/125 |
| | | | 700/257 |
| 2015/0314449 A1 | 11/2015 | Wang et al. | |
| 2015/0379358 A1 | 12/2015 | Renkis | |
| 2016/0075027 A1 | 3/2016 | Renkis | |
| 2016/0129592 A1 | 5/2016 | Saboo et al. | |
| 2016/0188977 A1* | 6/2016 | Kearns | G05D 1/0274 |
| | | | 348/113 |
| 2016/0334802 A1 | 11/2016 | Sogen | |
| 2016/0339587 A1 | 11/2016 | Rublee | |
| 2016/0358432 A1* | 12/2016 | Branscomb | G08B 13/19621 |
| 2017/0136631 A1 | 5/2017 | Li et al. | |
| 2017/0201617 A1 | 7/2017 | So et al. | |
| 2017/0255840 A1 | 9/2017 | Jean et al. | |
| 2017/0364074 A1 | 12/2017 | Lau et al. | |
| 2018/0103579 A1 | 4/2018 | Grufman et al. | |
| 2018/0137119 A1 | 5/2018 | Li et al. | |
| 2018/0165931 A1 | 6/2018 | Zhang | |
| 2018/0311820 A1 | 11/2018 | Fritz et al. | |
| 2019/0129444 A1* | 5/2019 | Wirth | G05D 1/0274 |
| 2019/0187703 A1* | 6/2019 | Millard | G05D 1/0246 |
| 2019/0329413 A1 | 10/2019 | Johnson et al. | |
| 2020/0056900 A1* | 2/2020 | Lee | G08G 5/0069 |
| 2020/0150655 A1* | 5/2020 | Artes | G05D 1/0219 |

FOREIGN PATENT DOCUMENTS

| | | |
|---|---|---|
| CN | 103294061 A | 9/2013 |
| CN | 207191210 | 4/2018 |
| FR | 2987689 A1 | 9/2013 |
| JP | 2001-038664 A | 2/2001 |
| KR | 2015-0033443 A | 4/2015 |
| WO | WO 2003/001467 A1 | 1/2003 |
| WO | WO 2015/025249 A2 | 2/2015 |
| WO | WO-2017/139443 A9 | 8/2017 |

OTHER PUBLICATIONS

PCT Invitation to Pay Additional Fees, PCT Application No. PCT/US19/44098, dated Oct. 10, 2019, 2 pages.

PCT International Search Report and Written Opinion, PCT Application No. PCT/US/19/44098, dated Dec. 3, 2019, 19 pages.

United States Office Action, U.S. Appl. No. 15/426,048, filed May 30, 2018, 14 pages.

United States Office Action, U.S. Appl. No. 15/426,048, filed Dec. 5, 2018, 16 pages.

United States Office Action, U.S. Appl. No. 15/426,048, filed Apr. 1, 2019, 17 pages.

United States Office Action, U.S. Appl. No. 16/391,308, filed Nov. 29, 2019, 28 pages.

United States Office Action, U.S. Appl. No. 16/391,306, filed Dec. 12, 2019, 26 pages.

United States Office Action, U.S. Appl. No. 16/059,035, filed Aug. 19, 2020, 21 pages.

United States Office Action, U.S. Appl. No. 16/391,305, filed Aug. 25, 2020, 19 pages.

* cited by examiner ns, and a location of the robot. Likewise, the semantic map can be provided to a central system for use by or display to a user of the central system.
AUTOMATED ROUTE SELECTION BY A MOBILE ROBOT

CROSS-REFERENCE TO RELATED APPLICATIONS

This application is related to U.S. application Ser. No. 15/426,048, Ser. No. 15/426,050, Ser. No. 15/426,052, and Ser. No. 15/426,054, each filed Feb. 6, 2017, the contents of which are incorporated by reference herein in their entirety.

BACKGROUND

This application relates generally to robots, and in particular to robots configured for operation in commercial and industrial settings.

Robots are increasingly prevalent in society, particularly in entertainment and manufacturing contexts. However, the adoption of robots in these contexts has outpaced settings where frequent robot/human interactions are required. Examples of such settings include retail environments, security environments, and the like. The abilities of robots, for instance, the ability to communicate with building and object infrastructure, creates an unaddressed demand for the implementation of robots in commercial and industrial settings.

SUMMARY

A mobile robot ("robot" hereinafter) configured for operation in commercial and industrial settings is described herein. The robot can perform a number of functions and operations in a variety of categories, including but not limited to security operations, infrastructure or maintenance operations, navigation or mapping operations, inventory management operations, and robot/human interaction operations.

In some embodiments, the robot can primarily function as a security-oriented system. The robot can patrol routes within a building (such as a workplace, store, or warehouse), and can identify suspicious activity or individuals, detect violations of security policies, and detect security anomalies. For instance, the robot can identify unauthorized individuals within a restricted area, or can identify individuals perform an unauthorized action. Likewise, the robot can identify a building object or system indicative of a potential security risk, such as an unlocked door or open window. The robot can coordinate with a central system of the building, with building infrastructure and security systems, with other robots, and with individuals (such as security personnel and a robot operator).

In response to detecting a potential security risk or a security policy violation, the robot can perform one or more security operations. For instance, the robot can attempt to obstruct an individual attempting to access an off-limits portion of a building, can monitor or follow the individual, can record video of the individual, and can inform security personnel of the individual. Likewise, the robot can perform a corrective security operation, for instance by locking a door left unlocked or by relocating secure materials left in an unauthorized location. In some embodiments, the robot can couple with a building infrastructure system or security system to perform a security operation. For instance, the robot can instruct one or more security cameras associated with a location of a security anomaly to record video, or can instruct smart doors within a proximity of a suspicious individual to lock, preventing the individual from leaving the area.

The robot can provide information to a central system of a building, for instance information identifying a location of the robot, a field of view of the robot, video captured by the robot, locations of individuals and objects detected by the robot, and the like. The central system can display the information received from the robot in an interface in conjunction with information received from other robots, infrastructure systems, and security systems. In some embodiments, the central system displays a map identifying a location of the robot, a location of other infrastructure and security systems, and a location of all detected individuals and objects. The central system can further display information associated with detected security violations, information describing a robot state, functions available to a user of the central system to perform, and a patrol route of the robot.

In some embodiments, the robot can generate or update a semantic map associated with a location and identifying one or more of: locations of objects, an identity of the objects, a state of the objects, and other characteristics of the objects. The semantic map can be generated by the robot by using a first set of sensors to identify obstacles and pathways within the location, and by using a second set of sensors to identify objects within the location, object locations, object states, and object characteristics. The semantic map can be used by the robot to perform various operations, such as security operations (for instance, identify an object as a potential security policy violation by determining if a detected object state varies from a previous detection of the object state), navigation operations, and the like. Likewise, the semantic map can be provided to a central system for use by or display to a user of the central system.

The robot may be equipped with RFID reader antennas configured to detected RFID tags within a location. For instance, the robot can navigate within a retail store, and can scan the store for RFID tags while navigating. In some embodiments, the robot can determine a location of detected RFID tags, for instance by detecting the RFID tags from a number of different locations, or by using an onboard direction of arrival antenna array. The robot can perform various functions based on the detected RFID tags, for instance updating a store inventory database to reflect the detected RFID tag or the location of the detected RFID tag, by providing the location of the object coupled to the detected RFID tag to a requesting customer, or by flagging the object coupled to the detected RFID tag to a store employee for relocation (for instance, in response to determining that the object is in a location other than the proper or historical location of the object).

The robot can include various hardware components configured to enable the performance of the security operations, infrastructure or maintenance operations, navigation or mapping operations, inventory management operations, robot/human interaction operations, and other operations described herein. The robot can include a navigation system and power source configured to enable the robot to move within a location. The robot can include various indicators or interaction mechanisms configured to communication information to or receive an input from a human. The robot can include various sensors, such as cameras, motion detectors, audio detectors, rangefinders, depth sensors, and the like to enable the robot to recognize and process the environment in which the robot operators. The robot can also include various transceiver components, such as a WiFi antenna, cellular or LTE antenna, RFID reader antennas, and the like.

The robot can further include a fabric housing coupled around a body of the robot. The fabric housing can be removable, and can enable sensors within the robot body to detect or capture signals that propagate through the fabric. The fabric can be a low-cost component relative to a hardened, plastic, or other solid exterior, beneficially enabling easy replacement of the fabric housing in the event of damage. Further, the fabric housing can enable the flow of air through the housing, beneficially aiding in the cooling of interior components of the robot.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1C:
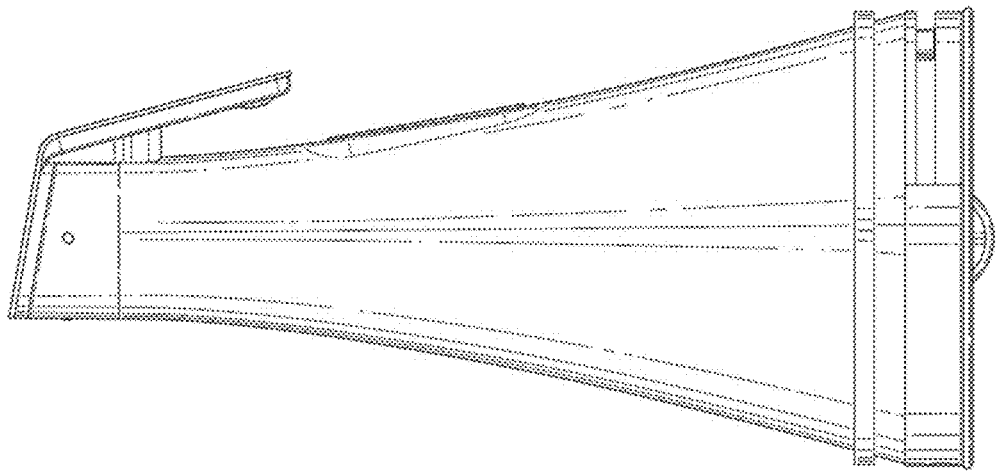
FIGS. 1A, 1B, and 1C illustrate various views of a mobile robot, according to one embodiment.
Figure 1B:
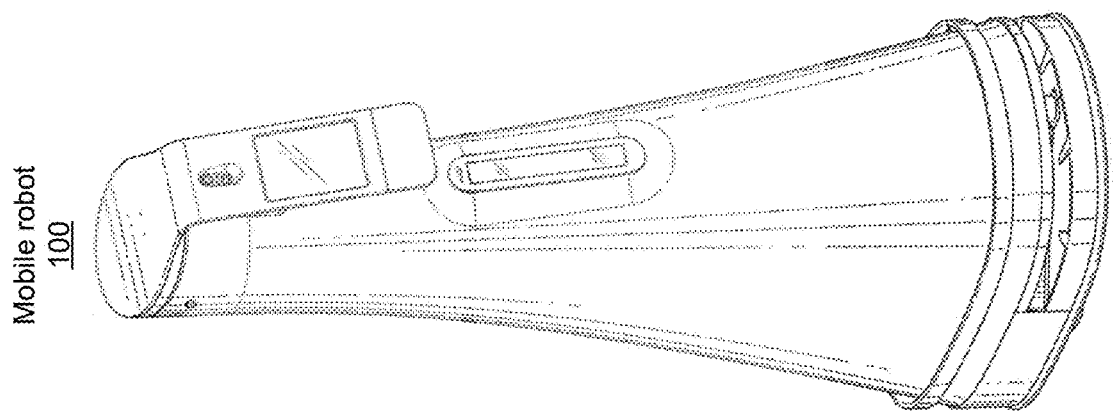
Figure 1A:
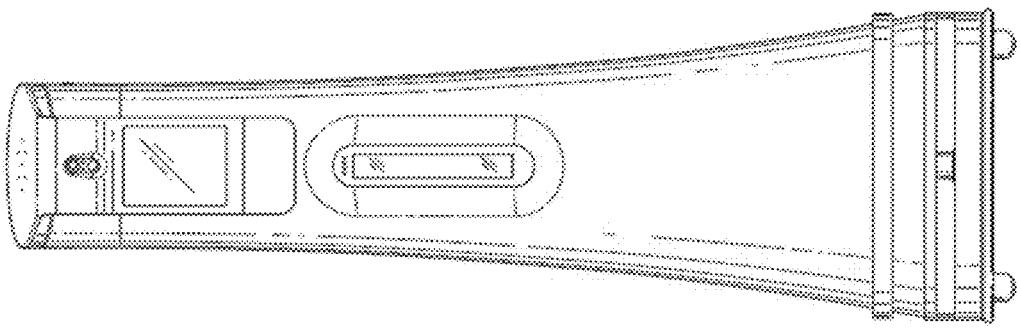

FIGS. 1A, 1B, and 1C illustrate various views of a mobile robot, according to one embodiment. The mobile robot 100 (or simply "robot" hereinafter) can navigate and move around an environment in which the robot is located, for instance by moving forward, backwards, sideways, and by turning or rotating up to 360 degrees within a plane defined by a surface on which the robot is located. In some embodiments, the robot can be deployed within a building, for instance on one or more floors or portions of floors of a building, can be deployed outside (for instance, in a parking lot), or can be deployed any other suitable location.

The robot 100 includes exterior fabric panels, as described below in greater detail. The fabric panels can be removably or fixedly coupled around a housing body of the robot. The robot also includes a plurality of sensors and other components enclosed within the housing body, described below in greater detail. A portion of the sensors can be located within the body of the robot, for instance behind or underneath the fabric panels such that the sensors can receive signals that propagate through the fabric panels. The structure, components, and functionality of the robot are described below in greater detail. It should be noted that in other embodiments, the robot can include different form factors, structures, components, and functionalities than those described herein.

Figure 2:
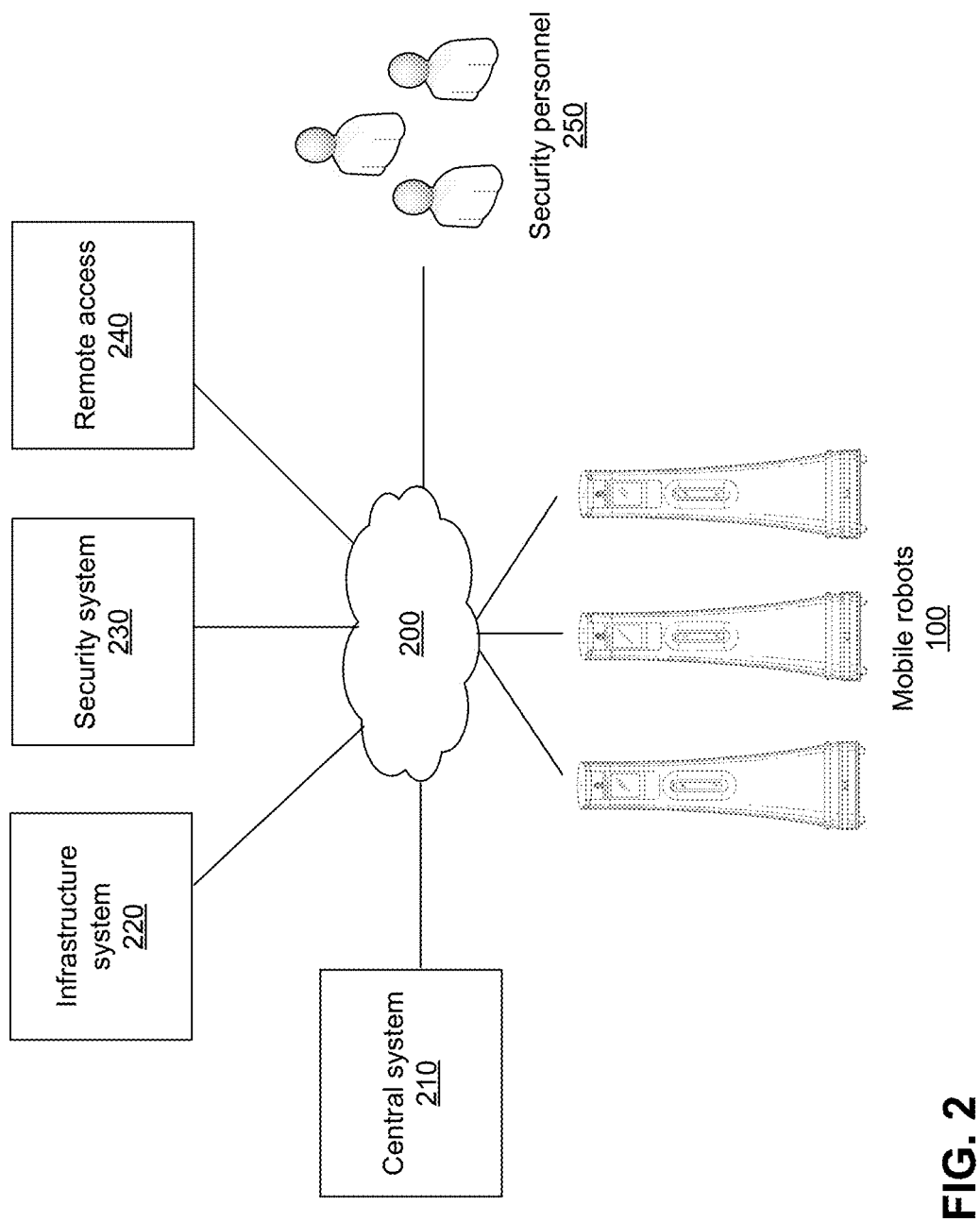
FIG. 2 is a high level block diagram illustrating a mobile robot environment, according to one embodiment.

FIG. 2 is a high level block diagram illustrating a mobile robot environment, according to one embodiment. The environment of FIG. 2 includes one or more robots 100, a central system 210, various infrastructure systems 220, various security systems 230, a remote access interface 240, and one or more security personnel 250, communicatively connected through the network 200. It should be noted that in other embodiments, the environment of FIG. 2 can include fewer, additional, or different components than those described herein. Each of the components of FIG. 2 can include one or more computer systems, custom hardware or electronic systems, or any other system configured to enable the components of FIG. 2 to perform the functions described herein.

The environment of FIG. 2 can include any number of robots 100, for instance 1, 2, 10, or more. For example, the environment of FIG. 2 can include one or more buildings, and can include one or more robots per building (for instance, one robot per building floor). One or more security personnel 250 (for instance, one or more robot operators) can control or monitor the robots, and can adjust a robot deployment as needed (for instance, by allocating additional robots to a building floor on which a security violation is detected). It should be noted that as used herein, "security personnel" can refer to remote or on-site robot operators, remote or on-site security system operators (e.g., individuals monitoring security cameras), on-site security guards, police personnel, building managers, or any other suitable individuals.

The central system 210 can be a central server or other computing system configured to provide instructions to the robots, to receive information from the robots, to access data corresponding to the robots or the other components of FIG. 2, to display the received information or accessed data (for instance, to a user of the central system), to perform one or more other functions as described herein, and to provide a communicative interface between, via the network 200, the robots and other components of FIG. 2. The central system is described in greater detail below.

The infrastructure system 220 (or infrastructure systems) can include one or more components of a building or environment in which the robots 100 are located. In some embodiments, the infrastructure systems are communicatively coupled to the network 200 or are otherwise capable of communication with the robots. Examples of system infrastructure systems include smart doors and windows, elevators, routers and other network components, power systems, smart lights, smart fire alarms and other sensors, connected furnace or air conditioning systems, "Internet of things" or IoT systems, and the like. In some embodiments, the infrastructure systems aren't capable of communication with via the network 200 or otherwise, for instance disconnected doors and windows, disconnected elevators, thermal vents, and the like. The infrastructure systems of FIG. 2 are described in greater detail below.

The security system 230 (or security systems) can also include one or more security components of a building or environment in which the robots 100 are located. Examples of security systems can include camera systems, access gates, door or window locks, audio detectors, motion detectors, security interfaces or displays, and the like. The security systems can be configured to communicate with the network 200 and/or robots, or may be disconnected systems (alarms that do not communicate and that must be manually reset). The security systems of FIG. 2 are described in greater detail below.

The remote access interface 240 is a computing system, such as a computer, a server, a phone or other mobile device, or any other system that enables a use to remotely access the network 200, and via the network, to interact with one or more other components of the environment of FIG. 2. For instance, a user can remotely access information via the remote access interface provided by the robots 100 to the central system 210, such as a video feed captured by one or more robots. Likewise, a user can remotely provide instructions to the infrastructure systems 220, security systems 230, and/or the robots via the remote access interface, for instance to investigate an unauthorized access of a portion of a building, to lock doors within the vicinity of an alarm, or to scan RFID tags for products within a portion of a store. The remote access interface can include a display for displaying information related to one or more components of FIG. 2, an input mechanism for receiving interactions from a user of the remote access interface, and a communicate interface enabling the remote access interface to communicate via the network 200. It should be noted that in some embodiments, the remote access interface can be implemented within hardware located remotely from the central system, the robots, or the other components of FIG. 2, for instance within a different building or on a different floor from the other components of FIG. 2.

The security personnel 250 can include guards located at guard stations, patrolling guards, access gate guards, or remote security personnel. For instance, the security personnel can include one or more robot operators configured to monitor and control the actions or movements of the robots 100. Robot operators can interact with robots via the central system 210 or via the remote access interface 240, and also direct other security personnel as needed (for instance, by instructing security personnel to investigation a security violation detected by the robots).

The network 200 may be the Internet, a local area network (such as a building-wide or site-wide network), a wireless network, a mesh network, or any other network or combination thereof that allows communication between the components of FIG. 2. The connecting network 200 may use standard communications technologies and/or protocols, such as WiFi, Bluetooth, LTE, cellular networks, and the like.

Figure 3:
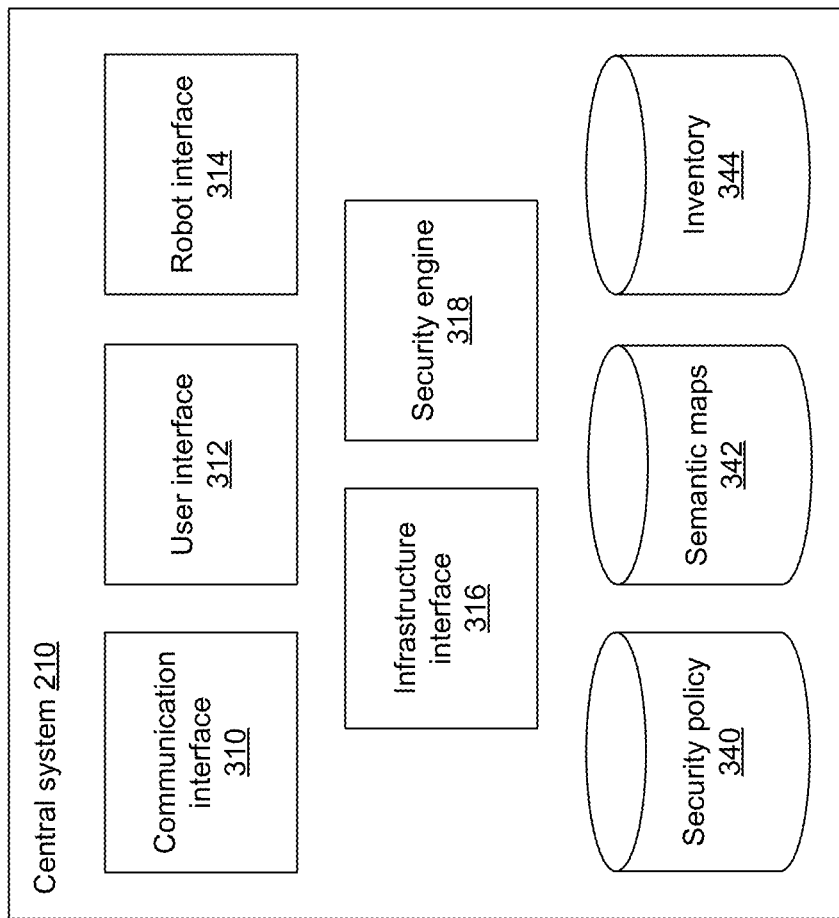
FIG. 3 is a block diagram of the central system of FIG. 2, according to one embodiment.

FIG. 3 is a block diagram of the central system of FIG. 2, according to one embodiment. The central system 210 of FIG. 2 includes a communication interface 310, a user interface 312, a robot interface 314, an infrastructure interface 316, a security engine 318, a security policy storage module 340, a semantic maps storage module 342, and an inventory storage module 344. In other embodiments, the central system includes fewer, additional, or different components than those described herein.

The communication interface 310 is configured to provide a communicative interface between the components of the central system 210 and the other components of FIG. 2. For instance, the communication interface enables the transfer of data between robots 100 and the central system. The communication interface can provide instructions or data to one or more infrastructure systems, security systems, or robots, for instance in response to a user command or during the performance of one or more security operations.

The user interface 312 is configured to enable a user of the central system 210 (such as a security personnel 250 or a robot operator) to interact with the central system. For instance, the user interface can include a graphical user interface (or GUI) displayed on hardware corresponding to the central system. The GUI can include video streams from one or more security cameras; can include a location of one or more robots 100 or objects overlaid on a map of a building, floor, or site; can include data corresponding to one or more infrastructure systems; and the like. The user interface can enable a user of the central system to provide one or more instructions or commands or otherwise interact with one or more components of the environment of FIG. 2, to configure or otherwise interact with one or more components of the central system, and to access and view data associated with one or more components of the environment of FIG. 2. The user interface, and GUIs associated with the user interface, are described below in greater detail.

The robot interface 314 is configured to enable the central system 210 (or a user of the central system) to interact with one or more robots 100. For instance, the robot interface can receive data from the one or more robots 100 via the communication interface 310 for display on the user interface 312. The robot interface can also provide data to the one or more robots via the communication interface, for instance in response to a command received from a user via the user interface. The robot interface can format data provided to and received from the robots into a format compliant with the robots and central system, respectively. The data received from, the instructions provided to, and the functions of the robots are described below in greater detail.

The infrastructure interface 316 is configured to enable the central system 210 (or a user of the central system) to interact with one or more infrastructure systems 220 via the communication interface 310. For instance, the infrastructure interface can lock one or more doors within a building, can cut power to a portion of a floor, and store received inventory information. Likewise, the security engine 318 is configured to enable the central system or a user of the central system to interact with one or more security systems 230 via the communication interface. For instance, the security engine can direct video cameras to a location within a building and receive footage from the cameras, can receive badge data from badge readers, and direct security personnel 250 to a building portion where motion was detected. The security engine can also implement one or more security policies or security operations, either independently from or at the direction of a user of the central system. Security policies and operations are described below in greater detail.

The security policy storage module 340 stores one or more security policies for implementation by the central system 210. A security policy can identify:
- portions of a building or floor, individuals who are authorized to access those portions, permitted times of access, and requisite security credentials
- times that particular doors, windows, and access gates are to be locked and unlocked
- routes or paths through buildings or floors for one or more robots 100 to patrol and corresponding times for patrol
- times of activation for security cameras, audio detectors, and motion detectors
- violations of security policies and the thresholds and conditions that trigger a security policy violation
- operations to be performed (by robots, security personnel 250, or infrastructure or security systems) in the event of a detected violation of a security policy
- communications and data from the components of FIG. 2 to be presented to a user of the central system The semantic maps storage module 342 can store one or more semantic maps, for instance semantic maps generated by robots 100. The user interface 312 can access and display one or more semantic maps to a user of the central system 210, and one or more components of the central system can update the displayed semantic map for subsequent storage in the semantic maps storage module in response to receiving information from one or more robots, security personnel 250, or any other component of FIG. 2. For instance, if a semantic map indicates that a window is open, and a robot patrolling within proximity of the window detects that the window has subsequently been closed, the semantic map can be updated (for instance, by the infrastructure interface 316) to reflect the closed status of the window and the updated semantic map can be stored in the semantic maps storage module.

The inventory storage module 344 stores information associated with objects within a building, within a floor, within a room or store, and the like. For instance, the inventory storage module can include a database detailing types of inventory, stock levels associated with each inventory type, and a location of each inventory object within a building. The inventory storage module can be updated, for instance, in response to receiving information from a robot 100 indicating that the location of one or more objects within a store has changed, that a missing object has been found, or that objects have been misplaced or lost. It should be noted that the inventory module can store locations, numbers, and types of objects in addition to retail objects or stock, for instance lab equipment, books or other reference materials, and the like. The inventory storage module can additionally store a status for objects (for instance, "misplaced", "lost", "stolen", "broken", "operational", and the like).

Figure 4:
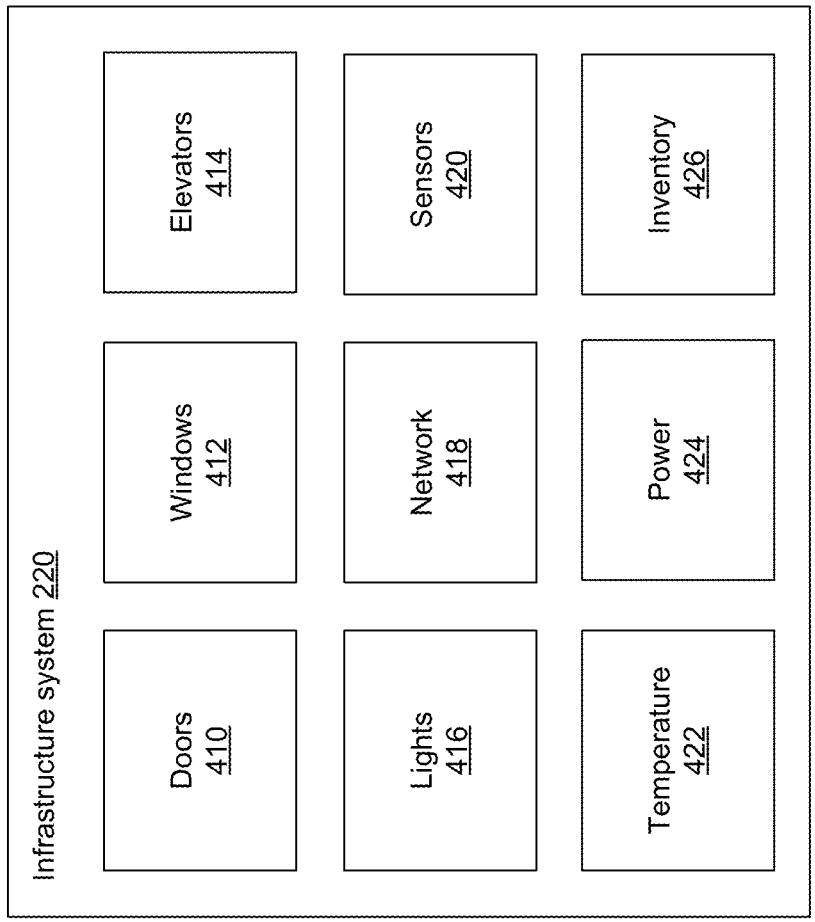
FIG. 4 is a block diagram of the infrastructure system of FIG. 2, according to one embodiment.

FIG. 4 is a block diagram of the infrastructure system of FIG. 2, according to one embodiment. In the embodiment of FIG. 4, the infrastructure system 220 includes doors 410, windows 412, elevators 414, lights 416, a network 418, sensors 420, temperature system 422, power system 424, and inventory 426. It should be noted that in other embodiments, the infrastructure system can include additional, fewer, or different components than those illustrated here.

The doors 410 and windows 412 of a building can be standard, disconnected, and/or non-electronic doors and windows. Alternatively, the doors and windows can be electronic and/or connected to other building infrastructure, for instance via the network 200. In embodiments where the doors and windows are electronic, a user of the central system 210, a robot 100, or a security personnel 250 can close, open, lock, or unlock the doors and windows, for instance manually (by the security personnel or robot) or electronically (by directly interfacing with the electronic subsystems of the doors and windows, or by providing instructions to the doors and windows via the network).

The elevators 414 can include one or more elevator within a building. The elevators can be connected to one or more components of the environment of FIG. 2, for instance the central system 210, or can be disconnected from the components of the environment. Instructions can be provided to the elevators, for instance by a user of the central system, a security personnel 250, or a robot 100 via the network 200 or directly to the elevator via an elevator interface, or manually, via a physical button press by the security personnel or the robot. Elevator instructions can include but are not limited to instructing the elevator to go to a particular floor (such as the floor a robot is on), stopping or disabling the elevator, opening and closing the elevator doors, controlling one or more elevator components (such as a speaker or display within the elevator), and the like.

The lights 416 can include various lighting systems within a building, for instance lights within particular rooms, on particular floors, or building-wide. The lights can be connected to other building systems, for instance via the network 200, and can be remotely activated or deactivated (for instance by a user of the central system 210 or a robot 100) or manually activated or deactivated (for instance by security personal 250 or a robot toggling a light switch or interface).

The network 418 can include networking infrastructure within a building or portion of a building, or across multiple buildings or locations. The network can include standard networking systems, such as routers, switches, severs, transceivers, and the like. The network can be connected to the other components of FIG. 2 via the network 200. A user (via the central system 210) or robot 100 can activate, deactivate, reset, or configure portions of the network. For instance, a robot, in response to determining that a portion of a wireless network within a building is currently down, can re-locate to a location within the building where the wireless network is active, and can instruct the central system to reset network systems corresponding to the non-functioning portion of the network.

The sensors 420 can include fire alarms, smoke detectors, carbon monoxide detects, gas or toxin detectors, thermometers, and the like. Information from the sensors can be provided to the central system 210, for instance directly via the network 200 or via a robot 100.

The temperature system 422 can include a furnace, air conditioning unit, fans or other air flow systems, thermal ductwork and corresponding control mechanisms (such as valves), and other systems associated with building temperature. Instructions can be provided to the temperature system, for instance from a user of the central system 210 via the network 200 or from a robot 100 (either via the network or by directly connecting to the temperature system). Example instructions include but are not limited to lowering the temperature or raising the temperature for an entire building or for building portions, increasing air flow, controlling one or more duct valves, and the like. Information can also be received from the temperature system by the central system, a robot, or by another component of FIG. 2. Examples of such information include power usage information, thermal information, system activity or capacity, and the like.

The power system 424 can include power infrastructure associated with a building. For instance, the power system can include one or more generators, feeds from an external power source, solar panels, breakers, power distribution units, power lines within and external to a building, meter boxes, robot recharge stations, vehicle recharge stations, and the like. In some embodiments, the power system is communicatively coupled to one or more components of FIG. 2, such as the central system 210, via the network 200. In such embodiments, a user of the central system, a security personnel 250, and/or a robot 100 can provide instructions to the power system via the network, for instance to deactivate a portion or all of a building's power infrastructure, to reset portions of the power infrastructure, to reset breakers, to turn generators on or off, and the like. The power system can also provide information to components of FIG. 2, for instance information detailing power usage within a building, within portions of a building, by components of a building, or information detailing power production or fuel usage by solar panels, generators, and the like.

The inventory 426 includes objects within a building, portion of a building, store, room, or other area. Examples of inventor include store inventory (objects for sale within the store), building equipment (such as lab equipment, computer equipment, and the like), sensitive objects (such as high security objects, expensive objects, and the like), vehicles, and the like. The inventory of a building can include tags or other receivers/transmitters (such as RFID tags) that can identify the object to which the tag is affixed to a system capable of reading the tag. Each object can include a unique identifier that is transmitted to a reader system, and, as described below, a robot 100 equipped with one or more RFID readers can identify and locate inventory within a building or building portion by navigating within a proximity to the corresponding object.

Figure 5:
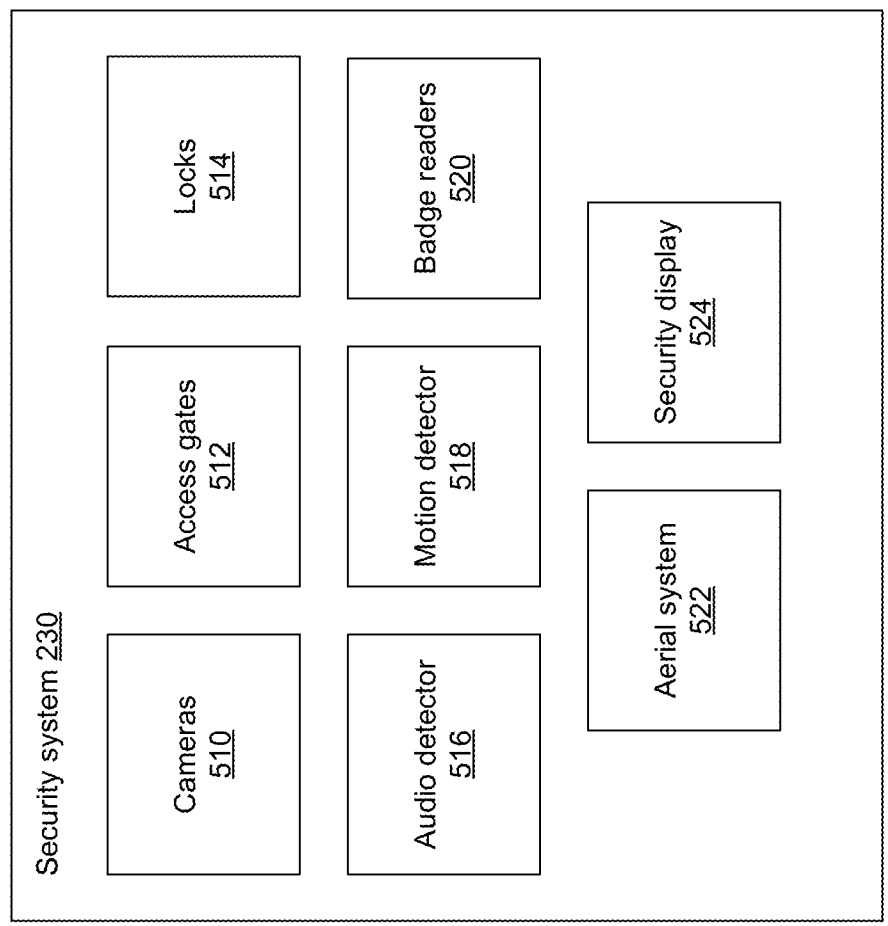
FIG. 5 is a block diagram of the security system of FIG. 2, according to one embodiment.

FIG. 5 is a block diagram of the security system of FIG. 2, according to one embodiment. In the embodiment of FIG. 5, the security system 230 includes cameras 510, access gates 512, locks 514, audio detectors 516, motion detectors 518, badge readers 520, aerial systems 522, and security displays 524. In other embodiments, the security system can include additional, fewer, or different components than illustrated herein. It should be noted that while many components of the security system can be disconnected from the other components of FIG. 2, the remainder of the description herein will be limited to embodiments in which the components of the security system can communicate via the network 200 (for instance, with the central system 210 or the robots 100).

The cameras 510 can be located within or external to a building, for instance within high-trafficked passages, high-security rooms or locations, locations corresponding to advantageous vantage points, and the like. In some embodiments, the field of view of a camera is fixed, while in other embodiments, the cameras can rotate, pan, tilt, or track objects or individuals, for instance in response to an instruction from a user of the central system 210 or in response to the detection of a suspicious noise or detected motion. The cameras can record video for storage and subsequent viewing or processing, or can stream the video to the central system or a robot 100. In some embodiments, the cameras can identify objects or individuals within video captured by the cameras and can provide this information to other components of FIG. 2, while in other embodiments, the central system identifies objects or individuals within video provided by the cameras, and provides this information to other components of the FIG. 2.

The access gates 512 can include physical barriers (such as barrier arms, walls, doors, and the like) configured to prevent or inhibit the movement of individuals, vehicles, or other objects. The access gates can allow individuals or vehicles to pass through in response to verifying that the individuals or vehicles are authorized to pass, for instance in response to verifying an individual's or vehicle's credentials or access permissions. In some embodiments, a robot 100, a user of the central system 210, or the central system itself can activate an access gate to allow or prevent individuals or vehicles from passing through, for instance in response to an instruction from the user or robot, or in response to a detected security violation or suspicious activity elsewhere within a vicinity of the access gate.

The locks 514 can be located within doors, windows, cabinets, cupboards, safes, or within any other suitable building infrastructure or object. The locks can be activated or deactivated by instructions from a robot 100, a user of the central system 210, or by the central system itself, for instance via the network 200. The locks can also be activated in response to the occurrence of a security violation or suspicious activity within a proximity of the locks.

The audio detector 516 is configured to detect audio signals, and to provide information describing the detected audio to one or more components of the environment of FIG. 2. Likewise, the motion detector 518 is configured to detect motion within a proximity of the motion detector, and to provide information describing the detect motion to one or more components of the environment of FIG. 2. For example, the audio detector can provide detected audio signals to the central system 210 for analysis, and the central system can determine if the detected audio signals are representative of a security violation. Likewise, the motion detector can provide detected motion signals to the central system, which can determine if the detected motion signals are representative of a security violation.

The badge readers 520 are configured to detect ID badges of individuals, to authenticate the identity, access credentials, or permissions of the individuals. The badge readers can provide information associated with the detected badges to components of the environment of FIG. 2, for instance via the network 200. The badge readers can include RFID readers, badge scanners, or any other suitable hardware. In some embodiments, badge readers are associated with doors, access gates, and the like such that an individual authenticated by the badge reader is granted access to the door, access gate, and the like.

The aerial systems 522 include one or more unmanned aerial vehicles (UAVs) configured to fly within a space (such as a building floor, parking lot, and the like). The aerial systems can receive instructions from components of FIG. 2, such as the central system 210 or a robot 100. The aerial systems can be instructed to patrol a particular area, for instance in response to a detected security violation or detected suspicious activity. The aerial systems can include cameras, RFID readers, or other sensors configured to capture information detected by the aerial systems and to provide the captured information to the central system, the robots, or other components of FIG. 2. Aerial systems are described below in greater detail.

The security displays 524 are configured to display security information to individuals, such as a security status of a building or building portion, indications of security violations, and access credentials required to be in a particular location. The displayed security information can be received from the central system 210, from a robot 100, or from any other component of FIG. 2. The security displays can include hardware displays, and can be, for instance, tablet computers or interactive monitors. The security displays can be mounted within walls or other accessible locations. The security displays can receive inputs from individuals, for instance via a touch-screen interface of the security display or via any other suitable input mechanism. For instance, an individual can request access to a building portion, can request a door be unlocked, can request authentication, and the like via the security displays. The security displays can provide information describing the received inputs to the central security system or to any other component of FIG. 2, which in turn can perform a security action based on the provided information (for instance, unlocking a door or authenticating the individual).

Mobile Robot Housing

Figure 6:
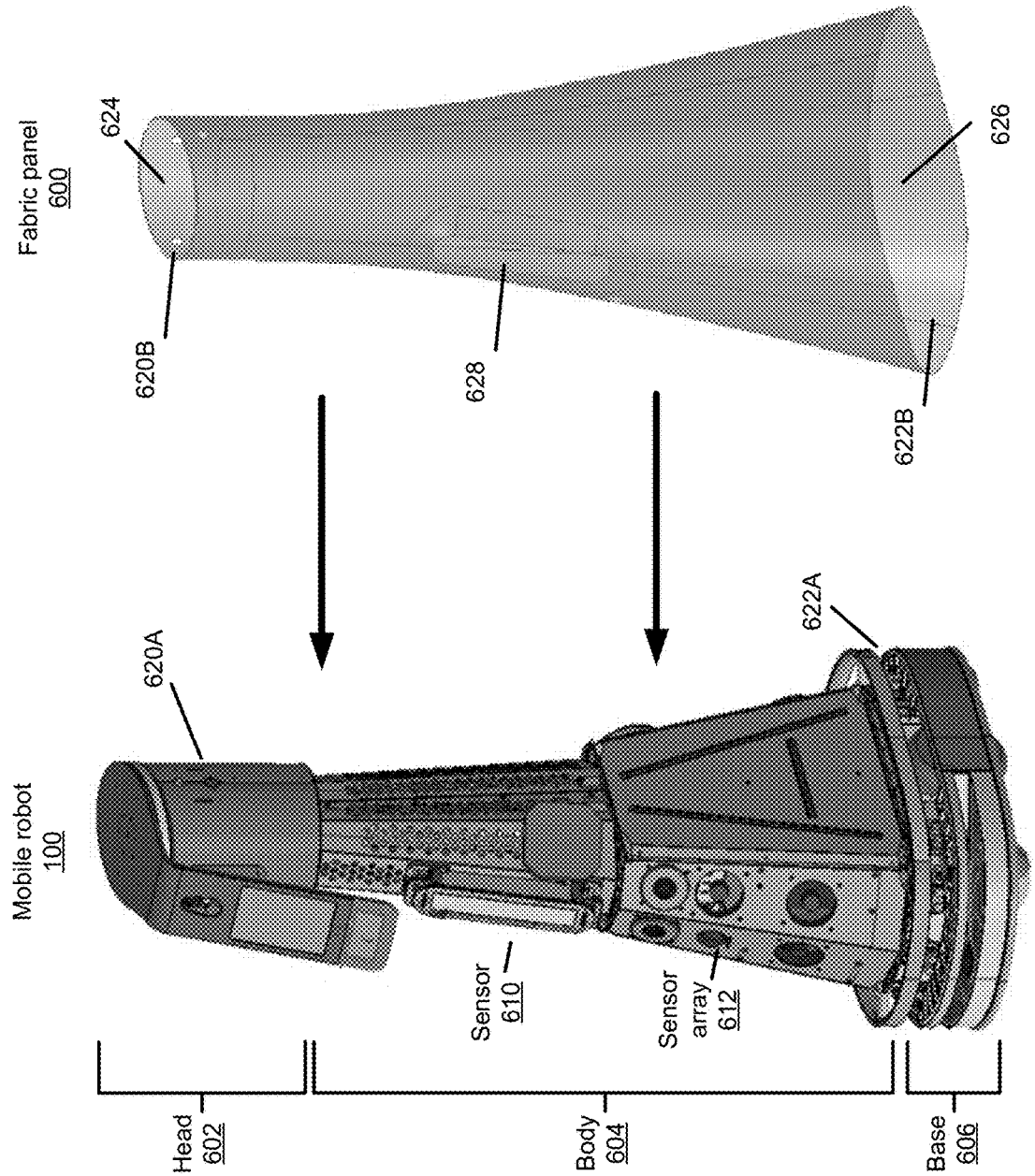
FIG. 6A illustrates a view of a mobile robot with a removed fabric exterior, according to one embodiment.
FIG. 6B illustrates a view of a removable fabric exterior for a mobile robot, according to one embodiment.

FIG. 6A illustrates a view of a mobile robot with a removed fabric exterior, according to one embodiment. The robot 100 of FIG. 6 includes a head portion 602, a body portion 604, and a base portion 606. The robot further includes a sensor 610 and a sensor array 612. As the fabric exterior is removed from the robot in the embodiment of FIG. 6A, the interior portion of the robot body is exposed. The robot also includes coupling means 620A located around the robot head and coupling means 622A located around the robot base.

FIG. 6B illustrates a view of a removable fabric exterior for a mobile robot, according to one embodiment. The fabric panel 600 includes coupling means 620B and 622B. The fabric panel also includes a top opening 624, a bottom opening 626, and a side opening 628. The circumference of the opening 624 corresponds to the circumference of the robot head, and the circumference of the opening 626 corresponds to the circumference of the robot base. Accordingly, the fabric panel is a tubular sock that can be stretched over and secured to the robot 100, thereby covering portions the interior of the robot. In some embodiments, the fabric panel is partially cone-shaped, with the diameter of the top opening being smaller than the diameter of the bottom opening, beneficially aiding in the placement of the fabric panel over the robot 100.

The fabric panel 600 can be made of any type of fabric material, for instance cotton, nylon, polyester, vinyl, velvet, or any other suitable or stretchable fabric material or blend/combination thereof. By stretching, the fabric panel of FIG. 6B can be placed over the head 602 of robot 100 (and any protrusions attached to the robot head) and any other components protruding from the robot body 604. Further, by stretching, contact made between the robot and other robots, individuals, or other objects can prevent damage to the fabric panel. It should be noted that in other embodiments, the fabric panel may include a material that does not significantly stretch.

The fabric panel 600 can include a fabric mesh material, allowing for the flow of air into and out of the robot 100, beneficially enabling the cooling of components of the robot interior by allowing for the transfer of heat out of the robot and through the fabric. Further, fabric may be semi-transparent or translucent, allowing for cameras, motion sensors, laser sensors, or other components within the robot to at least partially see through the fabric. Finally, the fabric may allow sound waves to pass through the fabric, allowing microphones or other audio components to capture sound waves passing through the fabric, and allowing speakers within the robot to transmit sound through the fabric.

The fabric panel 600 can couple to the robot 100 in a number of ways. In the embodiment of FIGS. 6A and 6B, coupling means 620B are configured to couple to coupling means 620A, and coupling means 622B are configured to couple to coupling means 622A. The coupling means 620B may be located around an inside perimeter of the top of the fabric panel, and the coupling means 622B may be located around an inside perimeter of the bottom of the fabric panel. Likewise, the coupling means 620A may be located around an outside perimeter of the robot head 602, and the coupling means 622A may be located around an outside perimeter of the robot base 606. In other embodiments, the coupling means of the fabric panel and the robot may be located in different locations on the fabric panel and the robot.

In some embodiments, the coupling means 620B and 622B include holes within the fabric of the fabric panel 600 and grommets located around the holes. Likewise, in some embodiments, the coupling means 620A and 622A include pins, latches, or other securing protrusions configured to reciprocally couple with the holes of the couplings means 620B and 622B when the holes are placed over the coupling means 620A and 620B. In other embodiments, the coupling means include buttons, zippers, Velcro, levers, buckles, or any other suitable means enabling the fabric panel to couple to the robot 100. In some embodiments, when the coupling means 620B are coupled to the coupling means 620A, and when the coupling means 622B are coupled to the coupling means when the fabric panel is coupled to the robot, the fabric of the panel is stretched and held in partial tension along the axis of the fabric panel from the opening 624 to the opening 626. The coupling means can be located on an inside surface of the fabric panel, beneficially enabling the fabric panel to couple to the robot 100 without the coupling means being visible (e.g., the coupling means may not include holes within the fabric panel, allowing for a seamless/holeless fabric exterior). In some embodiments, the coupling means include elastic bands (for instance, around an inside surface of the fabric panel adjacent to or within a threshold distance of the openings 624 and 626) that secure the fabric panel to the robot by tightening around reciprocal grooves within the head, body, and/or base. Such elastic bands can beneficially improve the ease of coupling the fabric panel to the robot, and can enable an installer to quickly align the fabric panel on the robot during installation by allowing the installer to move the fabric panel over the robot until the elastic bands snap into the reciprocal grooves.

While the fabric panel 600 covers certain sensors of the robot 100 when the fabric panel is coupled to the robot, such as the sensor array 612, the fabric panel can include one or more openings enabling other components of the robot to be exposed/not covered by the fabric. For example, the opening 628 corresponds to the sensor 610 such that when the fabric panel is coupled to the robot, the opening 628 is secured around the sensor 610 thereby exposing the sensor. Although only one opening is shown within the side of the fabric panel in the embodiment of FIG. 6B, in other embodiments, any number of openings can be included corresponding to any number of types of components of the robot. For instance, the robot body 604 can include cameras or other sensors that can be impaired by fabric, and the fabric panel can include openings to prevent such components from being covered by the fabric.

Although the fabric panel 600 of the embodiment of FIG. 6B is shown without an underlying structure, in some embodiments, the fabric panel can include a structure or skeleton to preserve the form or shape of the fabric panel. For instance, the fabric panel can include a first ring component along an inside perimeter of the opening 624 and a second ring component along an inside perimeter of the opening 626. The structure or skeleton of the fabric panel in such embodiments can be rigid or flexible.

In some embodiments, instead of one fabric panel 600 that secures around an entire exterior of the body 604 of the robot 100, several fabric panels can each be secured to a portion of a robot exterior. For instance, a first panel can secure to a left side exterior of the robot and a second panel can secure to a right side exterior of the robot. In such embodiments, each fabric panel can include an outside ring structure located around an outside perimeter of the panel.

The fabric panel 600 illustrated in FIG. 6B and described herein can be coupled to the robot 100 and subsequently removed from the robot. Such embodiments beneficially allow for the efficient and low-cost replacement of fabric panels, for instance in the event that the fabric panels get torn or damaged. Further, implementing removable fabric panels in covering the exterior of the robot allows for the branding or configuration of the fabric panels in a color, pattern, or including a logo customized by an owner or user of the robot. However, it should be noted that while removable fabric panels are described herein, in some embodiments, the fabric panels are fixedly coupled to the robot in a more-permanent fashion. It should also be noted that although fabric panels are described herein, in other embodiments, robots can have solid/rigid outer housings and perform the functions described herein.

Mobile Robot Architecture

Figure 7:
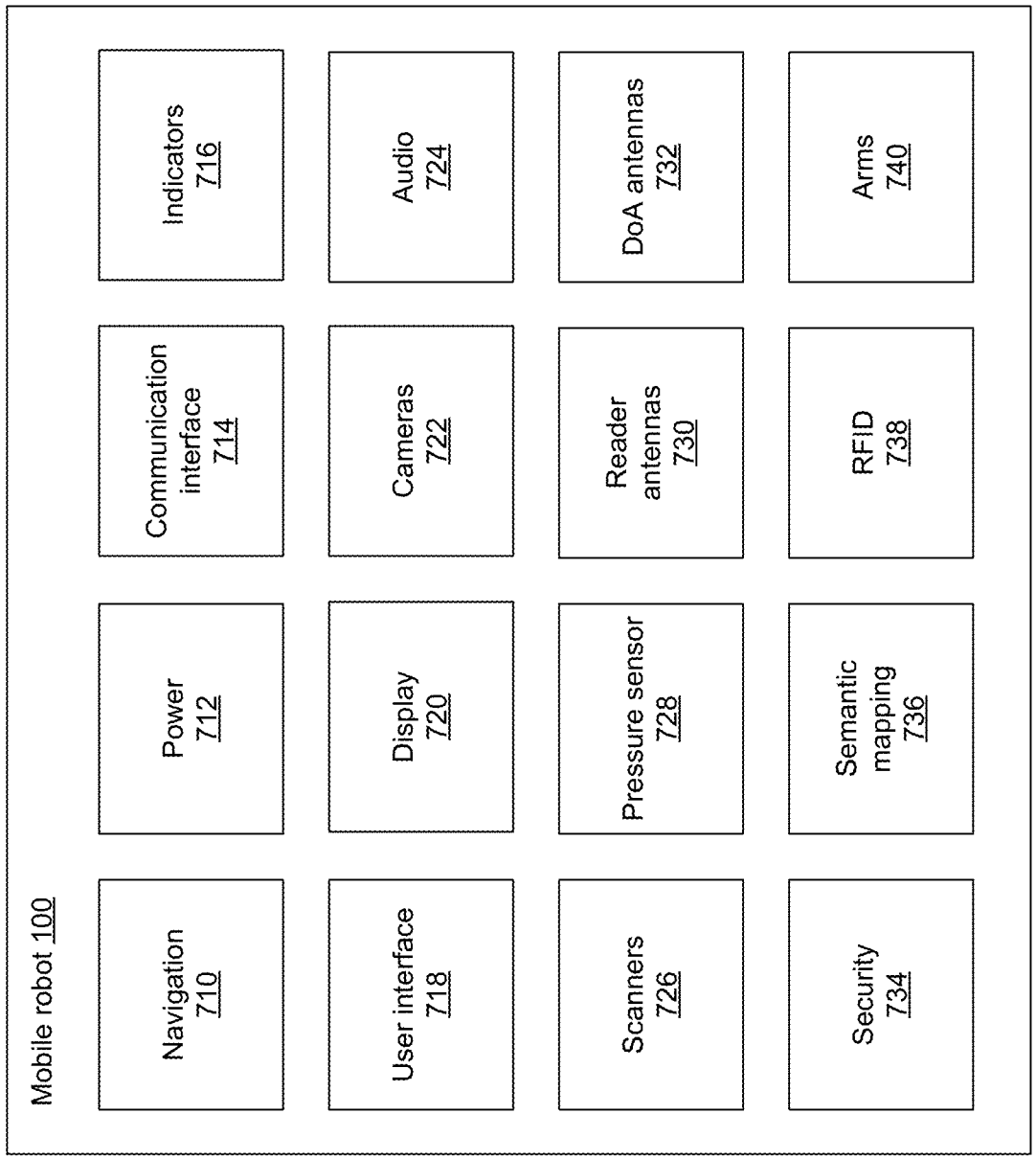
FIG. 7 illustrates a block diagram of a mobile robot architecture, according to one embodiment.

FIG. 7 illustrates a block diagram of a mobile robot architecture, according to one embodiment. The robot 100 of the embodiment of FIG. 7 includes a navigation system 710, a power system 712, a communication interface 714, various indicators 716, a user interface 718, a display 720, one or more cameras 722, an audio system 724, various scanners 726, a pressure sensor system 728, one or more reader antennas 730, one or more direction of arrival (or DoA) antennas 732, a security system 734, a semantic mapping system 736, an RFID system 738, and one or more arms 740. It should be noted that in other embodiments, a mobile robot 100 can include fewer, additional, or different components than those illustrated in the embodiment of FIG. 7. For instance, the robot 100 can include one or more hardware processors or controllers configured to perform various functionalities described herein.

The navigation system 710 is configured to move the robot 100 around a space, such as a store, a room, a floor, a building, a parking lot, or any indoor or outdoor space. The navigation system can include a motor (such as an electric motor), an engine, or any other systems capable of moving the robot. The navigation system can also include wheels, rollers, and the like configured to enable the robot to smoothly move. The navigation system can move the robot in a number of directions, for instance, forwards, backwards, or sideways. In some embodiments, the base of the robot is holonomic, enabling the robot to move in any direction. In some embodiments, the navigation system can rotate the robot clockwise or counterclockwise, for instance as much as 360 degrees. In some embodiments, the navigation system can turn the robot in place, without requiring a significant (if any) turn radius.

The navigation system 710 can move the robot 100 in response to receiving navigation instructions, for instance from a user of the central system 210, from a security personnel 250, or from another robot. In some embodiments, the navigation system moves the robot as part of a patrol, routine, or security protocol. Navigation instructions can include an end location and can determine a route from a current location of the robot to the end location, for instance by detecting obstacles and/or paths from the current location to the end location, by selecting a path based on the detected obstacles and paths, and by moving the robot along the selected path until the robot arrives at the end location. In some embodiments, the navigation instructions can include a path, an ordered set of locations, an objective (e.g., "patrol the 4th floor"), or a map, and the navigation system can move the robot based on the navigation instructions.

The power system 712 can include a power source, such as a battery, fuel, solar panels, or any other suitable source of power storage. The power system can provide power to the other components of the robot 100, such as the navigation system 710. The power system can also include a recharging system, for instance a plug/socket or other recharging interface. In some embodiments, the robot can navigate to a recharge station and can electrically couple the recharging system to the recharge station, enabling the recharge station to refill the power source of the power system. For example, the recharging system of the robot can include a socket within the robot protected by a pivoting door, and the recharge station can include a plug component. In such embodiments, the robot can navigate to the recharge station and can align the pivoting door with the plug component. The robot can then move towards the plug component such that the plug component pushes the pivoting door inward into the robot, and such that the plug component is inserted into the socket. The plug component can provide power to the power source via the socket. The power system can further include infrastructure electrically coupling the power system to the recharging interface and the other components of the robot.

The communication interface 714 can communicatively couple the robot 100 to other components of the environment of FIG. 2, such as the central system 210 or other robots, either directly or via the network 200. For instance, the communication interface can include receivers, transmitters, wireless controllers, and the like, and can receive information from and transmit information to and between components of FIG. 2 and other components of the robot. Examples of communication protocols implemented by the communication interface include WiFi, Bluetooth, Zigbee, 3G/4G, LTE, or any other suitable communication protocol. The communication interface can provide video captured by the cameras to an external monitor, or can receive instructions from an operator (for instance, via the central system).

In some embodiments, the robot 100 can choose to transmit information via the communication interface 714 based on a communicative status of the robot. For instance, in embodiments where the robot is patrolling a route within a building, the robot can transmit video and audio data captured during the patrol when the communication interface is coupled to the network 200 via a WiFi connection. In some embodiments, if the WiFi connection is lost, the robot can communicatively couple to the network via a secondary connection, such as an LTE connection. In such embodiments, the robot can modify the data sent via the communication interface before transmitting, for instance by transmitting only audio data, by performing lossy compression on the video before transmitting, by reducing the frame rate or resolution of the video before transmitting, by transmitting select images instead of video, by transmitting video data corresponding only to key events (such as video of a suspected unauthorized individual), by transmitting full-resolution video based on features within the video (such as faces) and low-resolution video otherwise, and the like. In the event of a total disconnection from the network, the robot can store information for subsequent transmission (for instance, when the communication interface is coupled to the network via WiFi or when the robot is docked at a charge station). Likewise, the robot can select data to transmit or can perform compression operations on the data before transmission if the bandwidth available to the robot falls before a threshold required to stream the data in real-time or other threshold. In some embodiments, the robot can store all detected information and data, for instance at full-resolution, for a set amount of time, until the robot's available storage capacity falls below a threshold, until the data is transmitted, until an operator instructs the robot to delete the data, or until any other suitable criteria is satisfied.

The indicators 716 can include visual indicators (such as LEDs or other lights), audio indicators, haptic indicators, vibration components, and the like. The indicators are configured to communicate information or a status associated with the robot 100 to an entity external to the robot, such as a user or individual. For instance, the indicators can include a ring of LEDs around a top surface of the robot that indicate a direction of movement of the robot. Likewise, LEDs can function as a turn signal, indicating a future direction change of the robot. The robot can also display emoji or other indicators of emotion, can display text identifying a status or current operation of the robot (e.g., "patrolling", "security alert", "danger alert", "intruder nearby", etc.) In some embodiments, lights or LEDs on the robot can change color to indicate a status of the robot (for instance, LED indicators can be green to indicate that the robot is available to assist customers, can be blue to indicate that the robot is busy performing a task, or can be red to indicate that the robot has detected a violation of a security policy). The robot also includes a hardware display 720 (such as a monitor or screen) configured to communicate information associated with the robot. For instance, the hardware display can display a map, images, a request (e.g., the text "How can I help you today?"), or any other suitable information. In embodiments where the hardware display is a touch-screen display, a user can interact with the displayed information, for instance to get additional information, to configure the display of information, to instruct the robot to perform an operation, and the like.

The robot 100 includes a user interface 718 configured to display information to an individual or user, for instance in response to a received request. In some embodiments, the user interface displays a graphic user interface ("GUI") including the information, for instance on the hardware display 720 or via the indicators 716. The GUI can display information detailing a status of the robot, information requesting credentials or other information from an individual, information providing instructions to a user (e.g., "follow me"), information associated with an environment or building in which the robot is located (e.g., store or product information), or any other suitable type of information. The user interface can also include infrastructure to enable a user or individual to interface with the robot. For instance, the user interface can include a keyboard or keyboard, one or more buttons or dials, a mouse, motion/gesture detection capabilities, and the like. In some embodiments, the user interface includes the hardware display, and the hardware display is a touch-sensitive display configured to receive inputs from an individual. Inputs received via the user interface can be provided to one or more other components of the robot, can configure the robot to perform various functions or to operate in various modes, and the like. In some embodiments, the user interface further configures a voice recognition engine configured to recognize a user's voice, enabling a user to speak to the robot (for instance, to request information, to command the robot to perform an security operation, or the like).

The cameras 722 can include any number of cameras or camera arrays. For example, the cameras can include cameras configured to capture images or videos directly or a distance in front of the robot, to the sides of the robot, behind the robot, or above the robot. In some embodiments, the cameras can move, pivot, tilt, pan, or rotate, for instance in response to a change in motion by the robot, in response to an instruction received by the robot, in response to detecting an object within a proximity of the robot, or in response to the performance of a security or other function by the robot.

The cameras 722 can capture images and video at any suitable resolution or frame rate. In some embodiments, an array of fixed cameras can capture video 360 degree video around the robot 100, while in other embodiments, one or more cameras can rotate around a central axis of the robot to capture 360 degree video. In some embodiments, camera pairs can capture 3D video, and in some embodiments, images or video captured by multiple cameras can be stitched together using one or more stitching operations to produce a stitched image or video. In addition to capturing images or video in the visible light spectrum, the cameras can capture images within the IR spectrum or can capture thermal images. Images and videos captured by the cameras can be provided to one or more other components of the environment of FIG. 2, for instance the central system 210 via the communication interface 714 and the network 200, beneficially enabling a remote operator of the robot to see the surroundings of the robot.

The audio system 724 can include components to capture and emit audio signals. For instance, the audio system can include one or more microphones configured to capture audio signals, such as audio signals that pass through the fabric panel 600 of the robot 100. Likewise, the audio system can include speakers configured to playback audio or sound to individuals within a proximity of the robot. In some embodiments, audio captured by the audio system can be provided to a component of FIG. 2, such as the central system 210 via the network 200 and the communication interface 714, beneficially enabling a remote operator of the robot to hear audio occurring within a proximity of the robot. Likewise, audio can be received by the audio system from an external entity for playback by the audio system, for instance voice commands from an operator of the robot to an individual within a proximity of the robot.

The scanners 726 can detect objects, obstacles, paths, or individuals within a proximity of the robot 100. Examples of scanners include laser scanners or rangefinders, radar, sonar, ultrasonic sensors, motion detectors, 3D depth sensors, thermal scanners, infrared or ultraviolet scanners, and the like. One or more scanners can be located near a base of the robot, for instance to identify objects that might obstruct or disrupt movement of the robot. One or more scanners can be located near a top of the robot, for instance to identify the immediate surroundings of the robot, beneficially enabling the robot to "see" over objects that might otherwise obstruct the viewpoint of scanners located near the base of the robot. In addition to detecting obstacles, objects, and individuals, the scanners can track moving objects or individuals, for instance to follow the movement of suspicious individuals. In some embodiments, information captured by the scanners is used by the navigation system when selecting a path of motion for the robot. Likewise, information captured by the scanners can be used by or provided to other components of the robot or an entity external to the robot (such as a component of FIG. 2), for instance via the communication interface 714.

The pressure sensor 728 can include a pressurized tube located around a base of the robot 100, and can detect objects or other obstructions within an immediate proximity of the robot in response to a determination that the robot has run into the object or obstruction. For instance, a robot can move down a hallway, and can inadvertently run into an individual's foot. In response to the contact with the user's foot, the pressure inside the tube increases, and the pressure sensor can detect the increase in pressure and determine that the robot has made contact with an obstruction.

In response to a detected increase in pressure within the pressurized tube, the pressure sensor 728 can determine that the robot 100 has come into contact with an obstruction, and can slow or stop the motion of the robot, for instance by instructing the navigation unit 710. The pressure sensor can determine the direction of the obstruction based on the current direction the robot was moving at the time of the detected pressure increase. In some embodiments, the pressure sensor includes a protective outer housing that, upon contact with an obstruction, exerts a reciprocal pressure on the pressurized tube for detection by the pressure sensor. The pressure sensor enables the robot to immediately detect contact with an obstruction and adjust a trajectory or movement of the robot, beneficially reducing the risk that the contact can cause damage or harm to the robot, an object, or an individual.

In some embodiments, the pressure sensor 728 can measure an amount of pressure exerted upon the pressurized tube. In such embodiments, the robot 100 can use the pressure sensor to apply an amount of force upon an object. For example, the robot may want to gently push open a door, and can move into the door until the pressure sensor detects that ten pounds of pressure are being exerted upon the pressurized tube. By measuring the amount of force applied by the robot onto an object using the pressure sensor, the robot can beneficially limit the amount of force applied to the object in order to reduce the risk that the application of force by the robot damages the object.

The robot 100 can include one or more reader antennas 730 configured to receive signals from entities external the robot (such as components of the environment of FIG. 2). The reader antennas can include any type of antenna, such as an RFID reader antenna, WiFi antennas, radio antennas, and the like. The robot can also include one or more DoA antennas 732 configured to determine a direction from which a signal is received. The reader antennas and the DoA antennas can be part of the communication interface 714, and information captured by the reader antennas and the DoA antennas can be provided to one or more components of the robot, or one or more entities external the robot (such as the central system 210). The capture of RFID signals and the determination of an angle or direction from which the captured RFID signals are received are described below in greater detail.

The security system 734 configures the robot 100 to perform one or more security operations. For instance, the security system can configure the robot to investigation a suspicious sound, to obstruct the movement of an unidentified individual, or patrol a portion of a building. The security system can instruct other components of the robot during the performance of security operations, for instance by capturing video of an unidentified user using the cameras 722. The security system can receive instructions to perform the one or more security operations, and/or can receive information associated with one or more security protocols via an external source, such as the central system 210 or the security system 230. Likewise, the security system can provide information associated with the context, surroundings, or activity of the robot, or information associated with the performance of a security operation to an entity external to the robot. The security operations performed by the security system are described in greater detail below.

The semantic mapping system 736 is configured to generate or update a semantic map associated with a location or setting in which the robot 100 is located. For instance, the semantic mapping system can generate a map associated with a patrol route through a building floor as the robot moves through the space. The location of obstructions, and paths within the building floor can be detected by the scanners 726 and recorded onto the semantic map. Likewise, objects can be detected during the robot's movement (for instance, by the cameras 722), and information describing the detected objects and the location of the detected objects can be included within a semantic map. Semantic maps generated or updated by the semantic mapping system can be provided to an entity external to the robot, for instance the central system 210, for storage and/or subsequent use. The generation of semantic maps by the semantic mapping system is discussed in greater detail below.

The RFID system 738 can identify RFID tags within a space and determination the location of the identified RFID tags. For instance, for store inventory objects, each tagged with an RFID tag, the RFID system can, during the course of movement within a proximity of the objects, detect the presence and location of the RFID tag (and thus, the object to which the RFID tag is coupled). The detected RFID tags and corresponding objects can be mapped onto a semantic map, and/or information associated with the detected RFID tags and the locations thereof can be provided to an entity external to the robot 100, such as the central system 210, for subsequent storage. In some embodiments, the RFID system can include short-range RFID readers capable of reading LF RFID or HF RFID tags from within a threshold distance, while in other embodiments, the RFID system can include long-range RFID readers capable of reading UHF RFID tags from greater than the threshold distance away but within a greater, second threshold distance. It should be noted that the RFID system can also read other types of tags according to the principles described herein, including NFC tags or devices, BLE tags or devices, and the like. The RFID system is described below in greater detail.

Figure 8:
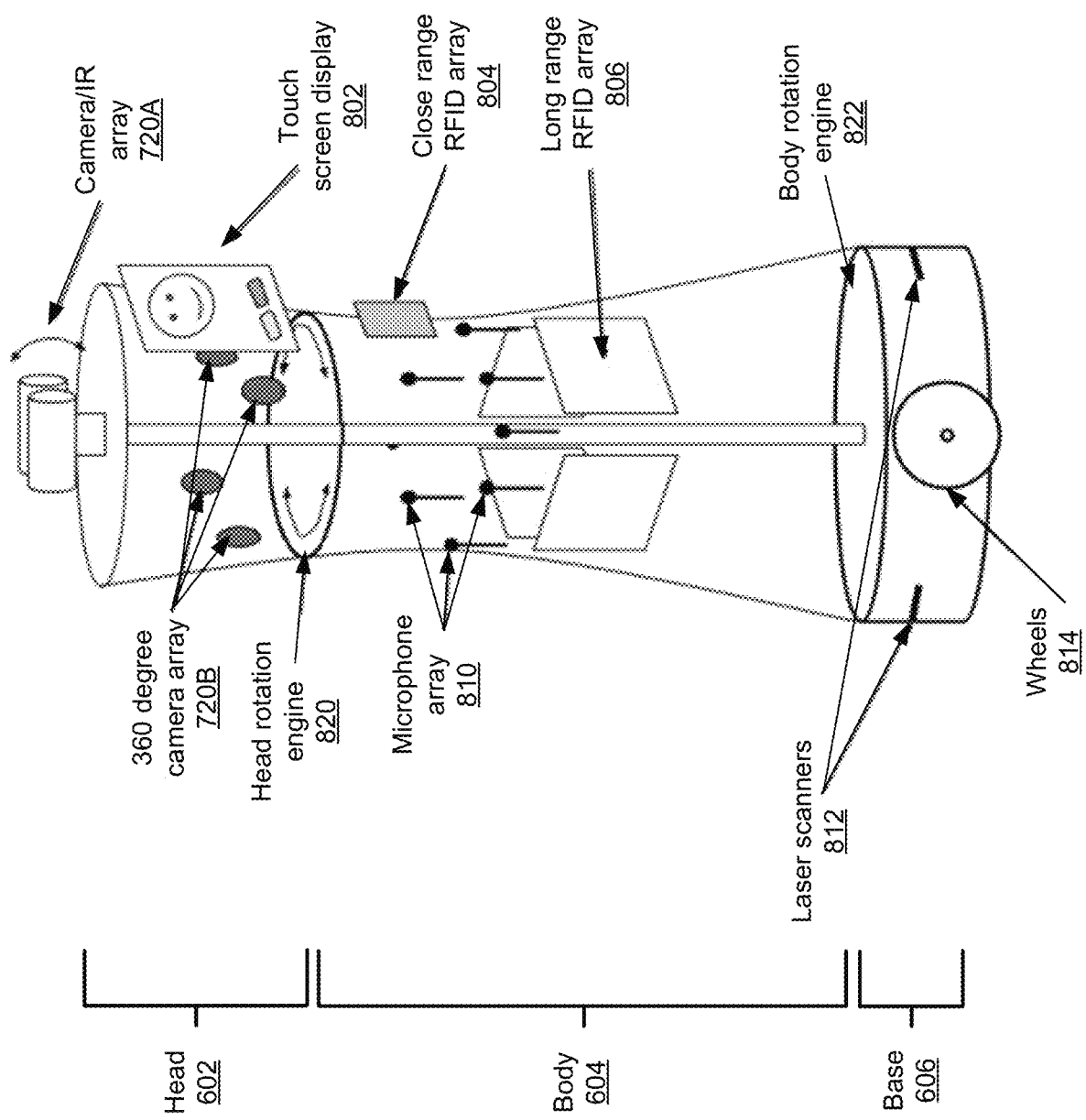
FIG. 8 illustrates a view of an example mobile robot and various robot components, according to one embodiment.

FIG. 8 illustrates a view of an example mobile robot and various robot components, according to one embodiment. The robot of FIG. 8 includes a head 602, a body 604, and a base 606. In the embodiment of FIG. 8, the head can rotate relative to the body without otherwise requiring rotation or movement by the robot via the head rotation engine 820. Enabling the head to rotate independently of the rest of the robot can beneficially enable the robot to rotate components coupled to the head, such as the camera/IR array 720A, the 360 degree camera array 720B, and the touch screen display 802. In other words, by rotating the head, the cameras and display of the robot of FIG. 8 can face different directions, allowing the cameras to capture video from a different field of view and allowing the robot to turn the touch screen display such that it faces an individual within a proximity of the robot.

In the embodiment of FIG. 8, the body 604 of the robot 100 can similarly rotate relative to the base 608 via the body rotation engine 822. Enabling the body 604 to rotate independently of the base can beneficially enable components coupled to the body to rotate, such as the close range RFID antenna array 804, the long range RFID antenna array 806, and the microphone array 810. In such embodiments, the antenna and microphone arrays can capture or detect signals from different directions, beneficially enabling the robot to optimize the angle of the antenna and microphone arrays relative to the signals captured or detected.

The base 608 of the robot 100 can similarly rotate, for instance using the navigation system 710. Rotating the base beneficially enables the robot to face different directions, to adjust an angle or trajectory of the robot, and the like. Likewise, rotating the base also rotates the laser scanners 812, beneficially enabling the laser scanners to scan in different directions. It should be noted that in some embodiments, the base can rotate while the body and 604 and head 602 of the robot do not rotate. For instance, the base can rotate 90 degrees counterclockwise, and the body can synchronously rotate 90 degrees counterclockwise, resulting in a rotation of the base 90 degrees relative to the floor without the rotation of the body and head relative to the floor.

The robot 100 can also include additional components not illustrated in the embodiments of FIGS. 7 and 8. For instance, the robot can include one or more projectors configured to project an image onto a floor or surface within a proximity of the robot. For example, the projectors can project a navigation symbol (such as an arrow) onto the floor to indicate to a user that the user should proceed in a particular direction indicated by the navigation symbol. Likewise, the projector can indicate a status or instruction, for instance instructing an individual to present a badge, presenting an indication that the user was authenticated or that the authentication failed, instructing the individual to stop moving, asking the individual if they need assistance, highlighting a requested product or object, and the like. The projectors can further project text, pictures, or icons associated with the robot or security information. For example, if a robot is guarding a passageway to prevent unauthorized users from entering the passageway, the robot can project a stop sign along with text indicating that the passageway is closed. The robot can also include a laser pointer, for instance to indicate a location of a product within a store.

The robot 100 can include one or more arms 740 for interacting with objects or individuals within a proximity of the robot. The arm can be an extendable boom arm, for instance that folds up against or retracts into the robot body when not in use. The robot arms can be used for instance to receive an object from or present an object to an individual, to press an elevator button, to move an object, to open or close windows or doors, to lock or unlock windows or doors, and the like. In some embodiments, a robot arm can include a camera, RFID reader, or other sensor. In such embodiments, the robot arm can be positioned or extended in order to provide a better position or vantage point for the camera, RFID reader, or other sensor. For example, an extendable robot arm equipped with a camera can be extended to capture video on the other side of an obstruction or wall, or to capture video of an area or crowd from a better vantage point. In embodiments where a robot arm is extended, the robot may reposition or balance itself to compensate for the shift in the center of gravity of the robot, for instance using inertial sensors (such as 3-axis gyroscopes, accelerometers, or magnetometers).

The robot 100 can also include one or more of: a spotlight or other lighting system for illuminating a room or area, strobe lights or other flashing lights to ward off intruders or otherwise deter particular behaviors of individuals, GPS receivers, sirens or alarms (which may be included within the audio system 724), beacon components configured to alert other robots, non-lethal deterrent components (such as tasers, tranquilizers, nets, tear gas, and the like), force or torque sensors (to detect the position and strength of contact between the robot and the environment or individuals within a proximity of the robot), civilian or police radios, fire extinguishers, emergency/assistance buttons or other interfaces (that enable users to call for help), emergency stop buttons or other interfaces (that enable users to immediately stop the movement of the robot), temperature sensors, light sensors, chemical/gas sensors, actuators configured to move any other components of the robot, or any other suitable components.

It should also be noted that the robot 100 includes component necessary to communicatively couple and control the components of the robot, including but not limited to: on-board computers, controllers, and processors; electric circuitry (e.g., motor drivers); computer memory; storage media (e.g., non-transitory computer-readable storage mediums, such as flash memory, hard drives, and the like); communication buses; cooling or heat dissipation systems; and the like.

Security Functions

As illustrated in the environment of FIG. 2, a set (or fleet) of robots can be deployed within a particular space, such as a building, a building floor, a campus, and the like. The set of robots 100 can be controlled by one or more robot operators, for via the central system 210 or the remote access interface 240, and can perform various security operations, for instance to augment existing security systems. For instance, an operator can directly instruct robots to perform various security operations via the robot interface 314 of the central system, or can implement one or more security protocols that include the performance of security operations by robots via the security engine 318. Likewise, a robot can perform one or more security operations, for instance in response to receiving an instruction from an operator or from the central system. A robot can receive instructions to perform security operations from the security system 734, for instance autonomously (without explicit instructions from an operator or other external entity) during the normal course of operations, for instance as part of a patrol routine, or in response to detecting suspicious activity or other circumstances that trigger one or more criteria for performing security operations.

The security operations described below can be combined with additional security operations. For instance, during the performance of any of the security operations below, a robot 100 can perform one or more of the following operations: warning one or more individuals, obstructing the movement of one or more individuals, reporting individuals or suspicious activity to an operator or security personnel 250, reporting security violations or object/infrastructure status to an operator or security personnel, recording or streaming video to an operator or external entity, locking doors or windows, sounding or triggering an alarm, calling the police or fire department, using non-lethal force to incapacitate an individual, querying one or more database to identify an individual or object, disabling a network or power to a portion of a building, summoning additional robots to assist with the performance of security operations, tracking or following an object or individual, displaying a status or information associated with security or detected activity, requesting information or credentials from individuals, and the like.

As used herein, "suspicious activity" can refer to the identification of an unknown individual, an unauthorized individual, an individual performing an unauthorized or unusual activity, movement in areas or at times when movement is not expected, unusual network activity, sound in areas where sound is not expected, types of sound associated with security risks, objects in unexpected or unauthorized locations, unlocked or open doors or windows at unauthorized times, or any other activity associated with a potential security risk or threat or combination thereof.

Further, as used herein, "boundary" can refer to a perimeter of an area into which an unauthorized individual is not permitted to enter. Accordingly, the crossing of a boundary by an unauthorized individual may be considered to be a security violation, and the robot 100 can perform one or more security operations in response. Boundaries can be predetermined (e.g., associated with pre-defined areas, for instance of a floor or building), can be permanent or temporary (e.g., can exist for particular time period or during a security event or mode), can be learned by the robot based on behaviors of individuals or based on boundaries defined in similar locations, or can be defined by users, operators, or security personnel 250. For instance, a security guard can drive a line on the ground using a laser pointer, and the robot can detect the line and establish the line as a boundary for the purposes of implementing a security policy or performing one or more security operations.

A. Patrolling

The robot 100 can perform a security patrol, for instance within a building or building portion, within a parking lot or other outside area, within a shopping mall or store, or within any other suitable location or premises. The path of a patrolling robot can be predetermined (e.g., based on pre-selected patrol routes defined by a security policy), or can be dynamic (e.g., based on detected suspicious activity, based on how recently an area was patrolled, based on a sensitivity or security associated with any area, based on a viewpoint/vantage point of an area, or based on any other security criteria). The path of a patrolling robot can also be determined for unknown or unmapped areas, for instance by determining a series of waypoints for the robot to follow, by scanning the area to identify nearby paths and obstacles, and by selecting additional waypoints based on the identified paths and obstacles.

In some embodiments, the robot 100 patrols a route periodically, rotates between multiple routes, or selects routes to rotate based on a security level associated with a route or area associated with a route. A route can also be selected based on a time of day, a history of suspicious activity or security violations associated with the route, based on a current security status or violation associated with a route or location, or based on any other suitable criteria. In some embodiments, a route is selected based on a proximity to a recharge station or based on an amount of available power to the robot. In some embodiments, a robot can pause patrolling a patrol route when the amount of power available to the robot falls below a threshold amount of power, can recharge at a nearby recharge station, and can continue patrolling the patrol route after recharged. In embodiments where the patrol route cannot be paused (for instance, when suspicious activity is detected), the robot can communicate with the central system 210 to locate another robot with sufficient charge to perform the patrol. Patrol routes can be randomly selected, for instance to increase the unpredictability of a patrolling robot for a potential unauthorized individual. A patrol route can also be manually selected by an operator of the robot (for instance, the operator can control the path of the robot in real time using a control mechanism).

In some embodiments, robots 100 generate maps as they patrol an area, while in other embodiments, robots access previously generated maps for use in identifying a patrol route. While patrolling, the robot can update a map to identify a route patrolled by the robot, beneficially enabling a robot operator to see the path of the robot. In some embodiments, if a path is blocked for a robot patrolling along a predetermined route, the robot can use a previously generated map to identify an alternative route to bypass the blocked path and to continue on the patrol route (for instance, a shortest alternative route). The robot can update a map to include a location of an obstructed path, to include a location of identified objects or individuals, or to include any other information associated with the patrol route.

While patrolling, the robot 100 can identify suspicious activity, can identify individuals or objects in proximity of the patrol route, and can identify a status of objects or systems along the patrol route. For instance, the robot can identifying suspicious sounds or motion, can determine a location of the identified sounds or motion, and can report the sounds or motion to an external entity (such as the central system 210 or security personnel 250). Likewise, the robot can identify objects and object types while patrolling, and can store or provide the location of the identified objects to an external entity, for instance, in conjunction with a map of the route.

Figure 9:
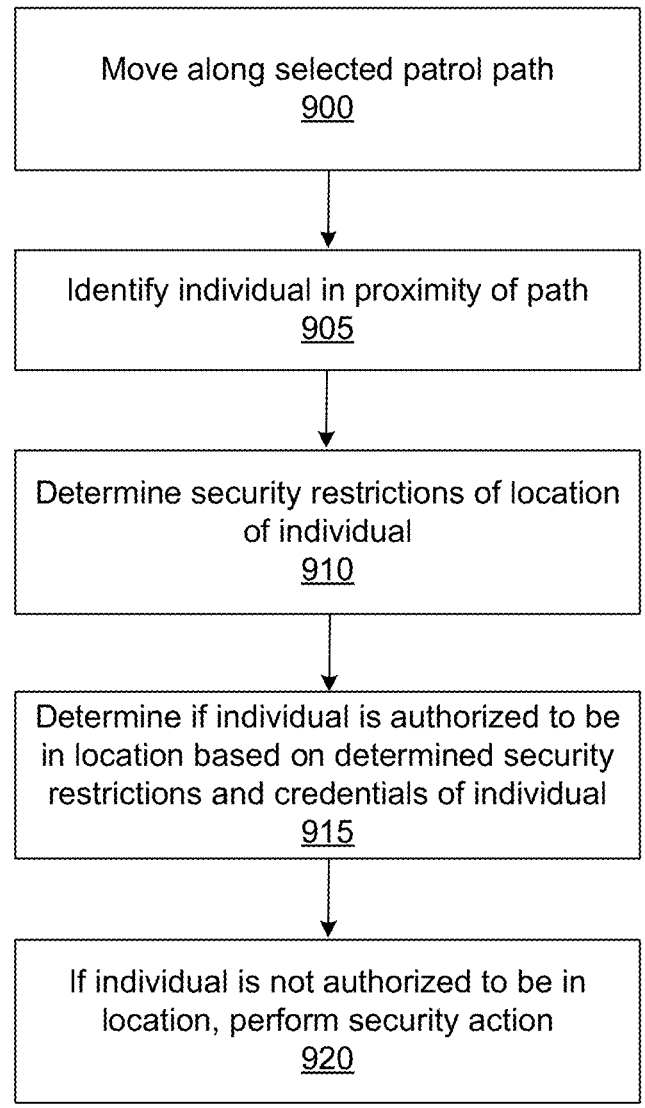
FIG. 9 is a flow chart illustrating a process for patrolling an area by a robot, according to one embodiment.

While patrolling, the robot 100 can perform one or more security operations in response to identifying suspicious activity or a security threat. For instance, a robot can flag the location of the identified activity or threat, can inform an external entity of the identifier activity or threat, or can perform any other security operation described herein. FIG. 9 is a flow chart illustrating a process for patrolling an area by a robot, according to one embodiment. In the embodiment of FIG. 9, a robot moves 900 along a selected patrol path. An individual is identified 905 in proximity to the path, and the security restrictions associated with the location of the individual are determined 910. For instance, the area can be restricted to individuals with particular security credentials, or can be off-limits for all individuals (for instance, during nighttime hours).

The robot 100 can approach the individual, and can request security credentials for the individual. Alternatively, the robot can remotely scan an RFID badge of the individual to determine the user's security credentials. The robot can determine 915 if the individual is authorized to be in the location based on the determined security credentials and based on the security restrictions associated with the location. In the event that the individual is not authorized to be in the location, the robot can perform 920 a security action. For example, the robot can alert security personnel, follow and monitor the individual, emit a siren, obstruct the movement of the individual, and the like. After the security incident has been resolved (e.g., the individual has left or been apprehended), the robot can continue with the patrol, or can return to a charging station.

B. Video Recording/Streaming

As noted above, the cameras 722 of the robot 100 can capture, record, and stream images and video. Captured images and video can be stored at the robot for subsequent uploading to an external entity (for instance, in the event that the robot is out of range or unable to connect to the network 200). Likewise, captured images and video can be streamed to an external entity (such as the central system 210) for storage or viewing by an operator or other user. In some embodiments, the robot stores video for periodic upload (e.g., once a day or once an hour), for times when the robot is charging at a charge station, or during any other suitable times. Video captured by one or more robots can be synchronized by the central system 210, and can be further synchronized with other video (such as video captured by one or more security cameras) and/or other security information (such as identities of individuals identified within the video or located within an area associated with the video) for subsequent synchronized playback to a user.

In some embodiments, the robot 100 can stream video constantly (for instance, during all times of operation). The robot can also capture and/or stream video selectively, for instance in response to being instructed by the central system 210 or an operator. In some embodiments, the robot captures and streams video in response to one or more criteria being satisfied. Examples of such criteria include: detected movement, suspicious activity (e.g., an unidentified individual or an individual performing an unauthorized action), detected sound when no sound is expected (e.g., during night time operation), suspicious sound (e.g., broken glass), in response to a security incident detected by the robot or other robots, in response to the implementation one or more security policies, or based on any other suitable criteria. In some embodiments, the robot can provide images to the central system during normal operation, and can provide video to the central system only in response to the detection of a security anomaly, in response to a request or instruction from an operator, or in response to any other suitable criteria.

C. Individual/Group Monitoring

The robot 100 can be configured to detect and identify individuals. For instance, the robot can capture images or videos of the individuals using the cameras 722, and can perform facial recognition on the captured images or videos. Likewise, the robot can identify a height or size of the individual, or can scan a badge of the individual (for instance, using an RFID reader). Individuals can be identified by comparing detected characteristics of the individuals with an identity database. For instance, an image of a detected face can be compared against a database of detected facial characteristics associated with individual identities to identify an individual. The identity database can be local (e.g., a database of a building's occupants or company's employees), or can global (e.g., a police database of known criminals). The identity database can also include identities of individuals not permitted to be in a particular area (such as a blacklist).

The robot 100 can take various actions in response to identifying an individual. For instance, if a robot detects an individual, identifies the individual, and determines that the individual is authorized to be at the detected location (e.g., the individual is an employee of a company associated with the building in which the robot is located), then the robot can log the detection and identification of the individual with no further action. On the other hand, if the robot determines that the identified individual is not authorized to be in a particular location (e.g., the individual is an employee of the company, but is in an off-limits area of the company's building), the robot can warn the individual, can instruct the individual to leave the area, can obstruct the individual, can lock nearby doors, can trigger an alarm, can call other robots or security personnel 250 to investigate or intercept the individual, or can perform any other suitable security operation. Likewise, the robot can perform one or more of the security actions described herein in response to being unable to identify the individual.

The robot 100 can monitor multiple individuals. For instance, the robot can identify one or more individuals in a group of individuals, and can track the identified individuals within the group. In some embodiments, the robot can monitor very large groups, such as crowds at a conference or concert. The robot can monitor statistics associated with the group, for instance to determine a number of individuals within the group, to determine an approximate size or floor space required by the group, and to monitor objects carried by or associated with the group. In some embodiments, the robot can determine and monitor a mood of the group, for instance by determining if the group is angry and/or violent or likely to become violent (based on words spoken by members of the group associated with anger or violence, based on detected actions performed by members of the group associated with anger or violence, and the like). The robot can perform one or more security operations in response to monitoring the group, for instance by notifying security personnel 250 if the group becomes violent, by activating fire sprinklers or other group deterrents, band the like. Beneficially, the monitoring of individuals, for instance in an area, can be used by building planners to provide insight into the movement of people in the area for the purposes of space planning.

D. Motion Detection and Action Recognition

The robot 100 can detect motion within a proximity of the robot, for instance using the cameras 722 or using a dedicated motion detection sensor. One or more actions can be taken based on the detected motion. For instance, if the motion is detected in an area where no motion is expected (such as a secure room, a building during off-hours, or the like), the robot can notify security personnel 250, can interact with a building in which the robot is located (for instance, to lock nearby doors), or can investigate further. In some embodiments, the robot can determine if the detected motion is associated with an individual or is associated with an object (such as wind blowing papers off a desk), and one or more security actions can be taken in response to the determination.

In some embodiments, the robot 100 can identify an action associated with a detected movement, for instance if the detected movement is determined to be associated with the individual. For example, the robot can determine if the individual is running, walking, standing, carrying an object, holding a gun, attempting to access a location (e.g., trying to open a door or pass through a security gate), interacting with an object (such as a control panel or a desk drawer), taking a picture or recording video, placing an object (such as an item for sale within a store, or paperwork located on a desk) in a pocket or bag, and the like. The action can be identified by comparing information about the detected movement with a database of detected movements and corresponding action identifiers. The robot can perform one or more security operations based on the identified action. For instance, if an individual is running in an area with dangerous equipment, the robot can instruct the individual to slow down. Likewise, if an individual is holding a gun, the robot can attempt to obstruct the individual.

E. Object Recognition

The robot 100 can detect objects within a proximity of the robot, for instance by capturing images of the objects and analyzing the images to identify the objects within the images. The robot can perform one or more security operations in response to the detected objects. For instance, in the event that an object is not in a location it is supposed to be in, the robot can relocate the object or can alert security personnel of the location of the object. Likewise, in the event that an object is broken or malfunctioning (such as an overflowing sink), the robot can attempt the repair the object, or can notify security personnel of the object.

In some embodiments, the robot 100 can detect license plates within a parking garage or parking lot, and can flag license plates of vehicles that are not authorized to be in the parking garage or lot. For instance, a robot, during the course of a patrol of a parking garage, can scan the location of every license plate in the garage, can query a database of authorized license plates, and can flag scanned license plates that are not included within the database. The robot can then inform security personnel 250 of the unauthorized vehicle, can move to a location blocking the vehicle from moving, or can attach a wheel lock to one or more of the vehicle's wheels.

F. Escorting, Following, Observing, and Access Control

The robot 100 can escort one or more individuals located within a proximity of the robot to a new location. For instance, an individual can be authorized to be in a first portion of a building but not a second portion (such as a contract worker, an external maintenance individual, or an employee with limited security credentials). In such embodiments, the robot can escort the individual from one location to another location in order to ensure that the individual does not cross into an area the user is not authorized to be. For example, a maintenance worker can be working to repair networking equipment and may have to use the restroom. In such embodiments, the worker can inform the robot of the need to visit the restroom, and the robot, in response, can identify the location of the restroom to the worker, can project a path on the ground to the restroom, can project boundaries on the ground that the worker is not allowed to cross, can warn the worker if the worker crosses the boundary, can instruct the user to "follow me", can wait while the worker uses the restroom, and can escort the worker back to the location of the networking equipment. In some embodiments, the robot can escort an individual for the entire time a worker is within a building or location, while in other embodiments, the robot can escort an individual between locations.

The robot 100 can also follow detected individuals, for instance closely (within a threshold distance) or from a distance (greater than a threshold distance). For instance, if an individual is detected within a building, and the robot is unable to verify the identity of the individual, the robot can follow the individual until the identity of the individual is verified, until security personnel 250 arrive, or until the individual leaves the building. It should be noted that escorting and following individuals for extended periods of time can be particularly tedious for humans to perform, and so implementing one or more robots to perform such tasks can free up humans for other tasks that robots are unable to perform. Further, by following or escorting an individual, the robot 100 can beneficially act as a deterrent for unauthorized behavior by the individual.

In some embodiments, individuals can be followed, escorted, and tracked by the robot 100 by performing facial detection on the individuals to verify that the correct individual is being followed, escorted, or tracked. The location of individuals being followed, escorted, or tracked can be monitored by the robot, can be provided to an external entity (such as the central system 210), or can be updated on a map of the area or building (for instance, in real-time). In addition, the robot can provide information to the individual, for instance in response to request from the individual.

Figure 10:
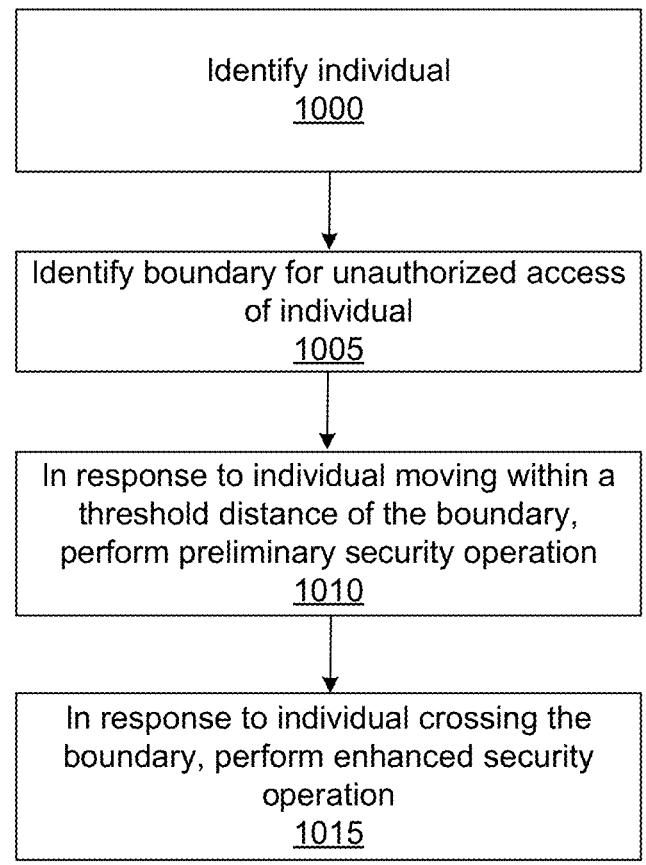
FIG. 10 is a flow chart illustrating a process for monitoring the movement of an individual, according to one embodiment.

In the event that an identified individual being followed, escorted, or tracked performs an unauthorized action or commits a security violation, the robot 100 can perform one or more security operations in response. FIG. 10 is a flow chart illustrating a process for monitoring the movement of an individual, according to one embodiment. An individual is identified 1000 by the robot. A boundary associated with an area that the individual is not allowed to access is identified 1005. For instance, if a user is permitted to be in a first portion of a room but not a second portion, the robot can determine that a boundary exists around the portion of the room that the individual is not allowed to access.

In response to the individual moving 1010 within a threshold distance of the identified boundary, the robot 100 can perform a preliminary security operation. For instance, the robot can move to intercept the individual to obstruct and prevent the individual from crossing the boundary. Likewise, the robot can issue a warning to the individual, can project the boundary on the ground to inform the individual of the area that individual cannot cross, and can inform necessary security personnel of the potential security violation. In response to the individual crossing the boundary, the robot can perform 1015 an enhanced security operation. For instance, the robot can emit a siren, can request the presence of security personnel, can call the police, or can lock nearby doors. In some embodiments, in response to notifying security personnel or an operator of the proximity of the individual to the boundary, or the crossing of the boundary by the individual, the robot can receive authorization for the individual to cross the boundary, and the robot can permit the individual to continue without performing further security operations. It should be emphasized that in some embodiments, the robot may perform an enhanced security operation in response to the individual moving within the threshold distance of the boundary, or may not perform a security operation until the individual crosses the boundary.

In addition, a robot 100 can act as a sentry to control access to a particular area, a building portion, a room, a doorway, a hallway, a floor, an elevator, and the like. The robot can stay within a proximity of the location being monitored, and can physically impede individuals from accessing the location. If an individual approaches the robot (for instance, within a threshold distance from a location of the robot), the robot can warn the user not to cross a boundary associated with the location being monitored, can project a boundary onto the floor around the location, can request credentials from the individual, by moving to mirror the individual's movement (to prevent the individual from bypassing the robot), or by performing any other suitable actions. In the event the individual persists and attempts to or succeeds in bypassing the robot, the robot can perform an enhanced security operation, for instance by notifying security personnel 250, by following the individual, by triggering an alarm, by locking nearby doors, or by performing any other security operation. It should be noted that "enhanced security operation" as used herein can refer to a first security operation more likely to result in preventing a security violation than a second security operation.

G. Interaction with Building Infrastructure

Figure 11:
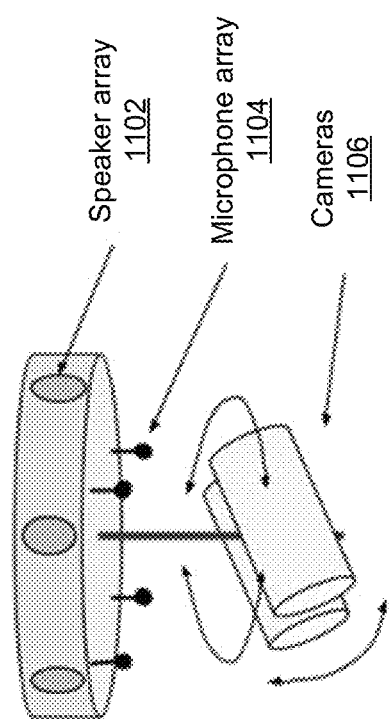
FIG. 11 illustrates an infrastructure camera array, according to one embodiment.

The robot 100 can interact with one or more hardware systems or other infrastructure of a building, campus, site, or the like. An example of such hardware systems includes a camera array. FIG. 11 illustrates an infrastructure camera array, according to one embodiment. The camera array of FIG. 11 includes a speaker array 1102, a microphone array 1104, and cameras 1106, though in other embodiments, the camera array includes fewer, additional, or different components than those shown in FIG. 11. The camera array further includes a wireless transceiver configured to receive information from the robot (for instance, instructions to record video or to change a field of view of the camera array, or audio to play over the speaker array) and to transmit information to the robot (for instance, video captured by the camera array streamed in real-time, or audio captured by the microphone array). The camera array can be connected to the robot through a building network, such as the network 200. The camera array can be physically attached at various locations within a building, for instance to a ceiling or wall in each of a set of rooms of a building, in areas with strategic vantage points, or near hallways, doors, or entry points.

Figure 12:
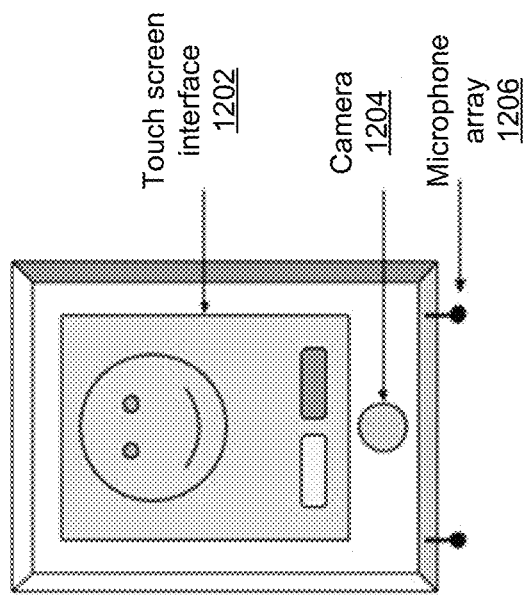
FIG. 12 illustrates a building computing system, according to one embodiment.

Another example of a hardware system with which a robot 100 can interact is a building computing system. FIG. 12 illustrates a building computing system, according to one embodiment. The computing system of FIG. 12 includes a touch screen interface 1202, a camera 1204, and a microphone array 1206, though in other embodiments, the touch screen interface includes fewer, additional, or different components than those shown in FIG. 12. The computing system further includes a wireless transceiver configured to receive information from the robot (for instance, information for display on the touch screen interface, such as information associated with the robot, an authentication request for an individual, or the like) and to transmit information to the robot (such as inputs received from an individual via the touch screen interface, video captured by the camera, or audio captured by the microphone array). The computing system can be connected to the robot through a building network, such as the network 200. The computing system can be physically attached to a wall of the building, for instance next to a door, hallway, or other access point.

Additional examples of hardware systems with which a robot 100 can interact include an alarm system, connected doors and windows, access gates, connected locks, security gates, computer systems, network systems or components, fire alarms, elevators, or any other connected object or system within a building or location. The robot can interact with one or more hardware systems of a building, for instance while patrolling a route within the building, in response to detecting suspicious activity, in response to detecting an unidentified or unauthorized individual, in response to determining that an individual violated a security policy, in response to detecting that a building object is misplaced or is in violation of a security policy, or in response to any other suitable criteria. In such instances, the robot can communicatively couple to a hardware system of the building (for instance, via the network 200) in order to leverage the capabilities or functionality of the hardware system to perform one or more security operations.

Figure 13:
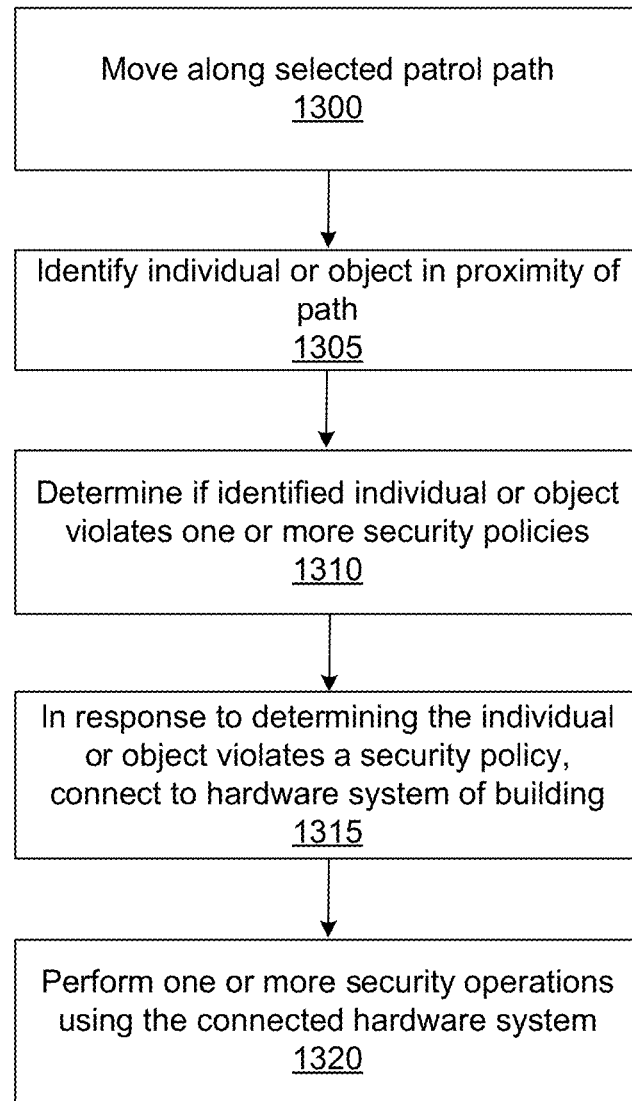
FIG. 13 is a flow chart illustrating a process for using building infrastructure to perform security operations, according to one embodiment.

FIG. 13 is a flow chart illustrating a process for using building infrastructure to perform security operations, according to one embodiment. In the embodiment of FIG. 13, a robot moves 1300 along a selected patrol route. It should be noted that in some embodiments, the process of FIG. 13 may be performed by a robot that isn't patrolling, but rather that is stationary, recharging, or guarding an area or location. The robot identifies 1305 an object or individual, for instance, within a proximity of the patrol route.

In response to identifying the object or individual, the robot determines 1310 if the identified object or individual violates one or more security policies. For example, the robot can determine that the individual or object violates a security policy if the individual is unidentified, if the individual is not permitted to be in a particular location or portion of a building, if the individual does not possess the proper security credentials (for instance, if the user is not in possession of an RFID badge), if the user is performing an unauthorized action, if the user is blacklisted from a location, if the user is in possession of an unauthorized object, if the object is misplaced or located in an unauthorized location, if a status of the object is unauthorized (e.g., if a door that is supposed to be locked is unlocked), if an object is broken or malfunctioning, or based on any other security policy violation criteria being satisfied by the individual or the object.

In response to determining that the individual or object violates a security policy, the robot 100 can connect 1315 to a hardware system of a building, and can perform 1320 one or more security operations using the connected hardware system. For instance, the robot can communicatively couple to a central system 210, an infrastructure system 220 (such as an elevator system or power system of the building), or a security system 230 (such as a camera array located within the building). In some embodiments, the robot communicatively couples to a system selected based on a type of security policy violation. For instance, if the robot determines that an individual's movement or location violates a security policy, the robot can communicatively couple to a camera array associated with the location of the individual to control the camera to capture video of the individual or to follow the movement of the individual. Likewise, if the robot determines that a malfunctioning network component violates a security policy, the robot can communicatively couple to a network controller or the central system in order to reset the network component.

In some embodiments, the robot 100 communicatively couples to the central system 210 upon detecting the security policy violation in order to inform a user of the central system or an operator of the robot of the security violation in order to allow the user or operator to take an action in response to the detected security violation. In some embodiments, the object determined to violate the security policy is the hardware system to which the robot communicatively couples. For example, if the robot determines that a door being unlocked violates a security policy, the robot can communicatively couple to the door in order to lock the door (for instance, in embodiments in which the door is connected to the network 200 is capable of directly coupling to the robot). In some embodiments, the hardware system to which the robot connects is another robot. In such embodiments, the robot can provide instructions to the second robot in order to perform one or more security operations. For instance, the set of robots can corner or obstruct an individual determined to have violated a security policy.

In some embodiments, in response to detecting that an individual violates a security policy, the robot 100 can control a camera array to adjust the orientation of the camera array to capture video of the individual. In such embodiments, if the individual outruns the robot or hides such that the robot does not have a direct line of sight to the individual, the robot can use the video footage captured by the camera and streamed to the robot to locate the individual. The robot can then approach the individual, can report the location of the individual to one or more security personnel 250, or can instruct a second camera to capture video of the user (for instance, in response to the individual moving outside of the range of the camera array).

In addition, the robot can perform 1320 security operations including but not limited to: sounding an alarm, triggering a fire sprinkler system, closing or locking doors or windows, locking access gates, accessing computer system databases, reporting the violation of the security policy and any associated information to a local authority (such as the police), halting elevator systems, resetting or freezing network systems, and the like. It should also be emphasized that a robot can communicatively couple with a building hardware system in order to perform one or more operations using the connected hardware system without requiring the detection of a security violation. For example, the robot can determine that the temperature of a room is below a threshold value, and connect to a furnace system in order to increase heat flow into the room. Likewise, the robot can detect smoke and can connect to windows and a building sprinkler system in order to open the windows (to vent the smoke) and to turn on the sprinkler system (in order to extinguish the fire). In some embodiments, the robot can determine that an object (such as an item for sale in a store) is misplaced, and can communicatively couple to an inventory database in order to update the location of the object and to a cashier's computer system in order to inform that cashier that the object is misplaced.

In some embodiments, the robot 100 can perform a security operation, and a building hardware system can perform a security operation or other action based on the result of the security operation performed by robot. For instance, the robot can verify the identity or the credentials of an individual (for instance, by performing a face detection operation on the individual, by scanning the individual's identity badge, or by receiving a password or code from the individual), can communicate the verified identity or credentials to a connected access gate or door, and the access gate or door can unlock or open in response to receiving the identity or credentials. Similarly, the robot can determine that an individual is suspicious, can inform a security camera of the detected suspicious individual, and the security camera can record video of the individual in response.

In some embodiments, the robot 100 can perform a security operation in response to a security operation performed by a hardware system of a building. For instance, if a security camera detects a suspicious individual, the security camera can deploy a mobile robot to approach or follow the individual, to request the user's credentials, or to warn the individual. Likewise, if an audio system detects a suspicious noise, if a connected door detects that an individual attempted to open the door, or if a connected badge reader scans a badge for an individual that is not authorized to access a location associated with the badge reader, a robot can be deployed to perform one or more security operations associated with the security operation performed by the hardware system. It should be noted that a robot and a hardware system can perform security operations as described herein autonomously or without the explicit instructions or involvement of a human (such as a security personnel 250 or an operator of the robot), beneficially reducing the amount of human interaction required to perform the security operations.

H. Anomaly Detection

The robot 100 can detect security anomalies, for instance while patrolling within a building. As used herein, a security anomaly refers to a circumstance that might represent a security risk. Security anomalies can be detected using one or more sensors or systems of the robot, or may be detected based on data received from one or more systems external to the robot, such as from the central system 210, an infrastructure system 220, or a security system 230. A security anomaly can be identified based on accessed information describing a characteristic of an environment contrary to an expected characteristic of the environment. Upon detecting a security anomaly, the robot can perform one or more security operations, for instance to contain or mitigate the security risk corresponding to the security anomaly.

An example of a security anomaly is the detection of a sound that may indicate a security risk. The detected sound may indicate a security anomaly based on the type of sound detected. For instance, if a robot 100 detects the sound of broken glass, the robot can identify the detected sound as indicative of a security risk, and thus a security anomaly. Examples of detected sounds that can indicate a security anomaly include but are not limited to: windows opening, glass breaking, doors opening or closing, gun shots, walking footsteps, running footsteps, car sounds, shouting, water running, hissing (as from gas), and sounds that are an above-threshold magnitude. Likewise, if a robot detects a human voice in an area where no individual is present, the robot can identify the detected voice as a security anomaly. In some embodiments, any detected sound above a threshold magnitude can be identified as a security anomaly (for instance, in secure environments where individuals are not authorized to enter).

In some embodiments, security anomalies can be detected using cameras of the robot 100 or of a security system 230. For instance, a security anomaly can be detected if the robot detects an individual at a time or place where no individuals are expected to be present, if the robot identifies an individual that is blacklisted or is otherwise not authorized to be a particular location, if the robot identifies an individual taking an action that is not expected or authorized, if the robot identifies a broken or open window, if the robot detects an unlocked or open door when the door is supposed to be closed or locked, if the robot detects an object that is out of place, or the like. In some embodiments, a security anomaly can be detected based on detected or intercepted communications, wireless signals, or the like.

In response to detecting a security anomaly, the robot 100 can perform one or more security operations. For example, in response to detecting a sound indicative of a security anomaly, the robot can investigate the detected sound, can inform the central system 210 of the detected sound, or can instruct nearby security cameras to record video of the location where the sound was detected. Likewise, in response to detecting an individual in a location where there individual is not authorized to be, the robot can warn, follow, or confront the individual; can request security personnel 250 to come investigate; and can lock nearby doors to prevent the escape of the individual. In addition, in response to detecting a broken window, the robot can update a semantic map to indicate that the window is broken, or can summon security personnel to come replace the window. In response to detecting an unlocked door (at a time when the door is supposed to be locked), the robot can lock the door (either remotely in the event that the door is connected to the network 200, or manually otherwise) and can instruct nearby robots, cameras, and security personnel to be on the lookout for unauthorized individuals responsible for the door being unlocked that might be in the area. In some embodiments, the central system 210 can, in response to the detection of a security anomaly by a robot, increase patrols to the location associated with the detected security anomaly for a threshold amount of time, for instance, for an hour.

I. Aerial Systems

As noted above, in some embodiments the robot 100 or the other components of FIG. 2 can coordinate with one or more aerial systems or UAVs. The aerial systems can include many components in common with the robot 100, for instance a pan/title camera or camera array, an RFID reader or other DoA or reader antennas, a communication interface, various indicators, microphones, speakers, motion detection systems, laser rangefinders, IR sensors, a security engine, a semantic mapping engine, an RFID engine, and the like. In addition, the aerial systems can include an aerial navigation system, propellers, collision avoidance mechanisms, and the like. In other words, the aerial systems can perform many of the same functions as the robot 100, but with the added benefit of being able to move in three dimensions, fly over obstacles, scan/patrol hard-to-reach areas from better vantage points or perspectives, and perform other functions enabled by flight. It should be noted that while various functionalities described herein are limited in description to robots, such functionalities can equally apply to aerial vehicles.

In some embodiments, the aerial robots can land on and perch on ledges, surfaces, or objects and disable flight mechanisms (such as propeller spinning, navigation components, and the like). Perching enables the aerial robots to perform various security operations (such as recording video) from a better vantage point than the robot 100, while also saving the power otherwise required to maintain altitude or otherwise fly. When the aerial robot subsequently needs to recharge or move, the aerial robot can enable flight mechanisms and fly away as needed.

In some embodiments, aerial vehicles can land on and couple to charging stations in order to charge the batteries of the aerial vehicles. The charge station can include a coupling component and the aerial vehicle can include a reciprocally coupling component, such that the aerial vehicle charges when the coupling component is coupled to the reciprocally coupling component. In some embodiments, the aerial vehicles autonomously fly to the nearest charge station when the battery power available to the aerial vehicle falls below a threshold. In some embodiments, the robot 100 can include a charge station and/or launch/landing pad, and the aerial vehicle can fly to the nearest robot to recharge as needed. In yet other embodiments, an aerial vehicle can be tethered (e.g., connected to a power source via a cable) to either a charge station, robot, or other power source, beneficially enabling the aerial vehicle to have an unlimited or much greater power supply at the cost of mobility.

In some embodiments, the aerial vehicle can be wirelessly recharged, for instance using inductive recharging. In such embodiments, the landing pad or charge station can include a first inductive coil and the aerial vehicle can include a second inductive coil such that an electromagnetic field created by the first inductive coil can create energy in the second inductive coil which can then be used to charge the batteries of the aerial vehicle. In some embodiments, aerial vehicles can be wirelessly charged while in flight or remote from charge stations.

In some embodiments, the aerial vehicles can be manually controlled (for instance, by a user of the central system 210 or other aerial vehicle operator). In such embodiments, the operator of the aerial vehicle can control the location, movement, flight, and functionality of the aerial vehicle. For example, if a robot 100 detects a security anomaly or unidentified individual, the robot can launch an aerial vehicle to investigate the security anomaly or unidentified individual. The location and/or field of view of aerial vehicles can be displayed to a user of the central system, for instance within a security interface map.

In some embodiments, the aerial vehicles can be launched and controlled by a robot 100, for instance, in response to a determination by the robot during the patrolling of a route that an obstruction (such as a wall or barrier) prevents the robot from being able to adequately observe or monitor an area. In such embodiments, the robot can launch an aerial vehicle from the robot or from an aerial vehicle launch pad or charge station, the aerial vehicle can scan the area and can provide information about the scan to the robot, the aerial vehicle can return to the point of origin (the robot, the launch pad, the charge station, etc.), and the robot can perform a security operation based on the information received from the aerial vehicle (if necessary) or can continue with patrolling the route.

The aerial vehicle can record sound or video while in flight, and can stream the recorded sound or video (for instance, either directly from the aerial vehicle to the central station 210 via the network, or by via the robot 100, which in turn can broadcast the recorded sound or video). Likewise, the aerial vehicle can record, store, and/or broadcast other data captured by other sensors, information related to security operations or the operation of the aerial vehicle, or any other suitable information as needed to the robot or the central system. The video, audio, or other information captured by the aerial vehicle can be played or displayed to a user of the central system, for instance within a security interface portion.

In some embodiments, the aerial vehicle can receive security operation instructions from the central system 210, and can perform one or more security operations in response. For instance, the aerial vehicle can patrol routes in response to an instruction received directly from the central system. Likewise, the aerial vehicle can scan RFID badges in a particular location in response to an instruction received from the robot 100, which in turn received the instruction to identify all individuals within the location. In such embodiments, the aerial vehicle can perform the functionalities of the robots or security systems described herein.

J. Central System Operation

The central system 210 can interact with one or more robots 100 and other infrastructure systems 220 and security systems 230 to perform one or more security operations. The central system can receive data from the one or more robots, infrastructure systems, and security systems; can aggregate, normalize, or otherwise format the received data; and can display the formatted data within an interface. Security interfaces are described below in greater detail. The central system can also request particular data from particular robots, infrastructure systems, or security systems; can instruct robots, infrastructure systems, and security systems to perform one or more security operations, either independently or in concert with other robots, infrastructure systems, or security systems; or can implement one or more security policies. It should be noted that the functions of the central system described herein can be performed in response to input from a user or operator of the central system, or without receiving inputs from a user or operator (for instance, autonomously or in response to detected security criteria that trigger the performance of security operations).

The central system 210 can aggregate sensor data from one or more robots 100, infrastructure systems, or security systems. For instance, the central security system can receive locations of individuals within a building from multiple robots and security cameras, and can combine the location information to determine refined locations of each individual within the building. Likewise, the central system can interpolate data received from multiple sources, for instance by averaging temperatures detected in each room in a building to determine an average temperature for each room. Finally, the central system can receive information describing a state of one or more objects in a location, for instance the power levels, capabilities, or locations of each robot within a building.

The central system 210 can manage multiple maps for a location, for instance stored building maps and blueprints, semantic maps describing a building or area, and simultaneous location and mapping (or "SLAM" maps) generated by a robot 100 or other system configured to scan a location or area. In some embodiments, the central system can coordinate between multiple maps of the same location, for instance by updating older maps to include the location of objects that newer maps indicated have moved, or by incorporating types of information present in a first map but not a second map into the second map (for instance, the location of windows, whether a door is locked or unlocked, or the location of security cameras).

The central system 210 can implement one or more security policies, such as a building security policy. For instance, a security policy can specify one or more security criteria, such as: patrol routes within a building, can specify a frequency of patrolling each route, can specify access credentials required for an individual to be in one or more portions of the building, can specify acceptable threshold values or ranges for sensors within the building (such as minimum or maximum temperatures, sound magnitudes, characteristics of video data captured by cameras), can specify acceptable or forbidden actions or activities for individuals within one or more building portions, can define geofences describing portions of a building that can be accessed or that are off-limits (for instance, by time, by access credential), and the like. In some embodiments, the security criteria are time-dependent, and can vary based on whether the current time falls within a time range specified for the security criteria.

In implementing the security policy, the central system 210 can instruct one or more robots 100 to perform a task (such as patrol a route or intercept an individual that isn't authorized to be in a particular location), can instruct security cameras to change viewpoint and/or capture video of a location associated with a potential violation of a security policy, can request sensor data detected by one or more infrastructure systems 220 or security systems 230, and the like. In some embodiments, security policies can be implemented in response to the detection of one or more security criteria. For instance, if an individual is detected in an off-limits portion of a building or a suspicious sound is detected, the central system can dispatch one or more robots or security personnel to investigate.

As noted above, the central system 210 can also instruct one or more robots 100 and/or one or more infrastructure systems 220 or security systems 230 to perform a security operation in response to a request from a robot, in response to receiving information from a robot (such as information indicative of a security violation or threat), or in response to a request or information from an infrastructure system or security system. The central system can prioritize security operations, and can instruct the one or more robots, infrastructure systems, and security systems to perform security operations based on the priority of each security operations. For instance, if the central system identifies ten security operations that need to be performed by five robots, the central system can prioritize the ten security operations, and can instruct the five robots to perform the five highest priority operations first, and when those operations are complete, can instruct the robots to perform the remaining five security operations. The central system can account for the capabilities and availability of each robot, infrastructure system, and security system before instructing these robots and systems to perform security operations. For instance, the central system can determine that of two robots, a first is able to perform a particular operation (such as an IR scan) and a second isn't, and can instruct the first robot to perform the operation (and not the second, even if the first robot is currently occupied).

The central system 210 can record and store data received from one or more robots 100, infrastructure systems 220, and security systems, for instance within log files in memory accessible to the central system. In addition, the central system can report or log any suspicious activity, detected security anomalies, detected threats or alerts, or any potential or actual violations of security policies, for instance to security personnel 250 or to an operator or user of the central system. The central system can also coordinate communications between components of the environment of FIG. 2, for instance by receiving messages from one or more of the systems and routing the message if needed to one or more other systems. In doing so, the central system can synchronize information, for instance by applying time stamps to the information, by aggregating the information by time, and by routing messages in chronological order based on the time of the aggregated information or based on the time each message was received.

As noted above, an implementation of the central system 210 can present a security interface to an operator. The operator can review data provided by the robots 100, infrastructure systems 220, and security systems 230 and presented within the interface. The information presented by the security interface can be updated in real-time, for instance reflecting updated information received from the robots, infrastructure systems, and security systems. For example, the security interface can update the location of the robots within a building in real-time. The operator can coordinate the actions of multiple robots, can assign patrol routes to robots and can alter patrol routes as the robots are patrolling the routes, can dispatch robots to investigate security anomalies or suspicious activity, and can assign particular security operations to particular robots.

The central system 210 can notify security personnel 250 or other individuals or groups to inform the security personnel of security violations, suspicious activities, security anomalies, and the like. For instance, the central system can send text or SMS messages, emails, or voice calls to security personnel, to police, to a company's employees or managers, and the like. Likewise, the central system can field queries from robots 100, infrastructure systems 220, security systems 230, security personnel 250, users of a remote interface 240, and the like, and can provide information gathered by the central system in response to the queries. For example, the central system can provide a map of all RFID readings as detected by a fleet of robots to a requesting entity. Likewise, the central system can store and provide a WiFi heat map, a temperature map, and the like to users of the central system, and can generate (either periodically, automatically, or in response to user request) reports of anomalies, security events, patrol coverage, or building properties for review by users of the central system.

In some embodiments, the robots 100 may not include the necessary computing power to perform certain functions (or may include the necessary computing power but may not be able to perform such functions in a time-efficient manner), including both security operations (such as facial detection) and non-security operations (such as national language processing). In such embodiments, the robots can request that the central system 210 (which may include greater processing capabilities and resources) to instead perform such functions. For example, a robot can receive a request from a user asking "How do I get to the conference room?", and can send the recorded voice sample to the central system, which can parse the voice signal and determine the user's intent. Continuing with this example, the central system can identify a set of navigation instructions to the conference room to the robot, and the robot can provide the navigation instructions to the user. Likewise, a robot can request that the centralized server compress data, perform video processing tasks, to stream video to other robots or entities, to perform machine learning tasks, or to perform any other processing- or resource-intensive tasks, and can provide the data to perform such tasks to the central system. The central system can also access a building's or company's databases or processing resources (such as servers or other computer systems), for instance to identify an individual within a building or to use the accessed processing resources to perform a computationally-intensive task.

Figure 14:
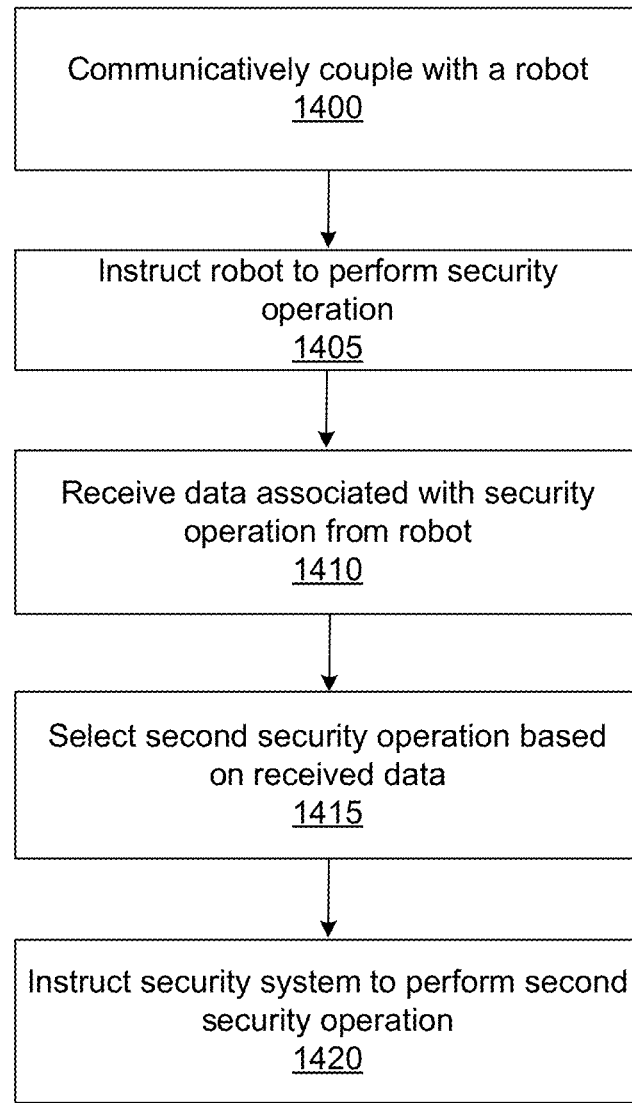
FIG. 14 is a flow chart illustrating a process for controlling a security robot by a central system, according to one embodiment.

FIG. 14 is a flow chart illustrating a process for controlling a security robot by a central system, according to one embodiment. The central system 210 communicatively couples 1400 with a robot 100. The central system then instructs 1405 the robot to perform a security operation. In some embodiments, the central system instructs the robot to perform an ordered set of operations, and the robot maintains the set in a queue, and begins performing the first operation in the set. The security operation can be any operation described herein, for instance a patrol route, investigating a noise, scanning an individual's badge or otherwise authenticating an individual, and the like. The central system receives 1410 data associated with the security operation from the robot. Examples of such data include video captured while patrolling a route, the identity of an investigated individual, and the like.

The central system 210 can select 1415 a second security operation based on the data received from the robot while performing the security operation. For instance, if the data received from the robot is video, and the video indicates an unauthorized individual is located in a portion of the building, the second security operation can be an authentication operation (to authenticate the identity of the individual), a video recording operation (to record video of the individual), and the like. The central system can instruct 1420 a security system to perform the second security operation. In some embodiments, the security system is the robot, and the robot can immediately begin performing the second security operation, can perform the second security operation after completing the original security operation, or can slot the second security operation into the queue of security operations maintained by the robot (for instance, at the front of the queue, at a location within the queue corresponding to the priority of the second operation, or at the end of the queue). In other embodiments, the security system is a system other than the robot, which can likewise immediately perform the second security operation, or can queue the second security operation based on the priority of the second operation.

Although the central system 210 is described herein as a single entity, it should be noted that in some embodiments, the central system can include any number of systems operating in concert. For instance, the central system 210 can be implemented within a data center, by several communicatively coupled servers, or the like. Finally, it should be noted that in some embodiments, the tasks performed by the central system may instead be performed by other components of the embodiment of FIG. 2, by systems configured to directly communicatively couple with each other (for instance, the robot 100 and a security camera system), or by two or more robots configured to communicatively couple with each other.

K. Security Interface

As noted above, the central system 210 can display a security interface that includes various security information and data from the components of FIG. 2. Although the security interface can be displayed by other components of FIG. 2 (such as the remote interface 240) or other systems not illustrated in FIG. 2, the remainder of the description herein will reference the display of the security interface by the central system for the purpose of simplicity.

The security interface can include a number of portions, and each interface portion can display a set of security information. For example, an interface portion can display a map of a building or area, robot status information, robot video streams, security camera video streams, security notifications, a list of individuals within an area, a list of security personnel 250 within an area, security policy violation information, video chat streams (for instance, for an individual speaking to a robot 100), communication information, infrastructure system status information, security system status information, a list of available security operations (for assignment to a robot, infrastructure system 220, security system 230, or security personnel), a list of security operations being performed or queued, security operation status information, and the like.

Figure 15:
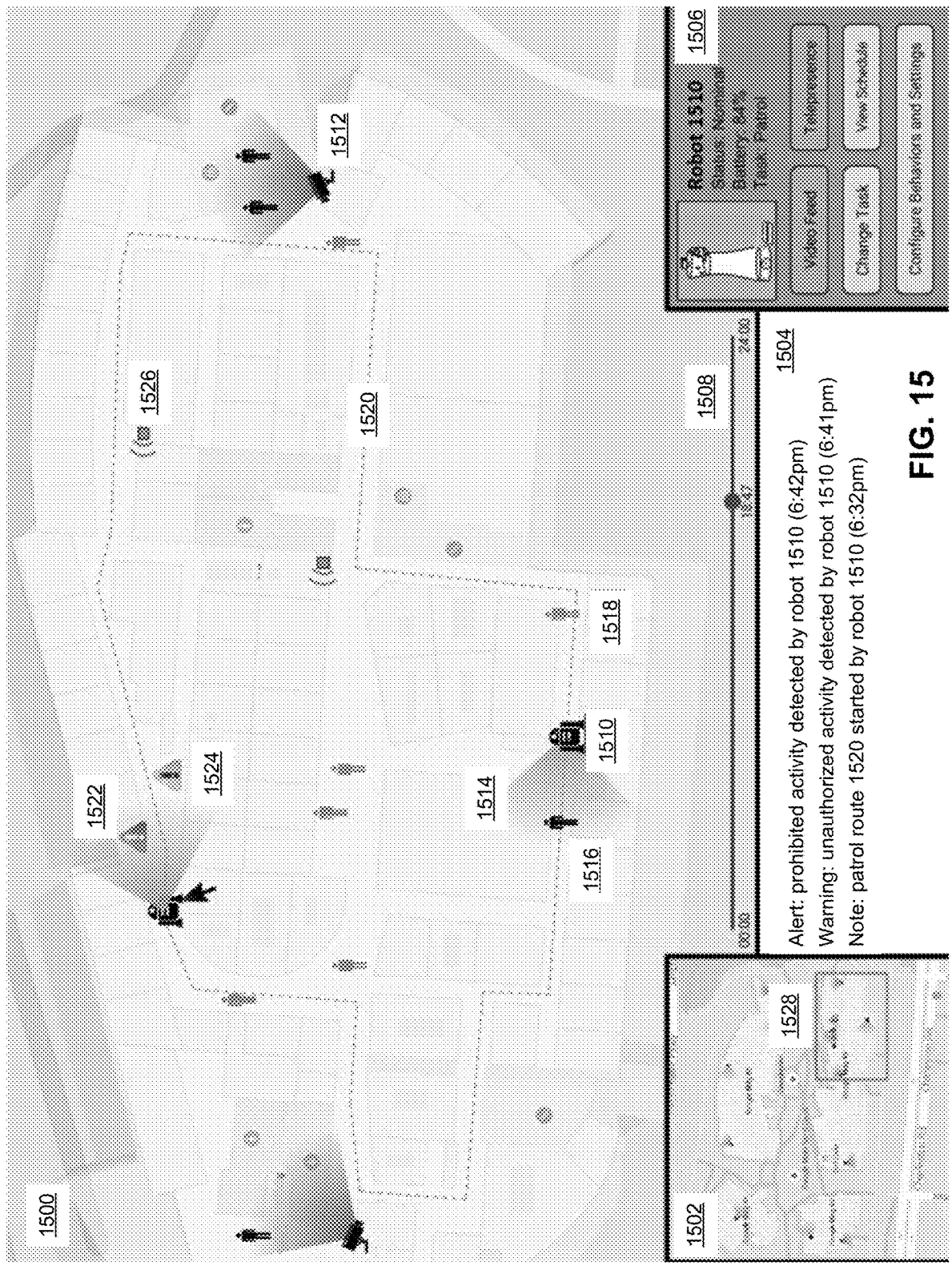
FIG. 15 illustrates a security interface for display by a central system, according to one embodiment.

FIG. 15 illustrates a security interface for display by a central system, according to one embodiment. The interface of FIG. 15 includes a first portion 1500 displaying a local map, a second portion 1502 displaying a global map, a third portion 1504 displaying text notifications, and a fourth portion 1506 displaying a robot interface. It should be noted that in other embodiments, the security interface of FIG. 15 can include different, additional, or fewer interface portions showing any suitable information, and can include interface portions in different arrangements or locations than illustrated in FIG. 15.

The first interface portion 1500 includes a local map illustrating various entities, objects, and notifications within a portion of a building. The location map can include a floorplan of the portion of the building, for example illustrating rooms, names of rooms, room numbers, hallways, doors and/or windows, and important building features. In the embodiment of FIG. 15, the first interface portion illustrates a robot 1510 with field of view 1514. The robot is moving along the patrol path 1520, and detects the person 1516. The displayed field of view 1514 corresponds to the field of the view of the robot, indicating the current field of view of the robot to a user of the security interface. Likewise, the location of the person 1516 displayed as a humanoid icon on the local map corresponds to the location of the person within the building as detected by the robot. Person 1518, having previously been detected by the robot but now out of the field of view of the robot, is shown on the local map at the last known location of the person 1518. In some embodiments, as the person 1518 is no longer visible to the robot, an indication is displayed on the map that the location of the person 1518 is no longer certain (for instance, the icon for the person can be faded to indicate the uncertainty of the person's location as illustrated in FIG. 15, the color of the icon or the icon itself can be changed to indicate the uncertainty of the person's location, and the like).

The level of certainty or uncertainty in the individual's location can also be visually represented within the security interface, for instance by adjusting an amount of fading or the color of the icon representative of the individual. The level of certainty or uncertainty in the individual's location can be based on the amount of time since the individual was last observed (e.g., wherein the uncertainty increases with time since last observation), a speed or activity of the individual when the individual was last observed (e.g., wherein the uncertainty increases with the speed of the individual or based on the activity type of the individual), or based on an identity of the individual (e.g., wherein the uncertainty increases faster for individuals with lower access credentials or with a history of security violations than for other individuals). In some embodiments, different icons, colors, or other representations can be used to display different categories of people, for instance identified individuals, unidentified individuals, individuals by categories of access credentials, individuals by activity type, individuals performing prohibited actions, individuals associated with security risks or threats, and the like.

In addition to robots, the first interface portion 1500 also includes other objects, such as the security camera 1512. The field of view of the security camera is also displayed (for instance, in a different color than the field of view 1514 of the robot 1510), and any individuals within the field of view of the security camera are indicated with icons. Likewise, the location of various tracked assets (such as the tracked asset 1526) can be indicated within the first interface portion using suitable icons. Tracked assets can include assets coupled to RFID tags, and examples of tracked assets can include lab equipment, computer equipment, and secure documents. The first interface portion can also include notifications, such as the alert notification 1522 and the warning notification 1524. The location of notifications within the local map can be based on the location of the entity or object associated with the notifications. In some embodiments, a user can view all tracked assets in a particular location within the security interface, for instance a listing of assets by name or identity, a time last seen, an expected or permitted location, and an actual or last seen location. The user can also use the security interface to add additional tracked items, to change the permissions of existing tracked items (for instance by changing the permitted locations for the items), and can remove tracked items.

As noted above, the security interface can be updated in real-time, as objects and entities move and events occur. For instance, the first interface portion 1500 can be updated to display the robot 1510 as it moves along the patrol path 1520. As the robot moves along the patrol path, the displayed robot icon can move to reflect the change in location of the robot, allowing a user of the security interface to be able to track the robot in real-time. Likewise, the location of individuals or objects detected by robots, security cameras, or other location-tracking mechanisms (such as GPS tracking devices, mobile phones, or RFID readers) can be updated as the individuals or objects move in real-time.

The security interface can also include a time bar 1508 enabling a user of the security interface to select a previously occurring viewing time. The security interface, in response to the user selecting a previously occurring viewing time, can adjust the various interface portions of the security interface to display information associated with the previously occurring viewing time. The user can then "play" the information within the security interface from the selected previously occurring viewing time, enabling the user to view changes in displayed information in simulated real-time (or augment real-time slowed down or sped up relative to real-time). Accordingly, a user can view security interface events as they occur in real-time, or can beneficially go back in time to re-watch security interface events in simulated real-time as needed.

The second interface portion 1502 displays a global map of a building, including robot icons for robots within the building, person icons for individuals within the building, and the like. The global map includes a window 1528 that corresponds to the current view of the local map within the first interface portion 1500. The global map can also update in real-time, for instance as the robots move within the building, and as the portion of the building illustrated in the local map changes.

The third interface portion 1504 illustrates text notifications corresponding to events occurring within the portion of the local map 1500, corresponding to information associated with objects or individuals within the building, or corresponding to any other information associated with the security interface. In the embodiment of FIG. 15, three text notifications are displayed. The first is "Note: patrol route 1520 started by robot 1510 (6:32 pm)", and indicates that the robot 1510 began patrolling route 1520 at 6:32 pm. In other words, the notification indicates that a particular object (the robot) began performing a security operation (patrolling the patrol route) at a particular time. The second notification is "Warning: unauthorized activity detected by root 1510 (6:41 pm)", and indicates that a warning event was detected corresponding to the warning notification icon 1524. The third notification is "Alert: prohibited activity detected by robot 1510 (6:42 pm)", and indicates that a security alert event was detected corresponding to the alert notification icon 1526. In other words, the second and third notifications indicate particular security events corresponding to different security levels, the type of activity that triggered the security events (unauthorized activities and prohibited activities), the entity that detected the security events (the robot 1510), and the time each security event was detected. It should be noted that in some embodiments, the text notifications can also identify individuals detected by robots, individuals associated with security violations, door or window alarms, detected motion or sounds, or any other information associated with security events, objects, individuals, robots, infrastructure systems, or security systems.

The fourth interface portion 1506 displays a robot interface. In the embodiment of FIG. 15, information associated with the robot 1510 is displayed. In particular, the robot interface displays an icon or image representative of the robot is displayed, displays a status of the robot, displays an amount of available power to the robot, and displays a current security operation being performed (in the embodiment of FIG. 15, the task is patrolling). In addition, the robot interface includes buttons enabling a user of the security interface to view of video feed from the robot (which can be displayed within the fourth interface portion or elsewhere within the security interface), to participate in telepresence activities (such as a video chat with an individual within a proximity of the robot), to change the security operation being performed by the robot (the "change task" button), to view the schedule of the robot (including queued or scheduled security operations, scheduled recharge times, and the like), or to configure the behavior or settings corresponding to the robot. In some embodiments, a user of the security interface can schedule future security operations for the robot, for instance by selecting a starting time for each selected security operation, each selected patrol route, etc.

In some embodiments, a user of the security interface can interact with the security interface in various ways. For instance, a user can scroll the first interface portion 1500 to change the portion of the global map displayed within the local map. Likewise, a user can touch a portion of the global map of the second interface portion 1502 to relocate the window 1528 and thus relocate the portion of the global map shown within the local map. A user can also zoom in or out on the local map, can select a displayed icon for information associated with the entity or object corresponding to the icon (for instance, a user can select a robot icon or security camera icon to change the information displayed with the fourth interface portion 1506), and can select an icon corresponding to an entity or object to change a state of the entity or object (for instance, a user can select a door icon to open, close, lock, or unlock the corresponding door, or can select a robot icon to change a security operation being performed by or mode of the corresponding robot).

In some embodiments, a user can use the security interface to change the patrol route of a robot by selecting among a set of patrol routes, or by manually drawing a patrol route on the local map (upon which, a set of navigation instructions through a building portion corresponding to the drawn patrol route will be sent to the robot, and the robot can begin patrolling the drawn patrol route based on the navigation instructions). In addition, a user can select a building portion or room displayed within the local map for investigation by a robot. In response, the robot can investigate the building portion or room, and can provide information corresponding to the investigation (such as video data or sensor data) back to the security interface for display. A user can select a displayed robot icon or security camera icon to adjust a field of view or viewpoint of the robot or security camera, to view video captured by the robot or security camera, or to change the behavior of the robot or security camera. A user can also use the security interface to select a location for a robot to guard or act as sentry (for instance, by drawing a line within the local map), can select a guard or sentry behavior (e.g., "allow no one to pass", "allow users with proper security credentials to pass", etc.), and can select an active guard or sentry time (e.g., "guard between the hours of 1:00 am and 7:00 am). In some embodiments, the security interface can beneficially enable a user to manually control a robot, for instance using a keyboard or joystick mechanism to move the robot around a location displayed on a map and to adjust a viewpoint or field of view of the robot.

A user can interact with the security interface using any suitable means. For instance, a user can click on a displayed robot icon using a mouse or selecting gesture on a touch-screen display, a list of security options can be presented by the security interface in response, the user can select one of the presented security operations, and the security interface can instruct the robot to being performing the selected security option. Likewise, a user can scroll or zoom using a mouse or a scrolling gesture on a touch-screen display.

In some embodiments, an interface portion can display an identity of individuals in an area. For example, the interface portion can list the individuals who have been identified (for example, the name, position, and/or access credentials of the individuals), and can also list individuals who have not been identified (e.g., by a generic placeholder such as "Individual #1", and an indication that the individual has not been identified). The interface portion can also list a location of each individual, for instance, a building or room in which each individual is located. Likewise, an interface portion can list security personnel in an area, and a location of each security personnel.

Each interface portion or each category of information shown within a security interface can be associated with an access level. Accordingly, the interface portions or categories of information shown to a user of the security interface can be limited based on the security credentials of the user. For instance, if a user is not authorized to view video streams from robots, the security interface can be configured to prevent video streams from being shown to the user.

The security interface can also differentiate displayed areas within a map based on a category of the area. For instance, off-limits rooms can be displayed in a first color, rooms available to high-security individuals can be displayed in a second color, and can display rooms available to everyone in a third color. The security interface can also display geofences within a map, for instance boundaries of areas not accessible to robots, and areas available to non-employee visitors. Finally, the security interface can differentiate areas of a map currently visible to robots and/or other sensors. For instance, the security interface can show areas of a map visible to robots in a first set of color tones, and can show areas of a map not visible to robots in a second set of color tones (for instance, a darker set of color tones), beneficially enabling a user of the security interface to quickly identify currently unmonitored portions of a building.

In some embodiments, the security interface can show security information received from or representative of more than one location. For instance, the security interface can receive security information from a plurality of different buildings, for example belonging to the same entity or company. In such embodiments, a user of the security interface can toggle the interface between locations. For example, a user can configure the security interface to show a map of robots, tracked assets, and security information within a first building, and can subsequently configure the security interface to show a map of robots, tracked assets, and security information within a second building. Each location can be associated with a different selectable icon displayed within the security interface, can be listed in a selectable drop-down list, and the like. The security interface can update with security information associated with a selected location in response to the user selection of a configuration option associated with the location.

A user of the security interface can also configure security policies using the security interface. For instance, a user can select security policy components, including one or more of a location, a time range for which the security policy will be active, one or more categories of individuals to whom the security policy applies (e.g., employees, managers, staff, visitors, etc.), permitted access credentials, security policy exceptions, actions taken in the event of security policy violations (e.g., notify security, revoke user credentials, lock nearby doors, etc.), and the like. The security policy configured by the user of the security interface can be stored and subsequently implemented, for instance by patrolling robots, security systems, and/or nearby doors and access gates. In some embodiments, the security interface can log the credentials, identity, and/or actions of users of the security interface, beneficially allowing the security interface to generate an auditable log of the users and user actions for subsequent review (for instance, for accountability and privacy considerations).

Figure 16:
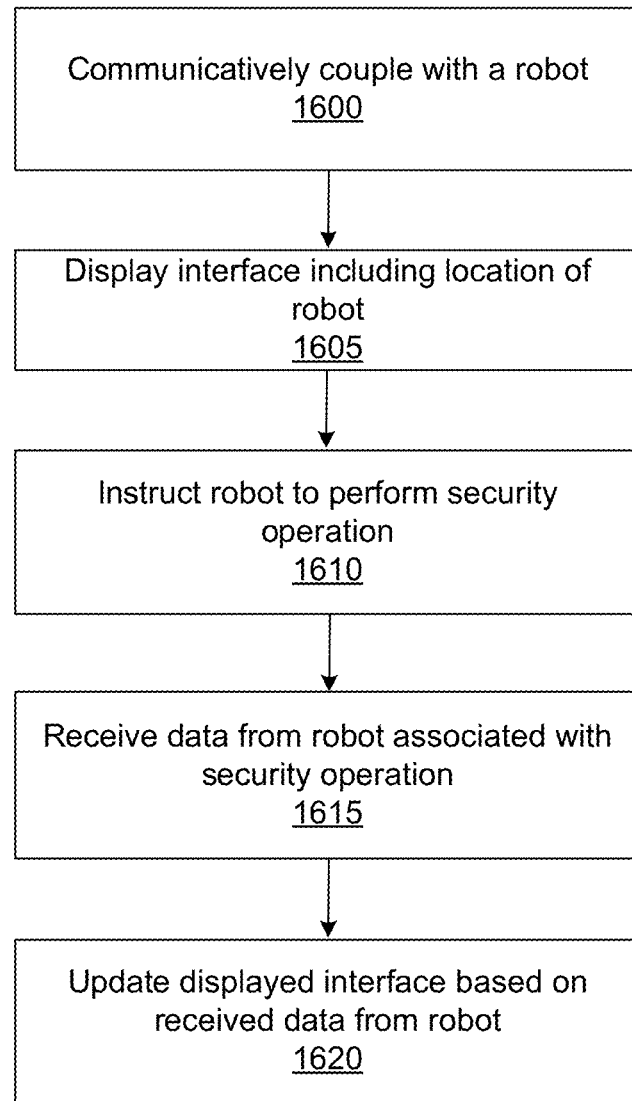
FIG. 16 is a flow chart illustrating a process for interacting with a security robot using a security interface, according to one embodiment.

FIG. 16 is a flow chart illustrating a process for interacting with a security robot using a security interface, according to one embodiment. The security interface communicatively couples 1600 with a robot (for instance, via the central system 210). The security interface is displayed 1605 to include a location of the robot. A user of the security interface instructs 1610 the robot to perform a security operation. For instance, a user can instruct the robot to patrol a particular patrol route, or to investigate suspicious activity. The security interface receives 1615 data from the robot associated with the security operation. For instance, the robot can provide video captured during the performance of the security operation, and/or can provide an updated location of the robot. The security interface updates 1620 the displayed interface based on the received data from the robot. For instance, the security interface can be updated to display the video captured by the robot or the updated location of the robot.

M. Additional Security Operations

The robot 100 can perform one or more additional security operations, either independently of or in concert with one or more of the security operations described above. In one embodiment, the robot can operate in a privacy mode, where data collected and security operations performed by the robot are not communicated to an external entity (to preserve the privacy of individuals in proximity to the robot, or to reduce the likelihood that such data is intercepted during transmission) unless one or more security criteria are triggered (such as the detection of suspicious activity, the identification of an unauthorized individual, and the like). Operating in such a privacy mode further beneficially enables the robot to operate in proximity to sensitive data or objects (such as secret lab equipment or confidential/classified information) without a risk of such sensitive data or objects being discovered by unauthorized entities within access to the robot or the central system 210. In some embodiments, the robot is configured to blur faces within captured images or videos to preserve the privacy of the individuals associated with the blurred faces. Such facial blurring may be performed by the robot on the captured images and videos only when the images or video is transmitted to an external entity. The robot can also beneficially blur computer monitors, documents, sensitive data or instruments, or any other objects or information as needed to satisfy security restrictions.

In some embodiments, the robot 100 can use one or more sensors, such as IR cameras, 3D depth cameras, ultrasonic sensors, and rangefinders to navigate within darkness. Doing so beneficially enables the robot to operate during times when the lights in an area are otherwise turned off. Accordingly, the absence of visible light in an area is not detrimental to the ability of the robot to perform security operations. As the majority of burglary occurs at night when employees or other individuals are not present, the ability of a robot to perform security operations in darkness beneficially prevents the need to power lights in an area. When the robot detects suspicious activity or when one or more security criteria are triggered while operating in darkness, the robot can activate a spotlight of the robot to highlight an object associated with the detected activity, can activate the buildings lights (e.g., by communicating with the central system 210 to turn on the lights for a particular area associated with the detected activity), or can call one or more security personnel 250 or other robots to the area associated with the detected activity.

In some embodiments, the robot 100 can enable a user within a proximity of the robot to interact with security personnel 250 or an operator of the robot. For instance, the robot can display real-time video of the operator or security personnel to the individual, and/or can transmit audio communications between the individual and the operation or security personnel. Doing so beneficially enables the individual to speak with a human associated with the robot, for instance in order to request authorization for access to a particular area, to authenticate the individual's credentials, or to enable the individual to request help or assistance.

The robot 100, in response to determining that the robot has lost connectivity with the network 200 during the patrolling of a route, can return to an earlier location with the route where the robot was connected to the network. Likewise, in some embodiments, the robot can move to a location further along the patrol route until connectivity is restored. While the robot is disconnected from the network, all data connected by the robot (related to security or otherwise) can be stored until connectivity is restored. When the robot is able to reconnect to the network, the robot can upload the stored data (for instance, to the central system 210).

In some embodiments, the robot 100 can monitor the environment in which the robot operates over time to detect potential security anomalies using one or more of the sensors of the robot. For instance, the robot can detect the temperature of particular rooms within a building, can detect smoke, can detect carbon monoxide levels, can detect light levels, can detect chemical compounds or gaseous substances, and the like. The robot can obtain and store these measurements, and can map out variations of these measurements over time and by location. If, during the course of a patrol, a robot records obtains a measurement that deviates by more than a threshold from historical measurements, the robot can flag these measurement as a security anomaly. For instance, if the robot detects the temperature of a room over time to be between 72 degrees Fahrenheit and 78 degrees Fahrenheit, the robot can identify a measure of the room of 68 degrees Fahrenheit as an indication of a security anomaly (for instance, as a result of someone leaving a window open). The detected security anomalies can subsequently be reported to the central system 210, or to an external entity (such as a building operator or facilities management team).

The robot 100 may detect fires, for instance visually using a camera 722, an IR sensors, a temperature sensor, or any other suitable measuring system. In response, the robot can attempt to distinguish the fire, for instance using an on-board fire extinguisher, can flag the fire for security personnel to handle, can flag the fire to the central system 210, can trigger a fire alarm, can trigger a building's sprinkler systems, or can call the fire department or other emergency services. The robot may also detect when an individual is smoking (for instance, either visually, by detecting the smoke in the air, or by detecting the presence of cigarette-related gases in the air), and can inform the individual that smoking is prohibited. In such instances, the robot can also inform the central security system. In emergency situations, the robot can enable an external entity (such as an operator of the robot) to communicate with individuals within a proximity of the robot, for instance to assist with evacuation, to hold or disable elevators, to unlike exit doors, to provide information to response personnel, to sound alarms, to map out a location of a fire, to identify exit routes, to obstruct or locate unauthorized or dangerous individuals, and the like.

In some embodiments, the robot 100 can include airbags configured to inflate when the robot is falling over in order to cushion the fall to the extent possible. The use of airbags to soften impact upon falling can beneficially reduce damage to the robots. In some embodiments, the robot can prevent "tailgating", or the following of a first individual with proper security credentials by an unauthorized individual through a door or access gate open in response to the security credentials of the first individual.

In some embodiments, the robot 100 can be used, for instance, by a security personnel 250 or user of the central system 210 to locate an object or individual. In such embodiments, the central system can determine a last known location of the object or individual (for instance, by querying the security interface or by accessing data logs of object and individual locations), and can provide this location to the security personnel or user. Alternatively, the last known location of the individual can be used (for instance, by robots) to scan the area within a proximity of the last known location for the individual. When the current location of the individual is determined (for instance, in response to the deployment of a robot to the last known location and the subsequent scanning of the area), the current location can be provided, for instance to the requesting entity.

In some embodiments, the robot 100 can determine its location without using a map (for instance, in response to a mapping error). For instance, the robot can ask a nearby human for help, can use RFID tags found in a vicinity of an area and can identify a historical location of the RFID tags, can ask nearby robots for location information, can query the central system 210 for the robot's location, can use 3D information or 2D/map layout information to determine the location of the robot, and the like.

As noted above, the robot 100 can perform operations in addition to security operations. For instance, the robot can be located within an entrance or doorway and greet people as they enter or leave an area. The robot can request janitorial service in response to detect a mess within a proximity of the robot, and can act in self-defense in the event that someone tries to tamper with the robot or with another security system or infrastructure system.

In some embodiments, the robot 100 can delivery objects, packages, paperwork, and the like to an individual, for instance by querying a semantic map, the central system 210, another robot, or any other system or entity that tracks the location of individuals. In response to identifying a location of the individual, the robot can navigate to the individual, can verify the individual's identity (for instance, by scanning an RFID badge of the individual, by performing facial or voice recognition on the individual, or by any other suitable means), and can have the individual sign for the delivery before providing the object to the individual. In some embodiments, the robot can enable guests to check-in via the robot's touchscreen display. In other embodiments, the robot can enable individuals near the robot to report emergency situations, for instance a fire nearby, an unauthorized individual within the vicinity, a medical emergency, and the like.

It should be noted that in the examples of robot functionality described above, an exhaustive list of security operations that a robot can perform is not given for each example for the purposes of simplicity. However, it should be noted that any security operation described herein or otherwise can be performed by the robot in any context described herein, and that the lack of description of a particular security operation in a particular context does not indicate that the robot is unable to perform the security operation in that context.

Semantic Mapping

As noted above, the semantic mapping system 736 of the robot 100 can generate or update a semantic map associated with a location or setting in which the robot is located. As used herein, a "semantic map" refers to a map that includes one or more objects, entities, or individuals, and that includes a meaning, description, identity, or status of the identified objects, entities, or individuals. Semantic maps generated by the semantic mapping system can be stored locally by the robot, or can be uploaded to the central system 210 for storage in the semantic maps storage module 342.

A. Semantic Map Generation

In some embodiments, the robot 100 can generate a semantic map from scratch, while in other embodiments, the robot can update an existing semantic map or can generate a semantic map from a non-semantic map, for instance by adding semantic details (such as information describing the location, identity, status, or other characteristics of detected objects) to the non-semantic map. In embodiments, where the robot generates a semantic map from scratch, the robot first generates an area map identifying obstacles and pathways using, for instance, one or more of the scanners 726 (such as a laser rangefinder or other suitable depth sensor) and a simultaneous localization and mapping (or "SLAM") algorithm. As used herein, such maps are referred to as "SLAM maps".

Figure 17:
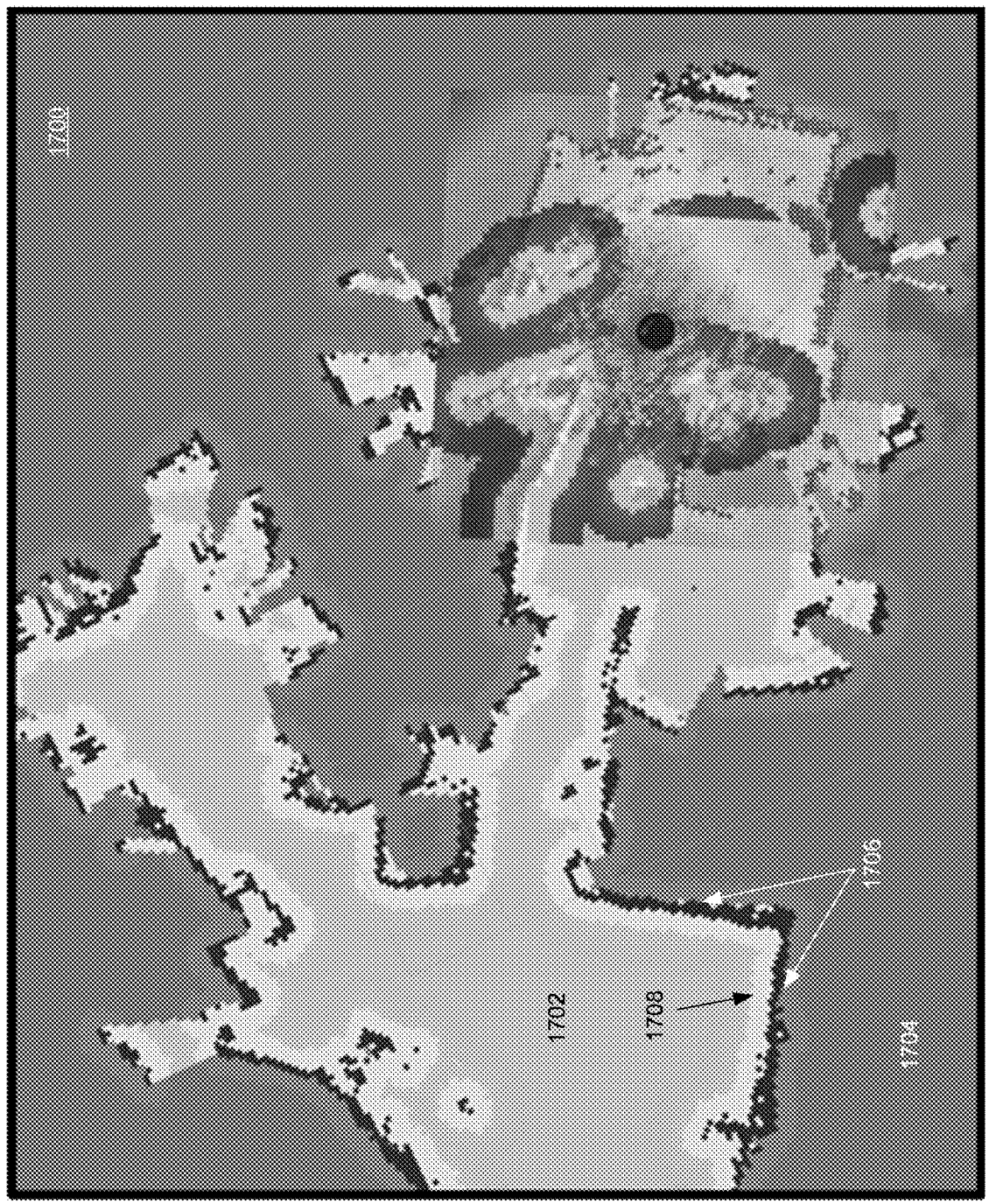
FIG. 17 illustrates an example of a SLAM map, according to one embodiment.

FIG. 17 illustrates an example of a SLAM map, according to one embodiment. In the embodiment of FIG. 17, the SLAM map 1700 illustrates a partial mapping of a building floor. The map includes an area 1702 that is navigable by a robot 100. The area 1702 does not include obstacles or objects that might impede the movement of the robot. The area 1702 can be identified by the robot generating the SLAM map, for instance by using a laser rangefinder or other depth sensor to identify the location of objects (such as chairs, desks, pottery, and the like) or obstacles (such walls, pillars, closed doors, and the like). The navigable area 1702 can be indicated within the map, for instance using a first color, texture, or shade within the map.

The map 1700 also includes an unknown area 1704 that is not yet scanned by the robot 100. This area may be navigable, though because the robot has not yet scanned the area, potential obstacles within the area 1704 have not been identified. Unknown areas can be represented within the map using a second color, texture, or shade, allowing a viewer of the map to distinguish between the navigable areas 1702 and the unknown areas 1704. Finally, the map also includes obstacles 1706, representing areas the robot cannot navigate through without potentially being obstructed or impeded, or without damaging objects representative of the obstacles. In the embodiment of FIG. 17, the obstacles are generally the walls of the building floor represented by the map, though also include other objects within the building floor that are freestanding or are away from the walls. Obstacles can be indicated within the map using a third color, texture, or shade, allowing a viewing of the map to distinguish the obstacles from the navigable areas 1702 and the unknown areas 1704.

In some embodiments, boundaries 1708 are included within the map 1700, for instance areas within a threshold distance of the obstacles 1706. Such boundaries can be indicated using a fourth color, texture, or shade. When the robot 100 uses a SLAM map to navigate an area (such as the floor of the building represented within the embodiment of FIG. 17), the robot can move within the navigable areas 1702 and avoid the boundary areas to the extent possible, beneficially reducing the likelihood that the robot runs into or otherwise makes contact with an obstacle. In some embodiments, when the robot moves with the navigable areas 1702, the robot can move at a first top speed, and when the robot enters the boundary areas 1708, the robot can move at a second top speed slower than the first top speed. Similarly, robot speed can be adjusted based on historical foot traffic information, based on a current room occupancy, based on detected sounds (e.g., detected human voices or opening doors), based on a proximity to blind corners or intersections, based on a room type (e.g., a robot may move at a slower speed in kitchens than when navigating within parking lots), based on a proximity to particular objects (e.g., a robot may move slowly around high-value or fragile objects), or based on any other suitable factor.

While SLAM or other areas maps ("non-semantic maps" hereinafter) can be useful for the purpose of robot navigation within an area, the rangefinders or depth sensors used by the robot 100 to generate the SLAM map do not generate information about what detected obstacles or objects are, or how the robot should handle or interact with the detected obstacles or objects. The robot can detect and classify or identify objects, and can determine a state or other characteristics of the objects. Information describing the classified/identified objects and the corresponding detected states or other characteristics of the objects are stored in conjunction with the non-semantic maps, in association with a location of the objects relative to the non-semantic map. The generation of a semantic map refers to the inclusion of information describing objects represented within the map (and their corresponding detected states and characteristics).

In some embodiments, objects can be detected and identified by the robot 100 using one or more sensors, for instance cameras, RFID readers, IR sensors, and the like. For example, the robot can capture an image of an object, and can apply image detection or classification algorithms to identify the object type. Likewise, the robot can analyze images of the object to determine a state of the object. For instance, if the robot detects a door, the robot can also detect whether the door is open or closed. In some embodiments, the identification of objects and object states or characteristics can be manually provided by a system administrator, a robot operator, an employee or individual associated with the robot, and the like. In some embodiments, the robot can access object identification and state information from a repository of object information, such as a building database identifying the location and expected state of various objects within the building. In some embodiments, object information can be received from other robots that have scanned locations and identified objects within the locations. Object information can also be received from accessing the central system 210, one or more infrastructure systems 220, or one or more security systems 230. For instance, for a smart door, the robot can query the state of the smart door (e.g., locked or unlocked) via the network 200. Likewise, the robot can query a building elevator system to determine the current floor of an elevator.

Examples of detected objects and corresponding object states and properties (if applicable) include:

Doors: open/closed, locked/unlocked, required security credentials to unlock
Windows: open/closed, locked/unlocked, broken
Elevators: number, current floor, button location, the date of last inspection (determined by scanning text of an inspection certificate within the elevator)
Stairs: number of floors
Bathrooms
Lights: on/off, location of light switch, in need of replacing (burnt out bulbs)
Plumbing/piping locations: water damage/leaks
Trashcans/recycling bins/compost bins: last emptied, in need of emptying
Rooms: room type (such as office, kitchen, conference room, bathroom, common area, game room, storage closet, guard station, laboratory, computer room, utilities room, and the like), room number, locked/unlocked, required security credentials to access, normal temperature range, current occupancy
Access devices: lock types, card readers, RFID readers
Conference rooms: in use/reserved/free, capacity, conference room assets (desk, number of chairs, computer equipment, monitor/display/projector, white board), room number
Desks: owner, equipment (chair, computer, computer dock)
Walls: type (glass, plaster, moveable, etc.), location of doors within walls
Building structural obstacles (such as pillars, columns, etc)
Thresholds: geofences, boundaries between rooms, access credentials required to cross
Ramps
Hallways
Kitchens: available equipment (microwaves, refrigerators, sinks, water fountain, ice machine, tables, chairs, etc.)
Water fountains
Fire extinguishers: the date of last inspection Smoke alarms: the date of last inspection
Fire sprinklers or other fire suppression systems: the date of last inspection
Vents
Power outlets
TVs and monitors
Computers and computer equipment: printers, servers, keyboards, keypads, tablets
Network equipment: routers, switches, modems, networking cables, servers, network names, local area network equipment
High-value assets: artwork, safes, secure document repositories or cabinets, secure computer equipment, cash registers, ATMs, lab equipment, medical equipment
Security systems: guard stations, security cameras, access gates, audio detectors, motion detectors, aerial systems, security displays
Robot systems: robots, charge stations, robot docks, robot patrol routes
Infrastructure systems: temperature sensors, power systems, generators
Retail objects: racks, displays, shelves, drawers, inventory object types, kiosks, checkout desks
Decorative objects: paintings, sculptures, plants
First aid kits
Locations of frequent false positives (objects frequently identified as people, etc.)

In addition, a robot 100 can determine usage patterns of detected objects (such as any of the detected objects listed above), and information describing such usage patterns can be included within the semantic map. For instance, a robot can query a building system to determine the floors in a building most frequently visited by an elevator, can access a scheduling system of a building to determine historical usage patterns for conference rooms, or can monitor a kitchen area to determine the times of a day when the kitchen is the most crowded. Likewise, a robot can determine behavior or movement patterns of people within an area, and information describing such patterns can be included within the semantic map. For instance, a robot can query a security system to determine a list of people who frequently pass through an access gate, or can track individuals (for instance, by scanning the RFID badges of the individuals) to determine historical patterns of movement of the individuals.

In some embodiments, the robot 100 can determine a height of detected objects, and can generate a 3D semantic map based on the detected heights. For instance, the robot can, using rangefinders, cameras, or other sensors, determine the height of nearby walls, doors, windows, obstructions, and the like. Using these heights, the robot can generate a 3D model of a 2D semantic map, for instance by rendering a building's structure in 3D (e.g., walls, hallways, passage ways, and the like), and by projecting detected objects at a height relative to the rendered structure based on a detected height of the objects in the real world.

Figure 18:
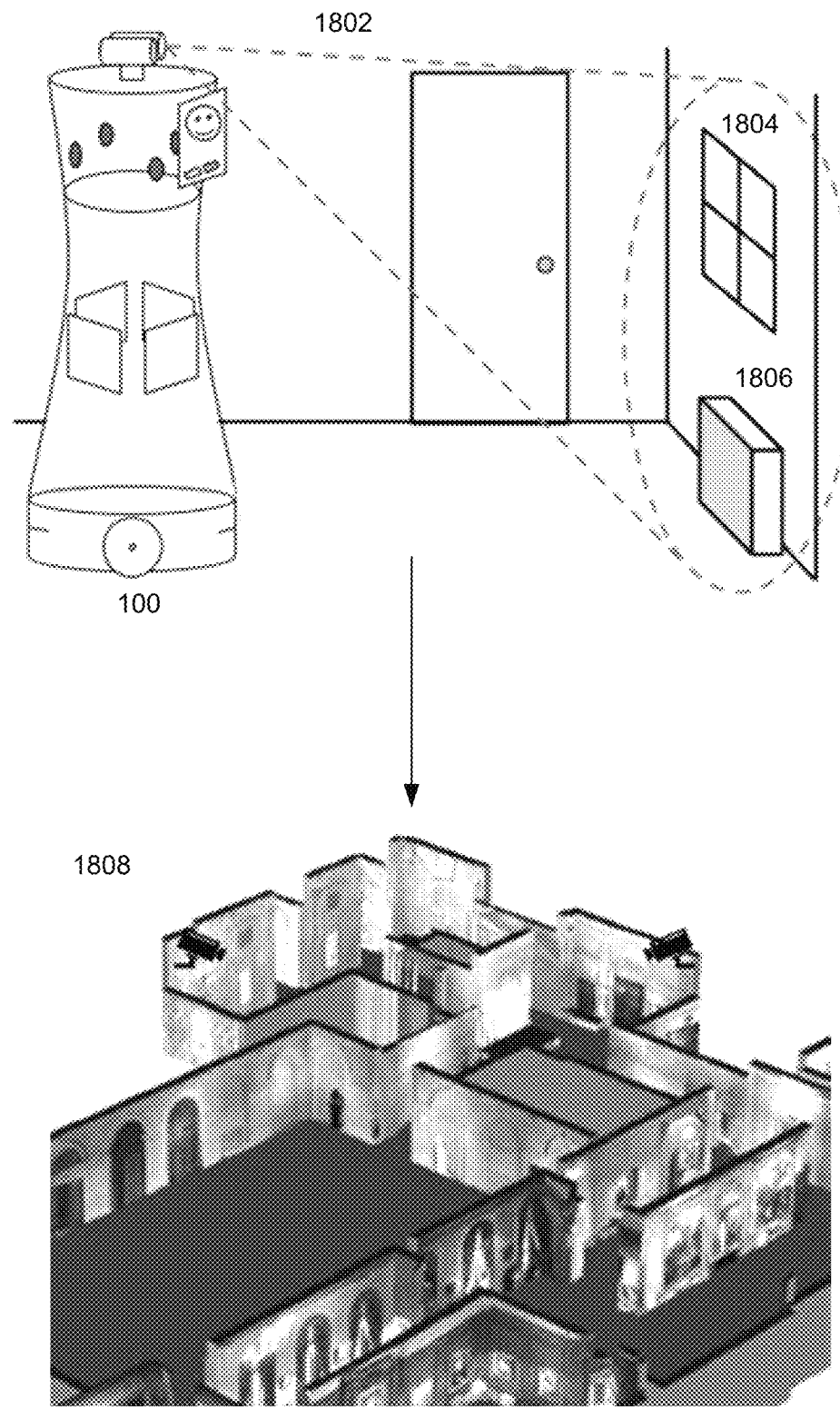
FIG. 18 illustrates the generation of a 3D semantic map by a robot, according to one embodiment.

FIG. 18 illustrates the generation of a 3D semantic map by a robot, according to one embodiment. In the embodiment of FIG. 18, the robot 100 uses a camera array 1802 to detect objects, such as the window 1804, and the heater vent 1806, within a proximity of the robot. The robot also determines of height of each of these detected objects. The robot proceeds with detecting a height of all detected objects within an area, such as a building floor. When the objects and the corresponding heights of the objects within the area are determined, the robot can generate a rendered 3D semantic map 1808 representative of the area. The 3D semantic map can include visual representations of the detected objects (either captured images of the objects or substitute representations of the objects based on the object type) at the detected height (within the 3D semantic map) of the objects. Although description of dimensions within a 3D semantic map herein is limited to object height, it should be noted that a robot can detect object width and depth as well as height, and can in some embodiments generate 3D semantic maps that represent detected objects at corresponding heights, widths, and/or depths.

Figure 19:
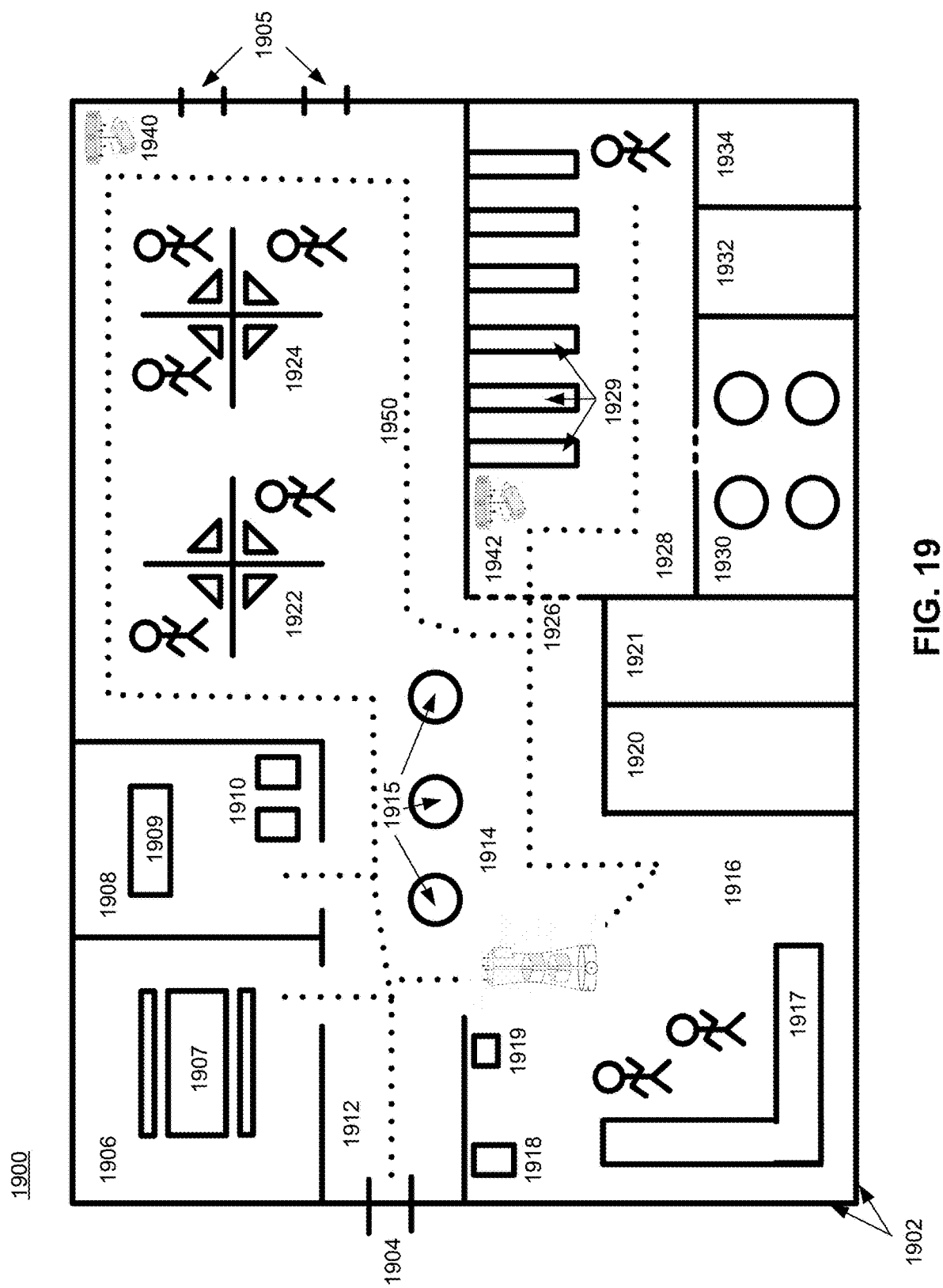
FIG. 19 illustrates an example semantic map of a building floor, according to one embodiment.

FIG. 19 illustrates an example semantic map of a building floor, according to one embodiment. In some embodiments, the semantic map 1900 of FIG. 19 is stored as a data construct accessible to and usable by a robot 100, an operator of the robot, the central system 210, security personnel 250, or any other suitable entity. In some embodiments, the semantic map is displayed within an interface, beneficially enabling a human observer to view and/or interact with the semantic map (for instance, by clicking on or selecting an object identified within the semantic map, and providing additional information about the object, such as a state of the object, in response). Information identifying an object, a state of the object, a location of the object, or other characteristics of the object is referred to herein as "identification information".

In the embodiment of FIG. 19, the semantic map 1900 includes walls 1902 associated with the building floor. The semantic map also includes a door 1904, and windows 1905. The semantic map 1900 further identifies various rooms, such as the conference room 1906, the office 1908, the entryway 1912, the sitting area 1914, the kitchen 1916, the restrooms 1920 and 1921, the secure area 1928, the lab 1930, and storage rooms 1932 and 1934. In addition, the semantic map identifies objects within these rooms, such as the conference table 1907, the desk 1909, the chairs 1910, the ottomans 1915, the couch 1917, the fridge 1918, the sink 1919, and the shelves 1929. The semantic map further identifies infrastructure, such as the cubicle arrays 1922 and 1924. Finally, the semantic map identifies security systems, such as the access gate 1926, security cameras 1940 and 1942, and the patrol route 1950.

In some embodiments, the semantic map 1900 can display identification information as text within the semantic map. For example, room names, room numbers, the names of office owners, and the like can be displayed within or overlaid upon the semantic map. In some embodiments, the semantic map can highlight portions of the semantic map corresponding to identification information. For example, the portion of the map corresponding to the conference room 1906 can be highlighted a particular color, for instance a color corresponding to conference rooms, and the portion of the map corresponding to the restrooms 1920 and 1921 can be highlighted a different color, for instance a color corresponding to restrooms. In some embodiments, the patrol route 1950 can be displayed as a line or dotted line, as a colored path (the boundaries or width of which corresponds to the most likely path of the robot 100 as the robot patrols the route), or using any other suitable identifier. Portions of the semantic map can also be color-coded based on access credentials required to access the portions, based on a type of room or map portion, based on a current occupancy of rooms or map portions, or based on any other suitable criteria. In addition to displaying text or color representative of the identification information, the semantic map can include icons or other visual indicators representative of the identification information or various types of identification information, and can further include a legend within the display of the semantic map identifying the meaning of each color, icon, and the like used to represent the identifying information.

Although reference is made herein to the display of identification information by the semantic map 1900, it should be noted that in some embodiments, such information is not immediately visible to a viewer of the map. For instance, the semantic map may be displayed without text or other identifiers, and may display text and other identifying information only upon a mouseover of an object, a selection of an objection, a configuration of the display of the semantic map into a particular mode that displays the identifying information, and the like. In embodiments where the semantic map is not displayed (for instance, embodiments in which the robot 100 uses the semantic map to perform a task or security operation), the information identifying objects (and object location, state, and characteristics information) can be stored within metadata of the map, stored in a separate data construct corresponding to the map, or stored in any other suitable way such that the information is accessible to an entity viewing or using the semantic map.

It should be noted that although state information or object characteristic information is not illustrated in conjunction with the objects in semantic map 1900 of the embodiment of FIG. 19, the semantic map can include such information. State information or object characteristics information can be presented to a user viewing the semantic map (for instance, in an overlay interface or an interface adjacent to the semantic map), and can be displayed any time the semantic map is displayed, or in response to a request for such information (for instance, in response to the selection of an object displayed within the semantic map). For example, the semantic map can include information identifying the door 1904 as currently closed and unlocked, and identifying the windows 1905 as open. Likewise, the semantic map can store a maximum occupancy of the conference room 1906, an owner of the office 1908, individuals assigned to desks within the cubicle arrays 1922 and 1924, requisite credentials required to access the security area 1928, and the like.

Figure 20:
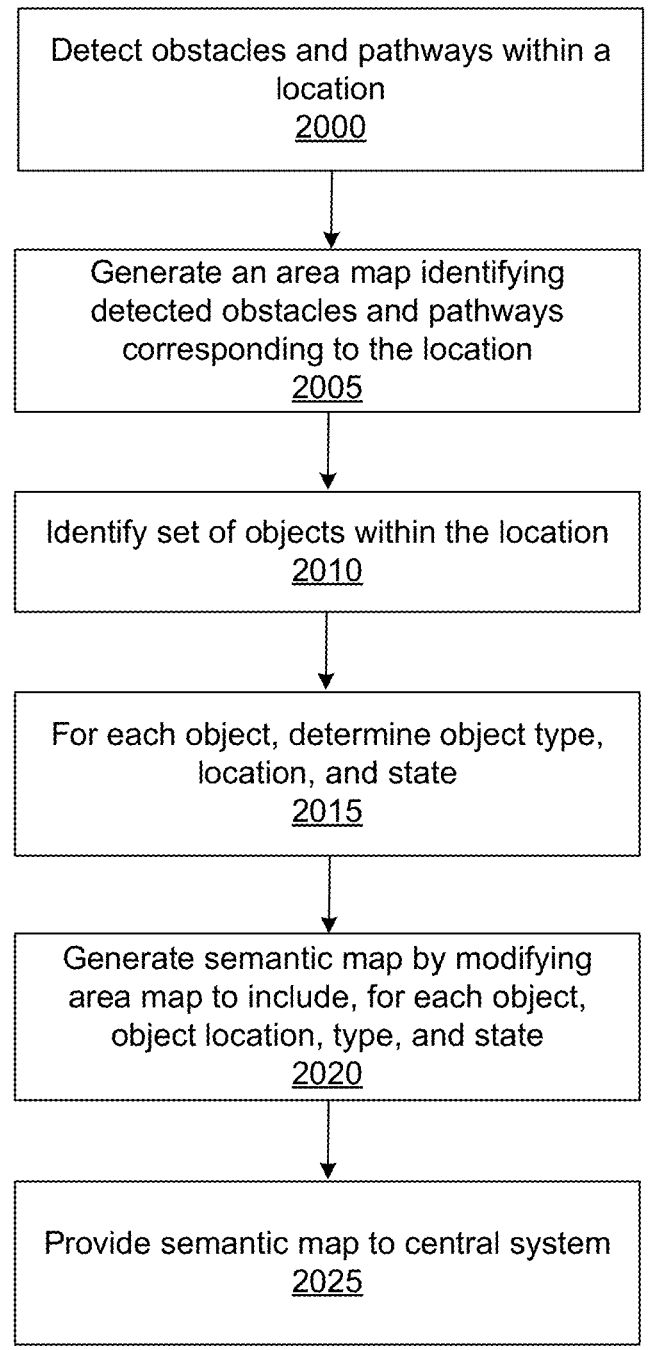
FIG. 20 is a flow chart illustrating a process for generating a semantic map, according to one embodiment.

FIG. 20 is a flow chart illustrating a process for generating a semantic map, according to one embodiment. A robot detects 2000 obstacles and pathways within a location (such as a building floor), for instance using laser rangefinders or other object, obstacle, or depth sensors. The robot generates 2005 an area map (or non-semantic map) identifying the location of the detected obstacles and pathways corresponding to the location. The robot identifies 2010 a set of objects within the location, for instance using a camera array or other sensors or image recognition components. The robot determines 2015, for each object, a type of the object, the location of the object, and a state of the object. The robot generates 2020 a semantic map by modifying the area map to include, for each object, the type and state of the object at the location within the area map corresponding to the location of the object. In some embodiments, the semantic map includes an identifier or other identifying information corresponding to the detected objects. The semantic map is then provided 2025 to a central system, for instance a system communicatively coupled to the robot.

B. Semantic Map Usage

In some embodiments, a floor plan for a building floor can be generated based on a semantic map generated by the robot 100. Likewise, a semantic map can be generated by the robot based on a building floor plan. As used herein, a floor plan can include a SLAM map. Locations of needed informational signage within the building floor can be identified using the semantic map, for instance wheel-chair ramp access signs, conference room names, restroom signs, and navigational signs (for example, indicating a direction to the kitchen). In some embodiments, a robot, security personnel 250, or any other individual can use a semantic map to identify any safety equipment (such as fire extinguishers) or building infrastructure (such as elevators) that require inspections soon, or whose inspections are past due.

A robot 100 can navigate within an area using a semantic map or a generated floor map, for instance by selecting a route that avoids obstacles (e.g., by a threshold distance), by selecting routes that avoid high-trafficked areas, by selecting routes that maximize the robot's exposure or proximity to high-value assets or other objects, and the like. In some embodiments, the robot can plan a route through an area (such as a building floor) in advance using the semantic map, or can dynamically adjust a route by querying the semantic map to identify an alternative route to a location (for instance, in the event that a route is blocked or in the event that suspicious activity or a security violation is detected).

Semantic maps can include permissible locations within map portions for detected objects. For instance, for high-value objects, such as computer equipment or sensitive documents, a semantic map can identify rooms in which the high-value objects are allowed to be taken. A robot 100 can detect an object within a building (for instance, while patrolling a route through the building), can query a semantic map of the building with an identifier identifying the detected object to determine portions of the building in which the detected object is permitted to be, and can determine whether the detected object is located in a location in which it is not permitted to be. In such instances, the robot can notify security personnel 250 to relocate the object to a permissible location and can monitor the object until the security personnel arrive. In some embodiments, the robot can physically relocate the object to a permissible location, for instance using one or more robotic arms 740. In some embodiments, the robot, while patrolling a route, can detect all objects within an area (for instance, by scanning RFID tags coupled to the objects), and can use the semantic map to identify any detected objects within the area that are not permitted to be within the area, to identify any detected objects that are misplaced (for instance, after an office move from a first location to a second location), or to identify any detected objects flagged as lost.

Semantic maps can be used by a robot 100 to determine if particular rooms are over capacity. For instance, if a semantic map indicates that a particular conference room as a maximum occupancy of 10 people, a robot can determine that the conference room is over-capacity in response to detecting more than 10 people within the room. In such instances, the robot can inform the occupants that the room is over-crowded, or can flag the room for manual inspection by security personnel 250. In some embodiments, the semantic map can be used to identify historically under-utilized rooms, for instance at particular times of the day. In such embodiments, the identified under-utilized rooms can be prioritized for future room reservations, for instance by suggesting such rooms to individuals attempting to schedule meetings.

Semantic maps can be used to identify objects or infrastructure in needed of maintenance or repair. For instance, a robot 100 can use a semantic map to identify light bulbs that need to be replaced, leaks that need to be fixed, cracks within walls that need to be fixed, trash cans that need to be emptied, and the like. In response to identifying the objects or infrastructure in need of maintenance or repair, the robot can request that maintenance or building personnel perform the maintenance or repair. It should be noted that in some embodiments, a robot can perform these tasks without the use of a semantic map (for instance, by detecting a burnt out light bulb or a full trash can while patrolling a route). Likewise, it should be noted that in some embodiments, the semantic map can identify a location of objects (such as light fixtures or trash cans) within an area, but not the current state of such objects, and the robot can patrol a route within a proximity of each of the locations of the objects to determine if the objects need maintenance or repair (for instance, by detecting whether a light bulb is burn out or a trash can is full). In some embodiments, robots can regularly, periodically, or in response to a manual request, patrol maintenance routes based on a location of maintenance-related objects identified by a semantic map. It should also be noted that as described herein, the robot can update a semantic map in response to detecting events or characteristics of a location associated with the semantic map (e.g., by indicating a location of a burnt out light bulb, a broken window, etc.)

The robot 100 can use locations of likely false positive detections identified by a semantic map to determine if a detected object or individual is the result of a false positive detection. For instance, if a robot scans a wall poster of a person and identifies the person within the poster as an individual, the robot can query a semantic map to see if the location of the poster is associated with frequent or possible false positive detections of individuals. In such embodiments, the robot can flag the potential false positive detection for manual classification by an operator of the robot, can dismiss the detected individual as a likely false positive, can perform additional scans (such as heat scanning, IR scanning, or depth detection) to aid in the classification, or can perform any other suitable action in response to the semantic map identifying the location as associated with false positive detections. In some embodiments, in response to one or more false positive detections within a particular location, the robot can institute a "time-out" period, where subsequent detections within the location are ignored or classified as also likely false positive detections.

The robot 100 can measure various signals within a location, for instance while moving through the location or patrolling a route, and can aggregate the measured signals over time to obtain average signal values for particular locations. For instance, the robot can measure temperature, WiFi signal strength, detected network activity, the location and strength of Bluetooth or RFID beacons and devices, carbon monoxide levels, and the like. The aggregated information can be included within a semantic map, for instance as a heat map, where color or shade is used to represent values of the aggregated information (e.g., the color red can be used to represent high levels of WiFi signal strength, the color blue can be used to represent low levels of WiFi signal strength, and colors in between can be used to represent middle levels of WiFi signal strength). The robot can use a semantic map that includes aggregated or historical signal information to perform one or more functions or security operations. For example, if the robot loses connectivity to the network 200, the robot can use the semantic map to identify a location within a floor that historically has strong WiFi signal strength, and can move to the identified location to reconnect with the network. The loss of connectivity implies a loss of the inability of a robot operator to control the robot; thus, the ability of the robot to autonomously relocate to reconnect to the network beneficially enables the robot to restore the ability of the operator to control the robot.

Continuing with the above example, the robot 100 can use a semantic map that includes aggregated or historical signal information to identify locations with abnormally high or low temperatures (which may indicate a security violation, a broken furnace or air conditioning unit, an open or broken window, or the like), to identify locations with dangerous levels of carbon monoxide, to identify areas with abnormally high levels of network activity (which may indicate a security violation), or to identify any other signals that vary from historical averages or ranges. In such embodiments, the robot can perform a security operation (for instance, investigating a cause of the abnormal signal values, requesting security personnel 250 to come investigate, or performing an action or security operation using an infrastructure system 220 or security system 230), can trigger a fire alarm or fire sprinklers (for instance, in the event that abnormal levels of smoke or carbon monoxide are detected, in order to evacuate the premises), can request maintenance personnel to investigate (for instance, in response to determining that a heating or cooling system is broken), or can update the semantic map to include the abnormal signal information.

In some embodiments, semantic maps can include information identifying an individual's historical movements or behaviors. In such embodiments, the robot 100 can identify an individual within a location and/or performing an activity, and can use a semantic map to determine if the user is in a location outside of the historical norms of the user's movements or if the user's activity is outside of the historical norms of the user's behavior. In both instances, the robot can determine that the user may be acting suspiciously, and may represent a security policy violation. In response, the robot can perform a security operation, such as following and monitoring the individual, requesting that a security system 230 record video of the individual, locking nearby doors, and the like.

The robot 100 can update a semantic map as the robot moves within an area, for instance as the robot patrols the area. For example, as the robot detects objects, object states, and object characteristics during a patrol route, the robot can update a semantic map with information representative of the detected objects, states, and characteristics. As the robot patrols a route, the robot can query such a semantic map to determine if a detected object is in a different location than indicated by the semantic map, to determine if the object is in a different state that indicated by the semantic map, or to determine if the characteristics of the object are different than indicated by the semantic map. For instance, if the robot detects a window and determines that the window is closed on a first patrol of a route, updates a semantic map to indicate that the window is closed, then subsequently determines that the window is open on a second patrol route, the robot can query the semantic map to determine that the state of the window has changed between patrol routes. In such instances, if robot uses a semantic map to determine if the location, state, or other characteristics of a detected object changes, the robot can identify the change as a potential security threat or policy violation, and can perform one or more security operations in response.

The robot 100 can use a semantic map to identify infrastructure systems 220 and security systems 230 closest to a particular location. For instance, if the robot detects a potential intruder within a building at a given location, the robot can query the semantic map to identify security cameras closest to the given location, and can instruct the security cameras to look for and record video of the potential intruder. Likewise, if the robot detects smoke or high levels of carbon monoxide, the robot can query the semantic map to identify the fire detectors closest to the robot, can request smoke detection information from the identified fire detectors, can query the semantic map to identify fire sprinklers closest to the robot in the event that the fire detectors also detect smoke, and can activate only the identified fire sprinklers (beneficially reducing the damage caused by more distance fire sprinklers while still targeting the locations in which the smoke originates). Accordingly, the robot can query a semantic map with a location to identify infrastructure or security systems closest to the location, and can perform an action (such as a security operation) using the identified infrastructure or security systems.

Figure 21:
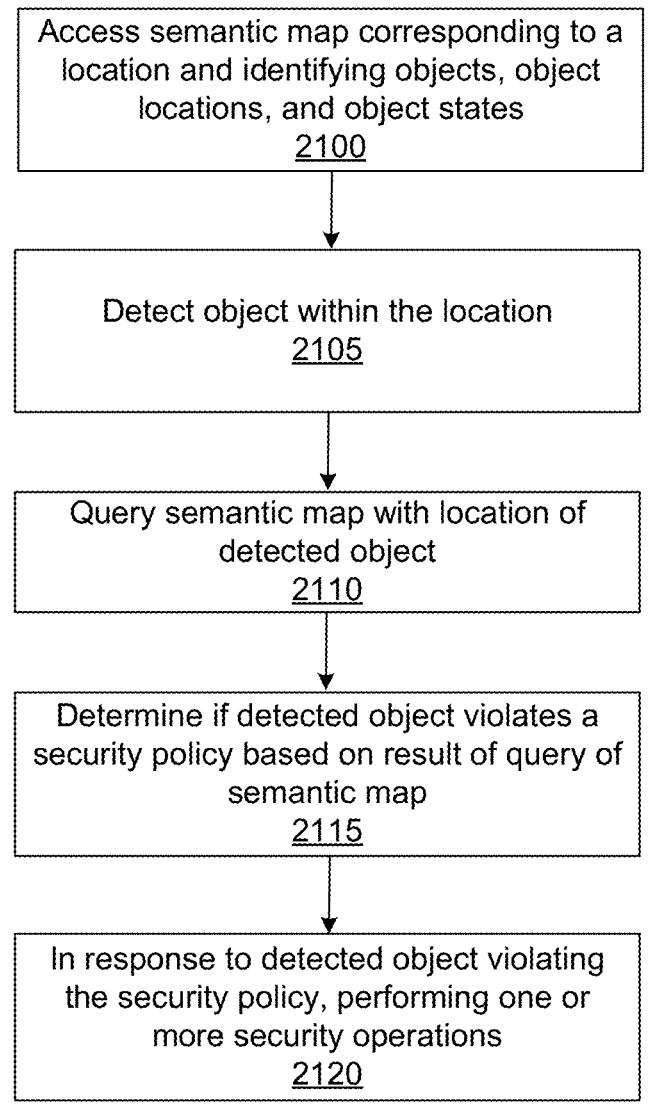
FIG. 21 is a flow chart illustrating a process for detecting security policy violations and performing security operations using a semantic map, according to one embodiment.

FIG. 21 is a flow chart illustrating a process for detecting security policy violations and performing security operations using a semantic map, according to one embodiment. A semantic map corresponding to a location is accessed 2100 by a robot (for instance, a robot patrolling a building floor). The robot detects 2105 an object with the location, and queries 2110 the accessed semantic map with the location of the detected object. In some embodiments, instead of querying the accessed semantic map with the location of the detect object, the robot queries the semantic map using an identifier or other property of the object (such as an RFID tag identifier). A result set of objects and corresponding information (such as object types, locations, and states) is accessed in response to the query. The robot determines 2115 if the detected object violates a security policy based on a result of the query of the semantic map. For instance, the robot can determine that a location or state of the detected object has changed in violation of a security policy governing the location or state of the detected object. In response to the detected security policy violation, the robot performs 2120 one or more security operations. For instance, the robot can monitor the detected object, can request security personnel investigate the detected object, or can instruct nearby security cameras to record video of the detected object.

RFID Management

As noted above, the RFID system 738 of the robot 100 can identify and determine the location of RFID tags within a proximity of the robot. In some embodiments, the robot can autonomously identify RFID tags within an area, beneficially enabling the robot to take inventory of objects coupled to the RFID tags, to identify missing RFID tags, to identify moved or misplaced RFID tags, and to update an inventory database based on the identified RFID tags. Although reference will be made herein to retail embodiments (with retail inventory coupled to RFID tags), it should be noted that the principles described herein apply equally to any embodiment in which the location and tracking of RFID tags is desirable, such as warehouse environments, office environments, laboratory environments, high security environments, and the like. It should also be noted that while reference is made to RFID readers and tags herein, the description herein applies equally to any type of signal emission and detection devices.

A. RFID Tag Detection

The robot 100 navigates within a location (such as a retail store or building floor) and identifies RFID tags within the location. In some embodiments, any number of robots can identify RFID tags within the location, for instance one or more ground-based robots and/or one or more aerial systems. Robots with RFID reading capabilities can beneficially detect RFID tags coupled to objects that tend to be relocated or moved, can beneficially increase an RFID detection area by virtue of the movement of the robot, and unlike stationary or wall/ceiling-mount readers, aren't limited in coverage scope.

As noted above, RFID tags can be coupled to retail inventory (for instance, clothing, electronics, books, and the like), warehouse inventory (such as boxes, crates, and the like), important assets (such as lab equipment, computer equipment, and the like), or to any suitable object. RFID tags can be passive (providing identification information at short distances in response to receiving a signal from a reader's interrogating radio waves) or active (with a local power source configured to provide identification information at much longer distances, and without requiring the receipt of a signal from a reader). In some embodiments, RFID tags can be stickers applied to a surface or object, while in other embodiments, RFID tags can include larger circuitry, a housing, a power source, and the like.

As noted above, the robot 100 can include reader antennas 730 to identify or detect RFID tags, and can include direction of arrival (or "DoA") antennas 732 to determine a location of the detected RFID tags. The RFID reader antennas of the robot can be distributed along a height of the robot, enabling the robot detect RFID tags at a plurality of heights. In some embodiments, the locations of the reader antennas are fixed, while in other embodiments, the reader antennas are configured move along a height of the robot, beneficially enabling the reader antennas to dynamically scan a plurality of heights for potential RFID tags. Likewise, the RFID DoA antennas can be fixed at various locations along a height of the robot, for instance at a top of the robot, on an exterior of the robot, or within the robot body. In other embodiments, the location of the DoA antennas can be changed dynamically. In embodiments where the robot can adjust a height of the reader antennas or DoA antennas, the reader or DoA antennas can be located on a moveable or extendible arm, or can be located on a moving surface within or on the outside of the robot.

Figures 22A, 22B:
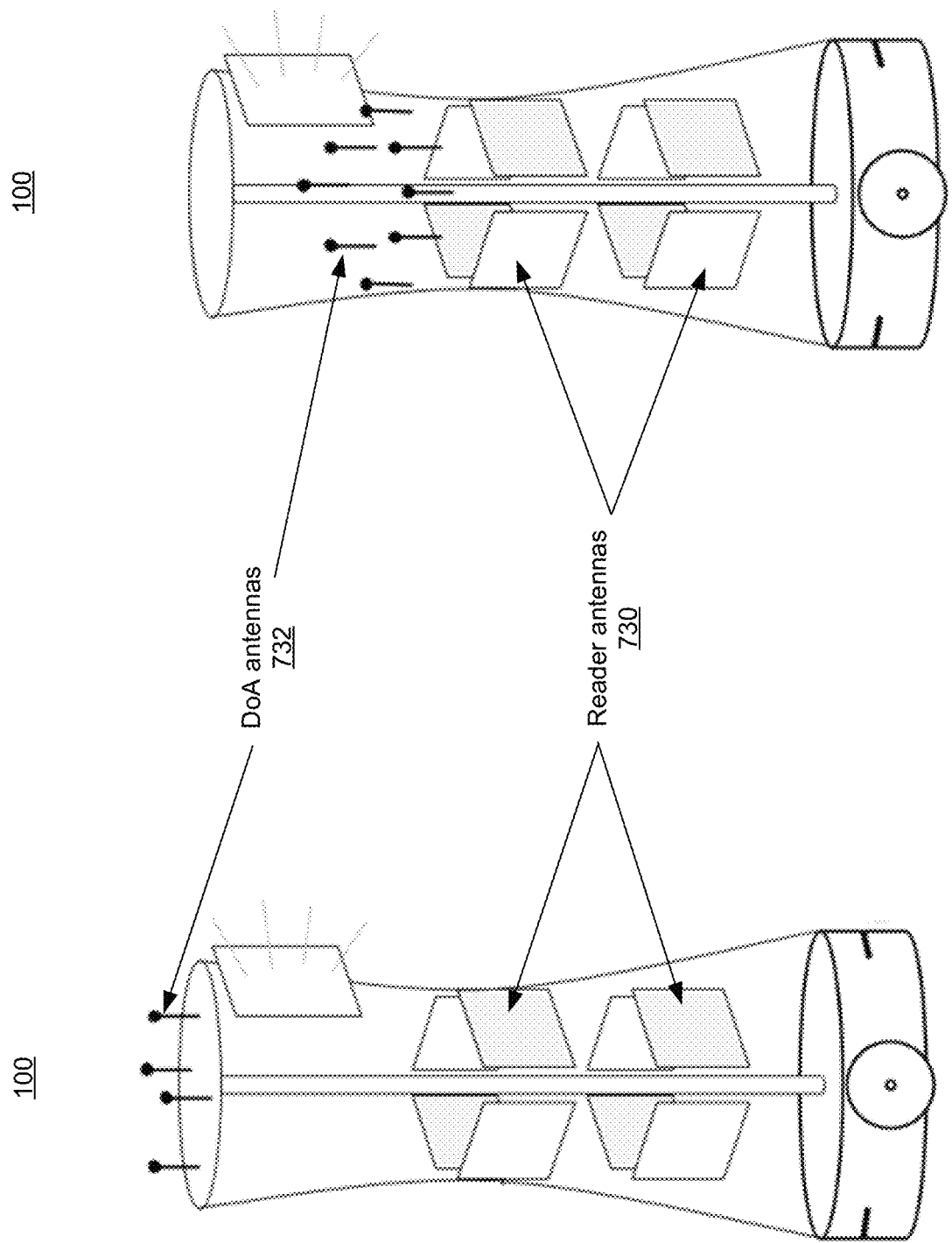
FIGS. 22A and 22B illustrate example antenna distributions within a robot, according to one embodiment.

FIGS. 22A and 22B illustrate example antenna distributions within a robot, according to one embodiment. In the embodiment of FIG. 22A, the robot 100 includes two sets of reader antennas 730 at two different heights within the robot, and includes a set of DoA antennas 732 on a top surface of the robot. In the embodiment of FIG. 22B, the robot 100 includes a similar distribution of reader antennas, but includes a set of DoA antennas within the robot body.

In some embodiments, the reader and DoA antennas can be distributed around a circumference or perimeter of the robot 100. For instance, in the embodiment of FIGS. 22A and 22B, the reader antennas 730 and the DoA antennas 732 each include a set of four antennas facing outward at distributed at 90 degree intervals around the circumference of the robot. In some embodiments, each antenna has a beamwidth of greater than 90 degrees such that a set of four antennas can form a collective beamwidth of 360 degrees around the robot. In some embodiments, each reader or DoA antenna is circularly polarized, while in other embodiments, pairs of antennas can be linearly polarized. In some embodiments, antenna arrays can be located on a rotating component within the robot (such as the robot head 602 or body 604), beneficially enabling the robot to rotate a portion of the robot to provide expanded and/or dynamically beamwidths without requiring the rotation of the entire robot.

Figure 23A:
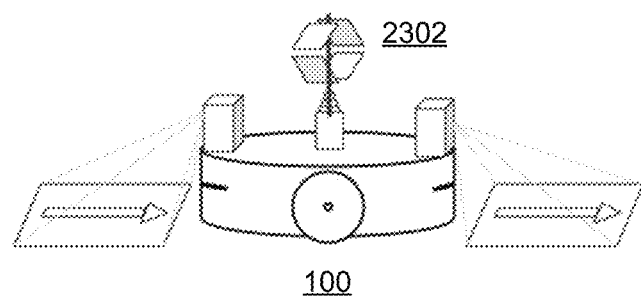
FIGS. 23A and 23B illustrate an example of an antenna array located on an extendible robot boom arm, according to one embodiment.
Figure 23B:
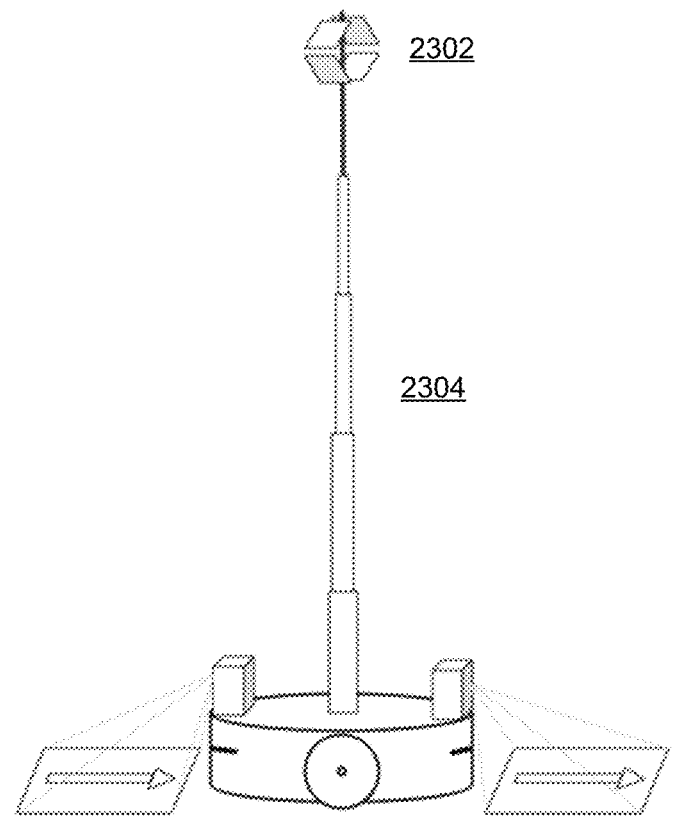

In some embodiments, the RFID antenna arrays can be located on a boom arm that can extend outward and away from the robot, beneficially providing coverage of locations outside the dimensions of a robot 100. FIGS. 23A and 23B illustrate an example of an antenna array located on an extendible robot boom arm, according to one embodiment. In the embodiment of FIG. 23A, the robot 100 includes an antenna array 2302 located on a collapsed boom arm. In the embodiment of FIG. 23B, the boom arm 2304 is extended upward and away from the robot body, beneficially enabling the robot to reader RFID signals at heights much greater than the height of the robot itself.

To locate items coupled to RFID tags, the robot 100 can scan areas in a direction and height corresponding to locations where items coupled to the RFID tags can be located. For example, for a circular rack within a store, the robot can circumnavigate around the rack, and can aim a reader antenna array at a height corresponding to the rack (or a threshold distance below the rack to compensate for the height of a hanger) to scan for RFID tags. Likewise, for a set of shelves, the robot can aim a reader antenna array at heights corresponding to each shelf, or can "sweep" the shelves by adjusting a height of the reader antenna array from a top of the shelves to the bottom (or vice versa). In some embodiments, the robot can perform a 3D scan of infrastructure within a store to identify potential locations for store inventory, and can aim reader antenna arrays based on the identified potential locations to scan for RFID tags. Likewise, the robot can access pre-existing 3D data for store infrastructure to identify the potential locations to scan for RFID tags. By identifying potential locations for RFID tags, the robot can also determine the location of items coupled to the RFID tags without the need for a DoA antenna array. For instance, if the robot identifies a set of cubby holes within a shelving structure, the robot can scan each cubby hole, and in response to scanning a cubby hole and identifying an RFID tag, the robot can determine that the location of the identified RFID tag is the scanned cubby hole.

B. RFID Tag Localization

The robot 100 can determine a location of a detected RFID tags in a number of ways. In some embodiments, the robot can determine a location of a detected tag by evaluating a proximity of the robot to potential tag locations. In such embodiments, if only one potential RFID tag location is within a threshold distance of the robot at the time the tag is detected, the robot can determine that the detected RFID tag is located at the potential RFID tag location. Likewise, if many potential RFID tag locations are within a threshold distance of the robot at the time the tag is detected, but only one of the potential RFID tag locations is historically associated with the detected RFID tag, the robot can determine that the detected RFID tag is located at the potential RFID tag location historically associated with the detected RFID tag.

The robot 100 can also determine a location of a detected RFID tag based on two instances of detecting the tag. For instance, the robot can detect the RFID tag a first time when navigating a first straight-line path within a proximity of the tag. The robot can determine a first location of the peak signal strength of the detected RFID tag, and can identify a first direction to the detected tag as the direction perpendicular to the navigation direction of the robot while navigating the first path. The robot can detect the RFID tag a second time when navigating a second straight-line path with a proximity of the tag, can determine a second location of the peak signal strength of the detected RFID tag while navigating the second path, and can identify a second direction to the detected tag as the direction perpendicular to the navigation direction of the robot while navigating the second path. The robot can determine that the location of the detected RFID tag is the location of the intersection of a first line defined by the first location (of the first peak signal strength) and the first direction and a second line defined by the second location (of the second peak signal strength) and the second direction. As used herein, "peak signal strength" can refer to peak received signal strength indicator or "RSSI", or can refer to any suitable measure of signal strength.

In some embodiments, the robot 100 can determine a location of a detected RFID tag by detecting a first peak signal strength of the RFID tag, by moving in a first direction perpendicular to the direction of movement of the robot at the location of the first peak signal strength, and by determining a second peak signal strength of the RFID tag. In the embodiment that the second peak signal strength of the RFID tag is less than the first peak signal strength, the robot can return the location of the first peak signal strength and move in a direction opposite the first direction. The process can be repeated, allowing the robot to iteratively move closer to the detected RFID tag until the robot is able to reduce the distance between the robot and the RFID tag to less than a threshold distance. The robot can then identify the location of the detected RFID tag, or can associate the location of the robot with the RFID tag (for instance, if the threshold distance is less than a meter, a foot, or any other suitable distance).

Alternatively, the robot 100 can include two directive patch antennas pointed in different directions such that the beamwidths of the antennas overlap at least somewhat. When an RFID tag is detected, the robot can measure a signal strength for each directive patch antenna, and can move in a direction of the antenna that measures a greater signal strength. This process can be repeated, allowing the robot to incrementally move closer to the detected RFID tag. The robot can then identify the location of the detected RFID tag, or can associate the location of the robot with the RFID as described above.

In some embodiments, the robot 100 can build a Bayesian sensor model for potential RFID tag locations (for instance, for a rack, shelf, changing room area, and the like) that predicts RFID tag signal measurements based on the expected distances and angles between the RFID reader antennas of the robot and the RFID tags at the potential RFID tag locations. The Bayesian sensor model for a potential RFID tag location can be built based on historical RFID tag signals detected by the robot as the robot moves in relation to the potential RFID tag location. The Bayesian sensor model can map one or more of detected RFID tags, RFID signal strengths, and robot locations to likelihoods that the RFID tag is located at one or more particular locations. Over time, the robot can generate a Bayesian sensor model for every potential RFID tag location within a store, and can select a Bayesian sensor model for use in locating an RFID tag based on a proximity to a potential RFID tag location at the time the robot detects the RFID tag being localized.

When the robot subsequently detects an RFID tag in proximity to the potential RFID tag location, the robot can select a Bayesian sensor model from a set of Bayesian sensor models based on a proximity to potential RFID tag locations, and can query the Bayesian sensor model with one or more of the detected RFID tag, the signal strength of the detected RFID tag, and the location of the robot at the time the RFID tag was detected. The Bayesian sensor model can return a set of potential RFID tag locations and corresponding likelihoods that the detected RFID tag is located at each location, and the robot can select among the potential RFID tag locations to locate the detected RFID tag. For instance, by selecting the most likely potential RFID tag location or by selecting a set of the most likely potential RFID tag locations. In some embodiments, the robot can move to another location and re-detect the RFID tag, and can re-query the Bayesian model using the re-detected RFID tag signal to obtain a second set of potential RFID tag locations and corresponding likelihoods, can combine the probabilities of the first set of potential RFID tag locations and the second set of RFID tag locations, and can select a potential RFID tag location based on the combined probabilities (for instance by selecting the most likely potential RFID tag location).

In some embodiments, stationary/permanent reference RFID tags within a store can be used to localize other RFID tags. For instance, a reference RFID tag can be placed on each end of a shelf. When the robot 100 detects an RFID tag, the robot can also detect one or both of the reference RFID tags. The robot can identify the location of the detected RFID tag as located on the shelf based on the detected reference RFID tags. In some embodiments, the robot can localize the detected RFID tag based on the strength of the detected referenced RFID tag signals. For instance, if the robot weakly detects one of the reference RFID tags and doesn't detect the other, and strongly detects the RFID tag being localized, the robot can determine that the RFID tag being localized is not located on the shelf (since otherwise the reference RFID tags would be detected more strongly). Likewise, if the robot detects a first reference RFID tag strongly, detects the second reference RFID tag weakly, and detects the RFID tag being localized strongly, the robot can determine that the detected RFID tag being localized is located on the side of the shelf closest to the first reference RFID tag.

As noted above, in some embodiments, the robot 100 can include a DoA antenna array to determine a location of a detected RFID tag. DoA antenna arrays can include a plurality of DoA antennas spaced a distance apart such that the antennas can detect a difference in phase of received RFID signal. In some embodiments, each DoA antenna pair is spaced a distance that is less than or equal to a quarter of the RFID signal wavelength. The robot can estimate a direction of arrival of the RFID signal based on the difference in signal phase detected by a DoA antenna pair. However, the estimated direction of arrival of the RFID signal represents the actual direction of arrival for the RFID signal, or 180 degrees from/the opposite of the direction of arrival for the RFID signal. To unambiguously identify the direction of arrival, a third DoA antenna can be included within the DoA array. In such embodiments, the third DoA antenna can detect the RFID signal, and if the detected RFID signal by the third DoA antenna is stronger than the RFID signal detected by one or both of the DoA antenna pair, the estimated direction of arrival for the RFID signal can be determined to be the actual direction of arrival for the RFID signal. Alternatively, if the detected RFID signal by the third DoA antenna is weaker than the RFID signal detected by one or both of the DoA antenna pair, the actual direction of arrival for the RFID signal can be determined to be 180 degrees from (or the opposite of) the estimated direction of arrival.

A DoA antenna array can include any number of DoA antennas (for instance, three, four, six, eight, or more), and can be located within or external to the robot 100. For instance, the DoA antenna array of the robot 100 can include four DoA monopole antennas equally spaced around a top surface circumference of the robot. For example, in the embodiment of FIG. 22A, the robot includes four DoA antennas 732 each spaced at 90 degree intervals from adjacent antennas around a center of the top surface of the robot. Likewise, the DoA antenna array can include eight DoA monopole antennas equally spaced around an inside perimeter of the robot body. For example, in the embodiment of FIG. 22B, the robot includes eight DoA antennas each spaced at 45 degree intervals from adjacent antennas around a center of the robot body.

In some embodiments, the DoA antenna array can include a first set of antennas to determine an azimuth direction of arrival for RFID signals (e.g., a horizontal angle of arrival relative to the horizon), and can include a second set of antennas to determine an elevation direction of arrival for RFID signals (e.g., a vertical angle of arrival relative to the horizon, or "elevational direction of arrival"). In such embodiments, the first set of antennas can be oriented perpendicular to the second set of antennas. Using two sets of DoA antennas can enable the robot 100 to determine an exact direction of a detected RFID signal (e.g., not just a direction of arrival angle parallel to the floor, but also including an angular displacement upward or downward relative to the floor).

In addition to detecting a direction of arrival for detected RFID signals, the robot 100 can determine a distance between the robot and the corresponding RFID tag. In some embodiments, the robot can determine a signal strength of the detected RFID signal (e.g., the "RSSI" of the detected signal), and can determine a distance between the robot and the corresponding RFID tag based on the determined signal strength. In some embodiments, the robot can perform frequency modulation continuous wave ("FMCW") ranging on the detected RFID signal to determine a distance between the robot and the corresponding RFID tag.

In embodiments where the robot 100 can determine an azimuth direction of arrival for a detected RFID tag and a distance between the robot and the tag, the robot can identify a location of the RFID tag within a two-dimensional map (for instance, a floor plan of a retail store). Likewise, in embodiments where the robot can determine an azimuth direction of arrival, an elevational angle of arrival, and a distance to the RFID tag, the robot can identify a location of the RFID tag within a third-dimensional map (for instance, a three-dimensional rendering of a retail store).

C. Robot Behavior in RFID Environments

When scanning for RFID tags within a retail store, the robot 100 can plan a path through the store based on historical locations or RFID tags and/or based on known possible locations for RFID tags. For instance, if a store includes a set of infrastructure objects configured to hold store inventory, the robot can select a route through the store that comes within a threshold distance of each of the set of infrastructure objects. As used in this context, "threshold distance" refers to a distance within which the robot is likely to detect an RFID tag (for instance, at a 90% likelihood, a 95% likelihood, a 98% likelihood, or any other suitable likelihood). This threshold distance can also be based on the RFID reader antenna array strength, the transmission strength of each RFID tag, or any other suitable factor.

The robot 100 can also select a route through the store that comes within a threshold distance of each historical location of RFID tag within the store. The robot can also plan a path through a store based on sales data for the store. For example, if store sales registers indicate that a set of items has been sold, the robot can select a route through the store that comes within a threshold distance of the historical locations of each of the sold set of items. Likewise, the robot can select a path through a store that comes within a threshold distance of all items that sell above a threshold rate (for instance, a daily or hourly rate).

The robot 100 can additionally plan a path through a store to scan for RFID tags based on a goal of the scan. For instance, if the goal of the robot is to quickly scan for all possible RFID locations within the store or within a portion of the store, the robot can select a path through the store that maximizes the number of items the robot comes within a threshold distance of while ensuring that the robot can navigate the path in less than a threshold amount of time. Such a path can beneficially enable the robot to quickly identify RFID tags within the store or portion of the store, but at the cost of a potentially inaccurate or incomplete scan. Likewise, if the goal of the robot is to identify a maximum number of RFID tags within the store or store portion, the robot can select a path that minimizes the distance between the robot and historical locations of each RFID tag.

Figure 24:
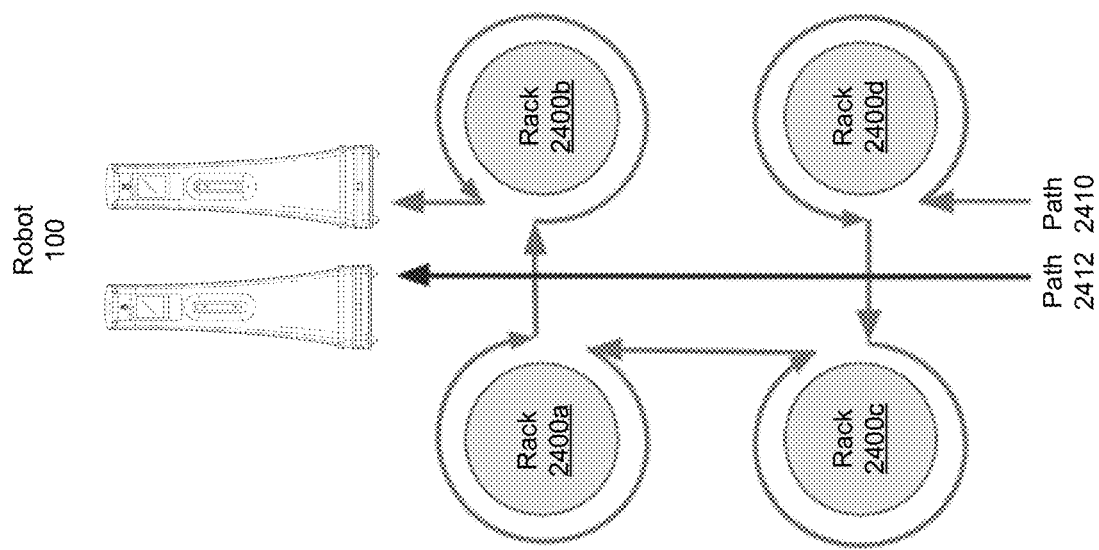
FIG. 24 illustrates example navigable paths through an environment to scan for RFID tags, according to one embodiment.

FIG. 24 illustrates example navigable paths through an environment to scan for RFID tags, according to one embodiment. In the embodiment of FIG. 24, the robot 100 can select path 2410, which circumnavigates 75%, 80%, 90%, or more of each of rack 2400*a*, 2400*b*, 2400*c*, and 2400*d*. While navigating this route, the robot can scan for RFID tags by aiming an antenna array at each rack as the robot circumnavigates the rack, beneficially allowing the robot to determine that the location of each detected RFID tag is on the rack that the robot is circumnavigating at the time the RFID tag is detected. Likewise, the robot can select path 2412, which takes less time to navigate than path 2410. However, while the robot passes with a threshold distance of each rack while navigating path 2412, the robot is unable to determine which rack a detected RFID is located on. Accordingly, the speed of navigating path 2412 comes at the cost of not being able to localize detected RFID tags.

In some embodiments, the robot 100 can navigate down every aisle in a store, or can navigate every second aisle if the reader antenna array of the robot is strong enough to detect RFID tags across aisles. In some embodiments, the robot can select a path through a store based on values of items coupled to RFID tags. For instance, the robot can select a path through the store that comes within a threshold distance of each item in a set of high-value items, beneficially increasing the likelihood that the robot will detect the RFID tags coupled to the set of high-value items when navigating the selected path. The robot can also select a path based on locations where items waiting to be returned to the sales floor may be located. For instance, the selected path may come within a threshold distance of each changing room within a store, each return rack with the store, and sales counters within the store.

The robot 100 can additionally select a path through a store to scan for RFID tags based on information describing historical foot traffic through the store. For instance, the robot can select a path that comes within a threshold distance of each historical RFID location while avoiding areas of above-threshold foot traffic. Likewise, if a particular passage within the store is less than a threshold distance wide, the robot can select a path through the store that avoids the particular passage. In addition, the robot, while navigating a path through the store to scan for RFID tags, can detect people within the store, and in response to detecting people blocking a particular passage of the path within the store, the robot can wait for the people to move before proceeding, can request that the people move, or can select an alternative route that comes within a threshold distance of historical RFID locations or determined potential RFID locations.

The robot 100 can scan for expected RFID tags coupled to retail inventory in a location within a retail store, and in response to scanning the location for the expected RFID tags and not finding the tags, can request that additional inventory be brought to the store floor to replace the missing inventory. For example, the robot can identify the missing inventory to the central system 210, which in turn can instruct store personnel to restock the missing inventory. Alternatively, the robot or the central system can instruct another robot to retrieve replacement inventory from storage, or the robot can itself retrieve the replacement inventory from storage and can restock the retrieved replacement inventory at the location with the retail store. In some embodiments, the robot can determine that replacement inventory is not locally available, or is in low supply, and can order additional replacement inventory from a warehouse, distribution facility, or other inventory source.

In some embodiments, the robot 100 can scan inventory storage to identify inventory in low supply, and can order replacement inventory as needed (for instance, if the quantity of replacement inventory falls below a threshold). Replacement inventory can also be ordered based on a rate of sales of the inventory. For instance, if the replacement inventory corresponds to an above-threshold rate of sales, the robot can order replacement inventory, while if the replacement inventory corresponds to a below-threshold rate of sales, the robot can order replacement inventory when the available replacement inventory falls below a threshold quantity. In some embodiments, the robot can order replacement inventory based on a combination of rate of sales of the inventory and the available quantity of replacement inventory.

The robot 100, in response to scanning for RFID tags while navigating a first path through a store and detecting a large discrepancy between expected RFID tags and detected RFID tags, can select a second, more comprehensive path through the store that maximizes the likelihood that RFID tags present within the store will be scanned. Such a configuration beneficially enables a robot to navigate shorter paths through a store most of the time, while still enabling the robot to navigate comprehensive paths through the store when needed. In response to a large discrepancy between RFID tags detected while navigating the second, more comprehensive path in a store and expected RFID tags in the store, the robot can flag the missing items coupled to the expected-but-not-scanned RFID tags as potentially stolen, and can notify store employees of the discrepancy.

Shoppers within a retail store can interact with the robot 100, for instance via the display 720 or by talking to the robot. For instance, if the display is a touch-screen display, the display can display the text "How can I help you?", along with selectable options including "help me find an item", "talk to the store manager", or "sale items". In response to the selection of an option by a shopper, the display can take one or more actions or access and display appropriate information. In some embodiments, the shoppers can speak directly with the robot, which can identify what the shoppers are saying and can take actions or provide information as needed. For example, if a user selects the "help me find an item" or asks the robot to show the location of an item, the robot can query the store's inventory database to determine if the item is still available for sale, can say "follow me", can navigate to the last known location of the item within the store, can scan nearby RFID tags to identify an exact location of the item, and can highlight the item for the shopper (for instance, using a laser pointer or projecting an arrow on the ground to indicate the location of the item). In some embodiments, the robot can access parse and process user requests autonomously, but in embodiments in which the robot is unable to parse and process a user request, the robot can provide the request to an operator of the robot, who can instruct the robot to perform an action or provide appropriate information in response.

In some embodiments, the robot 100 can scan for RFID tags within a store to identify locations of RFID tags within the store, and can compare the identified locations with a semantic map including information identifying last known locations of the RFID tags or historical locations of RFID tags. In embodiments where the identified locations of the RFID tags differ from the locations within the semantic map, the robot can move items coupled to the RFID tags within the store to the locations identified by the semantic map, can flag the items coupled to the RFID tags along with the identified locations of the RFID tags as misplaced or moved for a store employee to relocate the items coupled to the RFID tags, or can update the semantic map to reflect the identified locations of the RFID tags. In other words, during the course of moving through a store, the robot can identify items that have moved, and can update a semantic map to reflect the movement, beneficially producing a semantic map that includes up-to-date locations for store inventory.

In some embodiments, the robot 100 can scan for RFID tags within a doorway of a room, for instance in order to determine if an item coupled to an RFID tag is located within the room. If the robot detects the RFID tag within the room, the robot does not need to enter the room, as the item coupled to the RFID tag has already been determined to be in the room. However, if the robot does not detect the RFID tag within the room, the robot can enter the room in order to more comprehensively scan for the item. For instance, if the room is a conference room with a large conference table, and the item coupled to the RFID tag is a projector, the robot can enter the conference room, can circumnavigate the conference table in order to determine if the projector is located on the table, and in response to detecting the RFID tag, the robot can update an inventory or semantic map to indicate the detected location of the project, can store the location of the projector in a database, or can notify an operator of the location of the projector. If, after entering the room and more comprehensively scanning for the projector, the robot is unable to detect the RFID tag coupled to the projector, the robot can flag the projector as potentially lost, can inform an operator or building personnel of the missing projector, or the like. Accordingly, the movement/navigation of the robot can be adjusted based on the detection or absence of the detection of an RFID tag.

Figure 25:
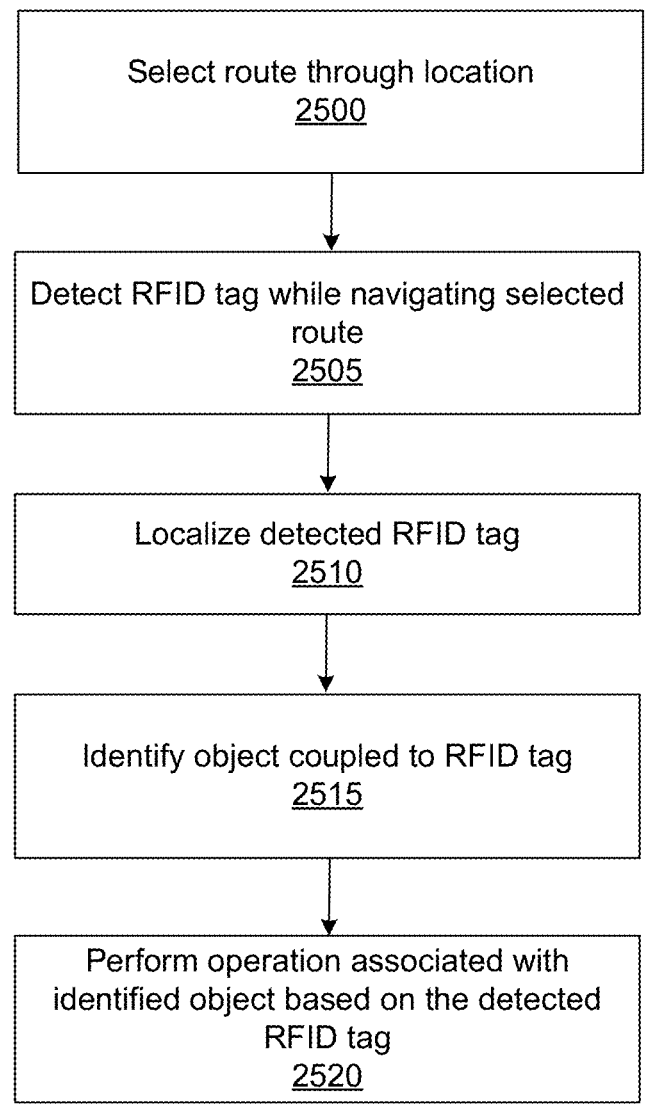
FIG. 25 is a flow chart illustrating a process for detecting and localizing RFID tags, according to one embodiment.

FIG. 25 is a flow chart illustrating a process for detecting and localizing RFID tags, according to one embodiment. A robot selects 2500 a route through a location, such as a retail store. As noted above, the route can be selected in order to minimize the amount of time it takes the robot to navigate the route, in order to maximize the number of RFID tags detected within the location, based on historical foot traffic within the location, based on historical RFID tag locations within the location, and the like. In some embodiments, the route is selected by the robot as part of a periodically-performed patrol operation, while in other embodiments, the robot selects the route in order to locate an item or perform an inventory-related operation. In some embodiments, the route is selected as part of an operation unrelated to scanning for RFID tags (for instance, in response to a customer query, in response to the performance of a security operation, and the like).

The robot detects 2505 an RFID tag while navigating the selected route. The RFID tag can be detected using, for instance, an array of RFID reader antennas. The robot can then localize 2510 the detected RFID tag. As noted above, the detected RFID tag can be localized by detecting the RFID tag from multiple locations and extrapolating the RFID tag location, by identifying a set of potential RFID tag locations and selecting among the potential RFID tag locations, or by correlating the detected RFID tag with corresponding historical RFID tag locations to identify the detected RFID tag location. In some embodiments, the robot can include a DoA antenna array, and can determine the location of the RFID tag using the DoA antenna array to determine an azimuth direction of arrival of a received RFID signal, and/or determining an elevational direction of arrival of the received RFID signal. The robot can further determine a distance between the robot and the detected RFID tag, for instance based on a signal strength of the detected RFID signal.

The robot identifies 2515 an object coupled to the RFID tag. For example, in retail environments, the object can be an object for sale within the retail store, while in warehouse environments, the object can be a box or crate of inventory. The robot performs 2520 an operation associated with the identified object based on the detected RFID tag. In some embodiments, the operation includes updating an inventory database to include the identified object coupled to the detected RFID tag. In other embodiments, the operation can include updating an inventory database with the determined location of the detected RFID tag, informing a customer of the location of the identified object coupled to the RFID tag (for instance, in response to a request from the customer for the location of the RFID tag), informing a store employee of the location of the identified object, flagging the identified object within an inventory database for relocation, moving the identified object to a location identified by an inventory database and corresponding to the identified object, adjusting the selected route of the robot based on the location of the detected RFID tag, or any other suitable operation based on one or more of the detected RFID tag, the identity of the object coupled to the RFID tag, and the determined location of the RFID tag.

Robot Behavior: Autonomous Vs. Human-Operated

As noted above, the central system 210 can present a security interface to an operator. The security interface can be displayed to the operator via a remote access interface 240, which as noted above is a computer system, remote terminal, mobile device, and the like. The security interface can be displayed within a native application, web browser, or other interface of the remote access interface 240. This allows an operator to monitor and control one or more robots (for instance, a fleet of 20 robots) within one or more locations (such as a building floor, multiple building floors, portions of different buildings, and the like).

An operator of a robot fleet may be unable to efficiently monitor the large amount of information provided by the robots for display within the security interface. For example, if each robot in a monitored fleet of robots provides information to the security interface every minute, the quantity of information displayed by the security interface may scroll too quickly for the operator to identify the most relevant portions of the information. Likewise, for an operator monitoring several robots simultaneously, the operator may be unable to effectively manually control each of the robots. For example, an operator may be able to provide individual instructions or sets of instructions to each robot, but at the cost of one or more robots in the fleet remaining idle while the operator is providing instructions to other robots.

Accordingly, reducing the burden on an operator by automating robot functionality and consolidating robot information can enable the operator to more effectively monitor and control a set of robots. Further, reducing an operator's burden can allow the operator to prioritize her focus on high-risk or dangerous security events (such as security violations, break-in attempts, fires, and the like), while knowing that the remaining robots in the fleet will continue to operate without direct operator intervention. However, in certain situations (such as situations where the robot is unable to adequately assess a risk), human operator control is required, and thus there is a benefit to enable the robot to engage a human operator when needed.

A. Security Operations Based on Image Classification

As noted above, during the course of operation (such as patrolling a route through a building floor), a robot 100 can capture images of objects or areas within a vicinity of the robot, can detect objects or faces within the images, and can perform security operations based on the objects or faces detected within the images. The detection of objects or faces ("objects" hereinafter) within a captured image can be performed using an object recognition or facial recognition algorithm, such as edge matching algorithms, divide-and-conquer algorithms, gradient matching algorithms, interpretation tree algorithms, pose consistency/pose clustering algorithms, geometric hashing algorithms, scale-invariant feature transforms, speeded up robust feature algorithms, genetic algorithms, 3D reconstruction algorithms, template matching algorithms, convolutional neural networks, and the like. Many of these object detection algorithms classify a detected object by identifying a portion of the image in which the object is located (and may include a bounding box around the identified portion of the image), by identifying the object, and by providing a confidence score representative of how confident the object detection algorithm is that the object is correctly classified. It should be noted in additional to images, the functions described herein can apply to 3D scans/models, audio signals, or any suitable data structure. It should also be noted that in addition to detecting objects and performing a security operation in response, the robot can perform a security action in response to detect the performance of an action by an individual, based on a lack of a detected object or individual in a particular location, and the like.

A robot 100, in response to classifying an object within a captured image, can perform a security operation without human intervention based on the confidence score associated with the classification of the object. For instance, if the robot classifies an object with a confidence score that is greater than a first threshold, the robot can perform a security operation without waiting for or requiring a human operator to provide an instruction to perform the security operation. In some embodiments, the security operation that the robot performs is based on the identified object itself. For instance, if the object is a chair, a desk, or another object that does not pose a security threat, the robot can continue to patrol the route that the robot was patrolling before detecting the object within the image. Alternatively, if the robot detects an unauthorized individual, a broken window, a fire, or another object that represents a security threat, the robot can alert a human operator, call the police or security personnel, notify building personnel, trigger a fire alarm, or perform another security operation to address the detected object. In some embodiments, the robot can perform the security operation before or in conjunction with/simultaneously to providing information about the detected object to the operator or the central system 210. By performing the security operation in instances where the object is detected with high confidence without human intervention, the robot beneficially reduces the operative burden of the human operator.

Likewise, if the robot 100 classifies an object with a confidence score that is less than the first threshold, the robot can provide the captured image for display to the human operator, for instance via a security interface. In some embodiments, if the object is classified with a confidence score that is greater than a second confidence interval, the robot can present the captured image to the human operator with one or more "best guesses" of the classification of the object. For example, if the confidence score for an object being a table is 72%, and the confidence score for the object being a chair is 66%, the robot can present the captured image to a human operator with both candidate classifications ("table" and "chair"), along with the corresponding confidence scores. The human operator can then select between the candidate classifications, and the robot can then perform a security operation based on the selected classification (either in response to an instruction to perform the security operation from the human operator, or based on the classification without further input from the human operator). By presenting candidate classifications to the human operator and allowing the human operator to select a candidate classification, the robot beneficially reduces the operative burden of the human operator of having to identify the object within the image or manually enter the identity of the object.

In the event that the robot 100 is unable to classify an object in a captured image (e.g., the confidence score associated with the classification of the object is below the second threshold), the robot can provide the captured image for display to the human operator within a security interface without providing classification information. In such instances, the human operator can manually classify the image, and the robot can perform a security operation based on the classification (either in response to an instruction to perform the security operation from the human operator, or based on the classification without further input from the human operator).

Further, in some embodiments, when the robot 100 is unable to classify an object in a captured image (e.g., the classification of the object is associated with a below-threshold confidence score), before providing the captured image to a human operator, the robot can gather more information about the object and can attempt to re-classify the object. For instance, the robot can capture additional images of the object, can move closer to the object or can move to another location relative to the object before capturing additional images, can capture higher resolution images or video of the object, can take a 3D scan of the object, can take an IR or RFID scan of the object, can take a thermal scan of the object, can query external sources of information (such as external databases via a corresponding API), and the like. The robot can then re-classify the object based on the additional capture images or other information, and if the robot is able to classify the object with an above-threshold confidence score, the robot can perform a security operation before providing the images to a human operator and/or without receiving an instruction from the human operator to perform the security operation.

In some embodiments, when the robot 100 is unable to identify a person in a captured image, before providing the captured image to a human operator, the robot can request the person to present identification or security credentials.

The robot can determine an identity of the person from the presented identification or credentials, and can compare an image of the person on the identification to the face of the person. If the image of the person on the identification or credentials matches the person's face, the robot can determine that the identification or credentials belong the person, and can 1) perform a security operation if needed based on an identity of the person without human operator interview, or 2) provide the identity of the person to a human operator for review. During the identity authentication/determination process, the robot can communicate a status of the authentication/determination to the person being identified, for instance by displaying a the status on an external display of the robot.

The robot 100 can classify an object within a captured image, for instance in response to one or more of: 1) detecting the object within the image, 2) detecting a movement of the object, 3) a type or classification of location in which the object is detected (e.g., within a high-security or high-trafficked area), 4) a number of people within the area (e.g., more or less than a threshold number of people, 5) detecting a sound associated with the object, or 6) any other suitable criteria. Likewise, the robot can classify an object within a captured image in response to determining that the object was not present within the vicinity of the robot when the robot was previously within the area (e.g., the object moved to the area since the robot was last there). In some embodiments, the robot can access a map (such as a semantic map) of the area in which the robot is located, can query the map to determine if the map indicates that the detected object is in the area), and classify the detected object in response to determining that the map does not indicate that the detected object is in the area.

The security operation performed by the robot 100 can be any suitable security operation, such as the security operations described herein. For instance, the robot can request credentials or identification from a detected person, can update a map to indicate a location of the detected object, can approach the detected object and/or capture additional images of the object, can notify suitable personnel of the detected object (such as security personnel, law enforcement, a human operator, etc.), and the like.

Figure 26:
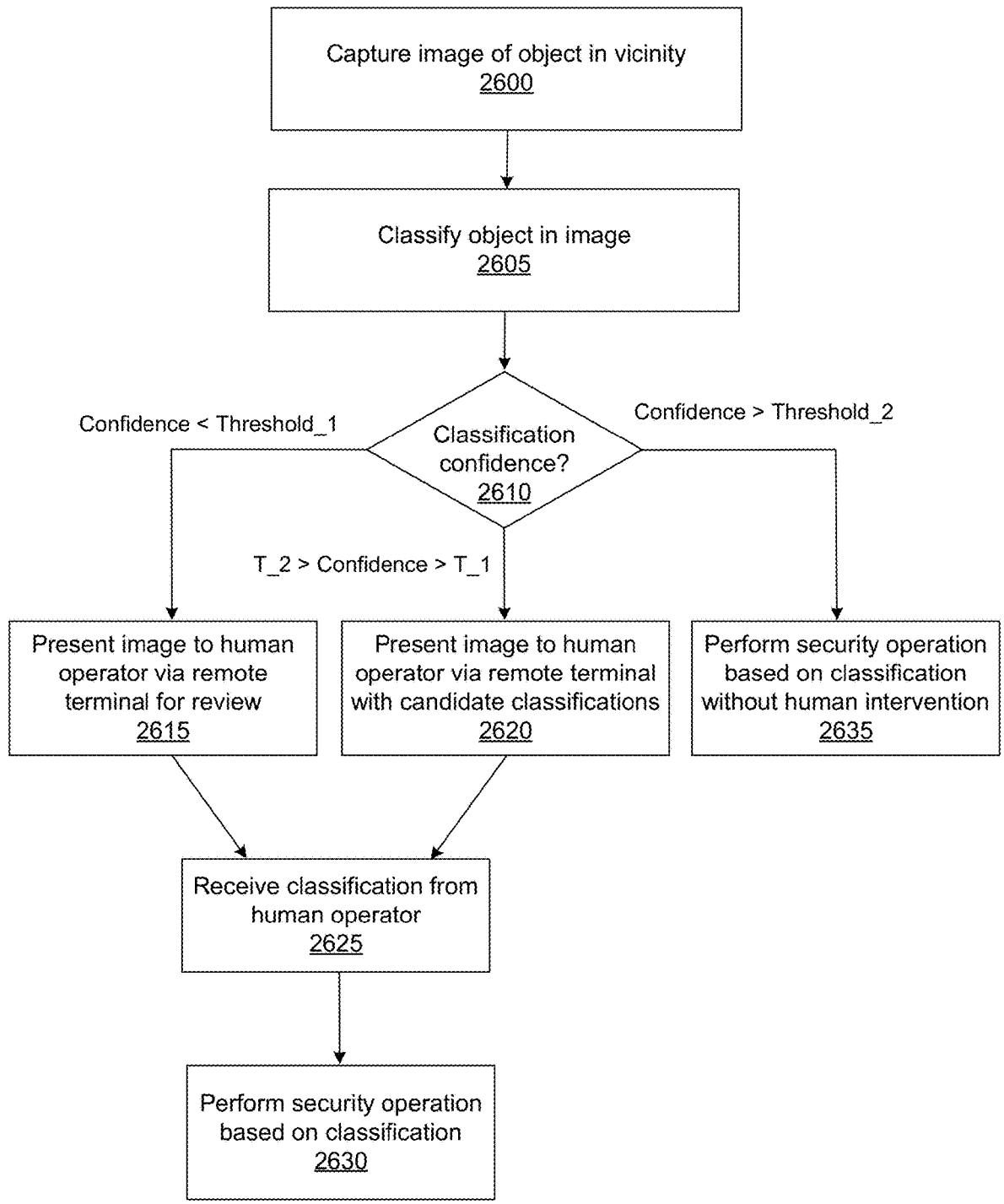
FIG. 26 is a flow chart illustrating a process for performing a security operation based on the classification of an object within an image captured by a robot, according to one embodiment.

FIG. 26 is a flow chart illustrating a process for performing a security operation based on the classification of an object within an image captured by a robot, according to one embodiment. A robot captures 2600 an image of an object within a vicinity of the robot. An object within the captured image is classified 2605 by the robot, for instance by performing a classification operation that produces a candidate classification for the object and a confidence score representative of the classification.

If the confidence score 2610 of the classification is less than a first threshold, the robot presents 2615 the captured image to a human operator via a remote terminal or security interface for review. Likewise, if the confidence score 2610 is greater than the first threshold but less than a second threshold, the robot presents 2620 the image to the human operator via the remote terminal or security interface for review in conjunction with a set of candidate classifications for the object. In some embodiments, the robot additional provides a confidence score associated with each candidate classification. In both instances, a classification for the object is received 2625 from the human operator, and the robot performs 2630 a security operation based on the classification. The performed security operation can be in response to an instruction from the human operator to perform the security operation, or can be selected and performed autonomously by the robot based on the classification and without further input from the human operator.

If the confidence score 2610 of the classification is greater than the second threshold, the robot can select and perform 2635 a security operation based on the classification without human intervention (e.g., without receiving an explicit instruction from a human operator). In such embodiments, the human operator is saved the time required to review the captured image, to manually classify the object within the image, and to select an appropriate security operation for the robot to perform. It should be noted that the thresholds and policies described herein can vary from building to building, from site to site, from customer to customer, and the like.

B. Robot Route Selection

As noted above, a route can be selected for a robot 100 can be selected based on a number of criteria, such as the time of day, a history of suspicious activity within a location, and proximity of the route to a recharge or docking station. It should be noted that a route can be selected by the robot itself, by a central system within a building, by a human operator, by another robot, or by any suitable entity.

In addition to the route selection criteria noted above, routes can be selected based on additional criteria. For instance, a route can be selected based on historic routes taken by the robot 100 or one or more other robots. In such embodiments, a set of historic routes navigated by the robot or another robot can be accessed, and a route can be selected from among the set of historic routes, such as a most frequently navigated route, a least frequently navigated route, a least recently navigated route, a longest or shortest route, a route that includes one or more rooms or locations, a route that is within a proximity to one or more security events, and the like. In some embodiments, a historic route can be selected and then modified, for instance randomly, to access a room or area that has not been visited by a robot within a threshold amount of time, to avoid one or more people, to move within a proximity of one or more people or objects, to move within a proximity of a location associated with a security event, and the like.

A route can also be selected based on information associated with a building, floor, location, or area. For instance, building information can be accessed for a floor on which a robot is located, such as one or more maps of the floor, information classifying portions of the floor based on security level or required security credentials, information describing wireless or wifi coverage within the floor, information describing a number of employees resident within the floor or portions of the floor, historic employee information associated with the floor (such as historic times of presence or expected future presence information for one or more employees), historic foot traffic within the floor, entrance/exit and window locations within the floor, information describing the historic or expected presence of objects and corresponding locations within the floor, information describing locations of obstacles within the floor, information describing historic security incidents within the floor, information describing static security infrastructure within the floor (such as access control panels, stationary cameras, the presence of communication devices/routers), information describing network activity at various locations, building infrastructure (such as lights, sockets, and the like), or any suitable information describing one or more characteristics of the building. The building information can be accessed from an external source, such as the central system 210, an infrastructure system, a security system 230, another robot, a human operator, and the like, or can be accessed locally (e.g., security information or building blueprints stored by the robot).

After the building information is accessed, a route can be selected based on the accessed building information. In some embodiments, a route can be selected based on a strength of wifi or other wireless signal within the building floor, for instance avoiding dead zones or prioritizing portions of the floor with strong signal coverage. In some embodiments, a route can be selected that minimizes interference with people, for instance by avoiding high foot-trafficked areas or high-populated areas, or by prioritizing low-trafficked areas or low-populated areas. Alternatively, a route can be selected that maximizes exposure of the robot to people in order to better monitor people within the floor. In some embodiments, a route can be selected that avoids obstacles or objects within the floor, or a route can be selected that ensures the robot moves within a threshold distance of one or more objects within the floor. Likewise, a route can be selected that moves the robot to within a threshold distance of one or more historic security incidents, that moves the robot to within a threshold distance of one or more doors or windows, that moves the robot through one or more high-security areas, that maximizes the amount of area a robot comes within a proximity of, and the like.

As noted above, the robot 100 can access security information associated with a floor or building, and can select a route based on the security information. In some embodiments, the security information is included within building information accessed by the robot. Security information can include not just information describing historic security events, but also potential future security risks, security information associated with one or more individuals (such as security credential information or historic security violation information), and information describing a most recent time of monitoring/investigation by one or more robots or security personnel. A route can be selected based on this security information, for instance by selecting a route that traverses an area associated with an above-threshold security risk.

In some embodiments, the robot 100 can select a route (for instance, based on historical routes, building information, security information, and the like) and navigate the route autonomously, without human operator input or intervention. This beneficially allows the robot to patrol routes within an area while minimizing downtime that might otherwise occur if a human operator is busy attending to other robots or security events. In addition, this beneficially prevents the human operator from having to explicitly select every route for every robot in a fleet being monitored by the human operator.

In some embodiments, the robot 100 can select a candidate route or a candidate modification to an existing route (again, based on historical route information, building information, security information, and the like), and can present the selected candidate route or modification to a human operator, for instance via a security interface displayed to the human operator. The human operator can then approve or reject the presented candidate route or modification, and the robot can navigate the route based on the human operator's feedback. While such embodiments involve feedback from a human operator, the presentation of candidate routes or route modifications allows a human operator to simply indicate an approval or rejection of the candidate routes or modifications (as opposed to manually inputting a route or route modification), thereby reducing the operative burden on the human operator.

Figure 27:
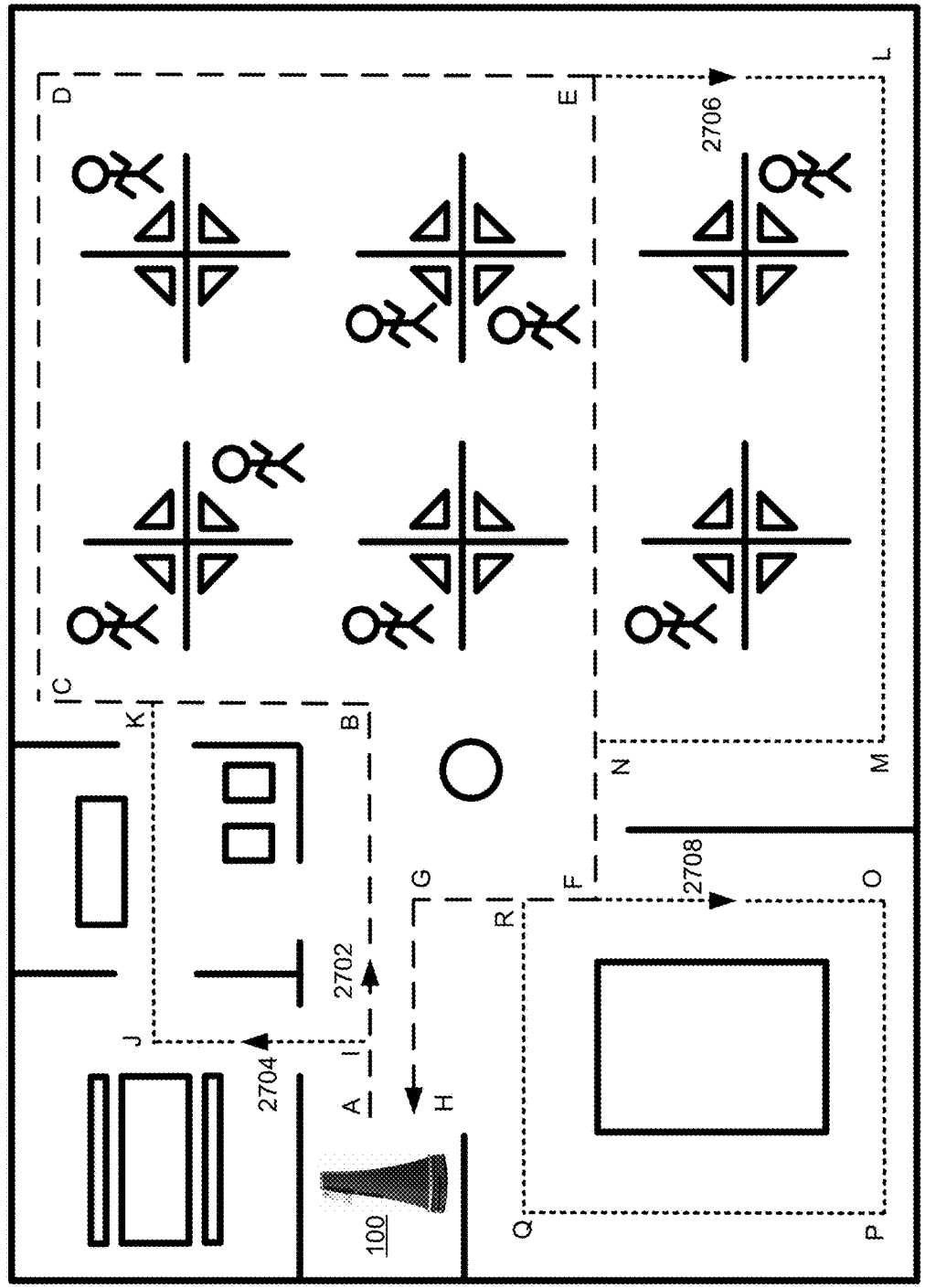
FIG. 27 illustrates candidate routes through a building floor presented within a security interface, according to one embodiment.

FIG. 27 illustrates candidate routes through a building floor presented within a security interface, according to one embodiment. The security interface 2700 of FIG. 27 illustrates a map of a building floor, and within the illustrated map, the location of a robot 100 and a candidate route 2702 for the robot. The candidate route includes line segments AB, BC, CD, DE, EF, FG, and GH. The security interface additional illustrates candidate route modifications within the illustrated map, including modification 2704 (which includes line segments IJ and JK), modification 2706 (which includes line segments EL, LM, and MN), and modification 2708 (which includes line segments FO, OP, PQ, and QR).

The candidate route 2702 and route modifications 2704, 2706, 2708 are selected by the robot 100 (for instance, based on security information accessed by the robot), and are presented within the security interface 2700 to a human operator. The human operator can reject the candidate route 2702, for instance, by selecting a "reject" button displayed within the security interface (not illustrated in FIG. 27), and can instead instruct the robot to navigate a different route. Alternatively, the human operator can approve the candidate route, for instance, by selecting an "approve" button displayed within the security interface (not illustrated in FIG. 27). The human operator can then approve one or more of the route modifications, and can reject the others. The human operator can also manually provide one or more route modifications in addition to the candidate route modifications presented to the human operator (for instance, by drawing the route modifications on the map displayed by the security interface). In response to the feedback from the human operator, the robot will navigate the approved route with any approved modifications.

It should be noted that in addition to selecting a candidate route or route modification based on accessed building information, security information, historic route information, and the like, route modifications can be selected in real-time while navigating a route. For example, if a robot is navigating a route and detects an audio anomaly (such as an unusual sound, an unexpected sound, or a sound indicative of a security risk), the robot can modify its current route, for instance to move the robot in the direction of the sound. The route modification can be selected and navigated autonomously, or can be presented to a human operator in conjunction with an indication of the detected audio. In some embodiments, a route can be selected by the robot based on detected audio. For instance, if the robot is docked to a power station and detects an audio anomaly (such as audio indicating that someone is approaching a nearby area, audio indicating someone attempting to unlock or open a door, audio indicating an approaching elevator, and the like), the robot can autonomously select and navigate a route based on the detected audio (for instance, to intercept a person associated with the detected audio). Selecting and navigating a route based on detected audio beneficially reduces the response time required for the robot to challenge a person or identify a security risk. Routes and route modifications can be selected based on additional factors, such as detected floor vibrations, through-wall sensing, metal detector sensing, detecting motion-activated lights, detecting a strength or change in wifi signal, or based on any other suitable factor.

Figure 28:
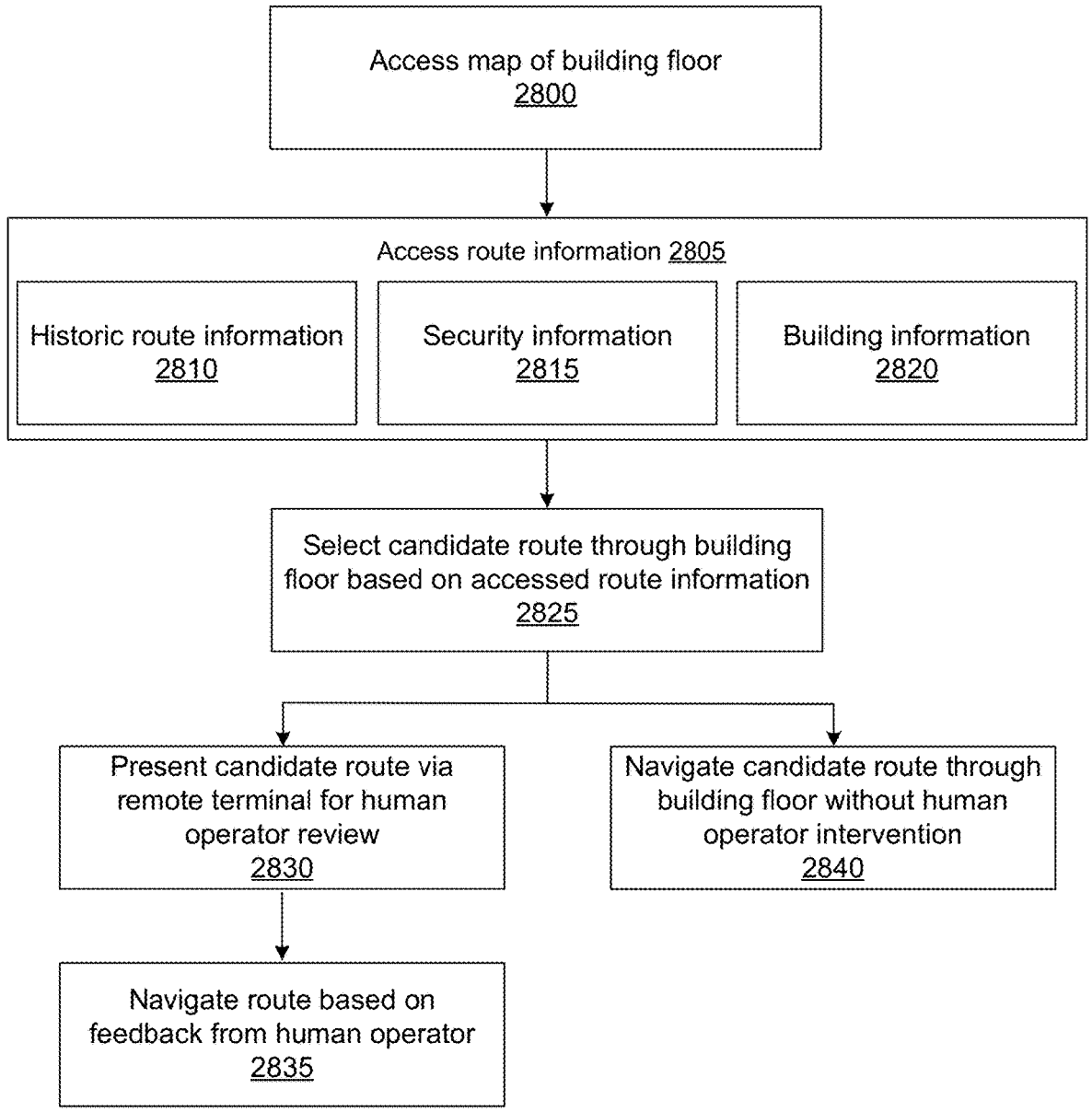
FIG. 28 is a flow chart illustrating a process for selecting and navigating a route for a robot, according to one embodiment.

FIG. 28 is a flow chart illustrating a process for selecting and navigating a route for a robot, according to one embodiment. A map of a building floor is accessed 2800 by a robot, and route information associated with the building floor is accessed 2805 by the robot. Examples of route information include historic route information 2810, security information 2815, and building information 2820. A candidate route or a candidate route modification is selected 2825 by the robot based on the accessed route information. The candidate route or candidate route modification is presented 2830 via a remote terminal for human operator review. For instance, the candidate routes can be overlaid onto a displayed map, such as the accessed map of the building floor. The human operator can provide feedback on the candidate route and/or candidate route modifications, and the robot can navigate 2835 a route based on the feedback from the user. Alternatively, the robot can navigate 2840 the candidate route with one or more candidate route modifications without human operator intervention or input. For instance, the robot can navigate a candidate route without or in conjunction with presenting the candidate route to the human operator.

C. Autonomous Robot Behavior Configuration

As noted above, a robot 100 can select routes based on accessed building information, security information, and historical route information. In some embodiments, the robot can autonomously configure itself while navigating a route based on this information. For instance, the robot can configure itself to operate or behave based on accessed information without human operator intervention or input. By configuring itself without requiring human operator intervention, the robot can reduce the operative burden on the human operator.

For instance, the robot can access wifi coverage information for a building floor, and can configure itself to communicate via a mobile phone network prior to entering a portion of the building floor known to be a wifi dead zone in order to avoid an interruption in connectivity. In such embodiments, if a human operator is actively connected to the robot (for instance, while the human operator is communicating with someone within a proximity of the robot), the robot can wait switching from wifi connectivity to the mobile phone network connectivity in order to avoid an interruption in communication between the human operator and the person within the proximity of the robot.

In some embodiments, the robot 100 can autonomously configure itself before entering areas of a building floor known to be associated with high levels of security, known to have a history of security events, or known to be associated with sensitive objects or information. In such embodiments, the robot can configure itself to operate in a "high alert" mode, for instance by capturing images or videos at a higher rate or resolution than a normal operation mode, by communicating captured information to the central system 210 or a human operator more frequently, by moving more slowly or quietly, and requesting security credentials from people encountered while navigating a route more frequently.

The robot 100 can also autonomously configure its movement behavior based on accessed information. For instance, before entering a portion of a building floor known to be highly foot-trafficked, the robot can reduce its speed in order to reduce the risk of collision with a person. Likewise, the robot can reduce its speed before entering areas within a proximity to a door in order to avoid collisions with the door or individuals when the door opens. Likewise, when the robot enters an area known to have historically low foot-traffic and few obstacles, the robot can increase its speed.

D. Autonomous Security Operations Based on Captured Images

A robot 100 can capture images of its surroundings during the course of normal operation, for instance while the robot is patrolling a route, in response to detecting motion within the robot's proximity, and the like. The robot can then analyze the contents of these images and can perform one or more security operations based on the analysis. These security operations can be performed autonomously by the robot, for instance without input or intervention by a human operator. In doing so, a robot can reduce the operative burden on the human operator, thus freeing up the human operator's attention, saving the human operator time, and enabling the human operator to more effectively monitor and control a fleet of robots.

In some embodiments, the robot 100 can capture a set of images of a location (either within a threshold period of time, or after the passage of one or more intervals of time), and can identify a difference between a first of the images and a subsequently captured second of the images. The robot can determine, based on an analysis of the first image, that no security operation needs to be performed. In response to determining that the contents of the second image are the same or similar to the first image, the robot can opt against performing a security operation, and can (for example) continue patrolling a route. In some embodiments, the robot determines that the difference between the first image and the second image is less than a difference threshold, and continues moving along a route without performing an operation.

The robot 100 can also determine that the second image is different enough from the first image to justify the performance of a security operation. For instance, the robot can determine that an object within the second image has moved relative to the location of the object within the first image. Likewise, the robot can determine that one or more people are present or missing in the second image that aren't present or aren't missing, respectively, in the first image. The robot can also determine that the difference between the first image and the second image exceeds a difference threshold. In such instances, the robot can select and perform a security operation, for instance based on the contents of the first and second image, based on the difference between the images, based on a type of security event or incident detected, based on a location of the robot, based on a current route or configuration of the robot, or based on any other suitable criteria.

In some embodiments, the robot 100 can perform a security operation without human operator intervention or input in response to determining that the difference between a first image and subsequently captured second image is less than a difference threshold. For instance, the robot can capture additional images, can monitor a location associated with the images, can store the images for subsequent transmission to the central system 210, and the like. Likewise, in response to the difference between the first image and the second image exceeding the difference threshold, the robot can provide the images to a human operator for review (e.g., via a security interface displayed by a remote terminal of the human operator). The human operator can then review the displayed images and can provide an instruction to perform a security operation (if warranted based upon the human operator's review). For instance, the human operator can review the images, determine that the difference between the images does not warrant a security operation, and can instruct the robot to continue patrolling a route. Likewise, the human operator can review the images, determine that the difference between the images does warrant a security operation, and can instruct the robot to perform the security operation.

In some embodiments, before sending the captured images the human operator, the robot 100 can capture additional images, for instance images of an object from different angles, images of a group of people such that the face of everyone in the group is shown in at least one image, or images of locations or objects adjacent to the locations or objects of the captured images. In some embodiments, sending the first and second image to a human operator for review can include sending images captured before, after, or between the first image and second image to the human operator for review. For instance, the robot can select images to send based on a resolution of the images, a quality of the images (such as a lack of blur), or content of the images (such as images that include an object or person associated with the detected change between the images). The robot can also select images to send based on a type of change indicated in the images (such as an amount of motion or movement, a change in lighting, and the like).

The robot 100 can identify a difference between images based on a comparison of image data within the images. For instance, image data (such as color data, brightness data, chromatic data, and the like) from the second image can be subtracted from the first image, and the identified difference between images can be the subtraction result. In some embodiments, the identified difference can be based on a difference in location, orientation, and magnitude of edges within the images. In yet other embodiments, the identified difference can be based on discrepancies in resolution between the images, differences in the number and location of image features, or differences in blur between the images.

The robot 100 can identify a difference between images based on content within the images. For instance, the robot can identify a movement of an object included within the first and second images. Likewise, the robot can identify a movement of a person between the images, the inclusion of a new person or the exclusion of an existing person in the second image relative to the first image, a change in a number of people within the images, a change in identity of one or more people within the images, and the like. For example, a robot can capture an image of a group of people, can monitor the group of people, and can provide captured images of the group of people to a human operator in response to the membership of the group changing (e.g., someone leaving or joining the group). In some embodiments, the robot can identify a change in state of an object or entity between the images. For example, the robot can determine that a window that is closed in the first image is open in the second image, or can determine that a person that is sitting in the first image is standing, walking, or running in the second image.

The difference threshold used by the robot 100 to determine whether to perform a security operation can be an image data or content magnitude difference, an image data or content location difference, or an image data or content quantity difference. In some embodiments, the difference threshold can represent a number of additional or fewer people within the second image relative to the first image, a distance that an object can move between the first image and the second image, or a set of states that an object or entity can change to in the second image relative to the first image. In some embodiments, the difference threshold can be selected based on a location of the robot, based on a time or date of robot operation, based on a function performed by the robot, based on a configuration of the robot, based on a security level associated with the robot or the robot's location, or based on any other suitable factor.

In some embodiments, the difference threshold between images required to trigger the performance of a security operation by the robot 100 or to flag the images to a human operator can decrease over time. For instance, the difference threshold for two images captured a first amount of time apart can be greater than the difference threshold for two images captured a second amount of time greater than the first amount of time. In such embodiments, a small movement of a person or object over a short period of time may not trigger flagging the photos to a human operator (for instance, because such small movements over a short periods of time may not be indicative of security risks), whereas the same small movement of the person or object over a longer period of time may trigger flagging the photos to the human operator.

Figure 29:
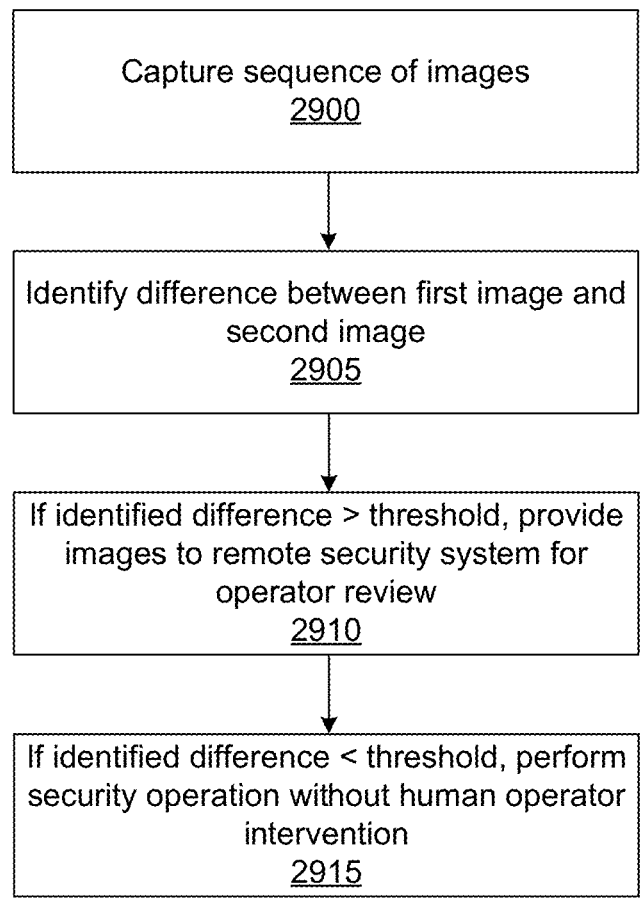
FIG. 29 is a flow chart illustrating a process for performing a security operation based on an identified difference between a set of images, according to one embodiment.

FIG. 29 is a flow chart illustrating a process for performing a security operation based on an identified difference between a set of images, according to one embodiment. In the embodiment of FIG. 29, a robot captures 2900 a sequence of images. A difference between a first image and a second image of the set of images is identified 2905. In response to the identified difference exceeding a difference threshold, the robot provides 2910 the first and second images for human operator review (e.g., via a security interface displayed by a remote terminal). In response to the identified difference being less than the difference threshold, the robot performs 2915 a security operation based on the identified difference without human operator intervention or input.

In some embodiments, the robot 100 can capture an image of a location, object, person, or entity within a proximity of the robot, and can determine whether the captured image is indicative of a security violation. In response to determining that the image is indicative of a security violation, the robot can provide the captured image to a human operator for review. Likewise, in response to determining that the image is not indicative of a security violation, the robot can autonomously perform a security operation without human operator intervention or input. Such embodiments beneficially enable the robot to limit the images provided to a human operator for manual review to instances where the robot identifies a potential security violation, thereby saving the human operator time and attention that otherwise might be required.

The robot 100 can determine that the captured image is indicative of a security violation in response to detecting the presence of an unexpected, unauthorized, or non-credentialed person in an area in which the image was captured. For instance, in a secure room, the robot can capture an image of a person in the secure room without proper credentials. The robot may first perform a security operation to determine whether the person is authorized to be in the location, for instance by requesting credentials from the person or querying an employee or other directory using a picture of the person. In such embodiments, when the person does not provide credentials for inspection by the robot, the robot can determine that the captured image is indicative of a security violation, and can flag the violation and provide the captured image to a human operator.

In some embodiments, determining that a captured image is indicative of a security violation comprises determining that a person captured by the image is performing an unauthorized action. Likewise, in some embodiments, determining that a captured image is indicative of a security violation comprises determining that an object represented by the captured image is misplaced, is in an unauthorized location, is in an unauthorized or broken state, and the like. In other embodiments, determining that a captured image is indicative of a security violation comprises determining that a state of an object or person represented by the captured image is unauthorized. For instance, the robot 100 can determine that a window represented by the captured image is open when it should be closed.

The human operator, in response to reviewing the captured image provided by the robot 100, can determine that the captured image is not representative of a security violation, and can instruct the robot to disregard the captured image and resume patrolling a route or performing an action that the robot was performing before capturing the image. Alternatively, the human operator can determine that the captured image is representative of a security violation, and can take one or more actions in response. For instance, the human operator can instruct the robot to monitor the location or any people associated with the security violation, to lock any nearby doors, to prevent other people from approaching the security violation, to request security credentials from people associated with the security violation, and the like. Likewise, the human operator can alert security personnel, police officers, or building personnel of the security violation, can interface with building infrastructure (such as security cameras) in order to capture additional images associated with the security violation, or can perform any other action in response to the security violation.

In some embodiments, the robot 100 can determine that the captured image is indicative of a security violation, and can perform different actions based on the type of security violation indicated by the captured image. For instance, if the captured image is indicative of a first type of security violation, the robot can perform a security operation without human operator intervention or input. Likewise, if the captured image is indicative of a second type of security violation (for instance, a security violation of higher severity or risk than the first type of security violation), the robot can provide the captured image to a human operator for review (for instance, via a security interface of a remote terminal). In some embodiments, the first type of security violation can be a spill, an open window, a broken piece of equipment, a misplaced object, and the like. In some embodiments, the second type of security violation can be an unauthorized person, a person in an unauthorized location, an unrecognized person, a person performing an unauthorized action, an injured person, a detected break-in or attempted break-in, a detected theft, a fire, a crime, and the like. It should be noted that any of the types of security violations described herein can be classified as either the first type of security violation or the second type of security violation.

Figure 30:
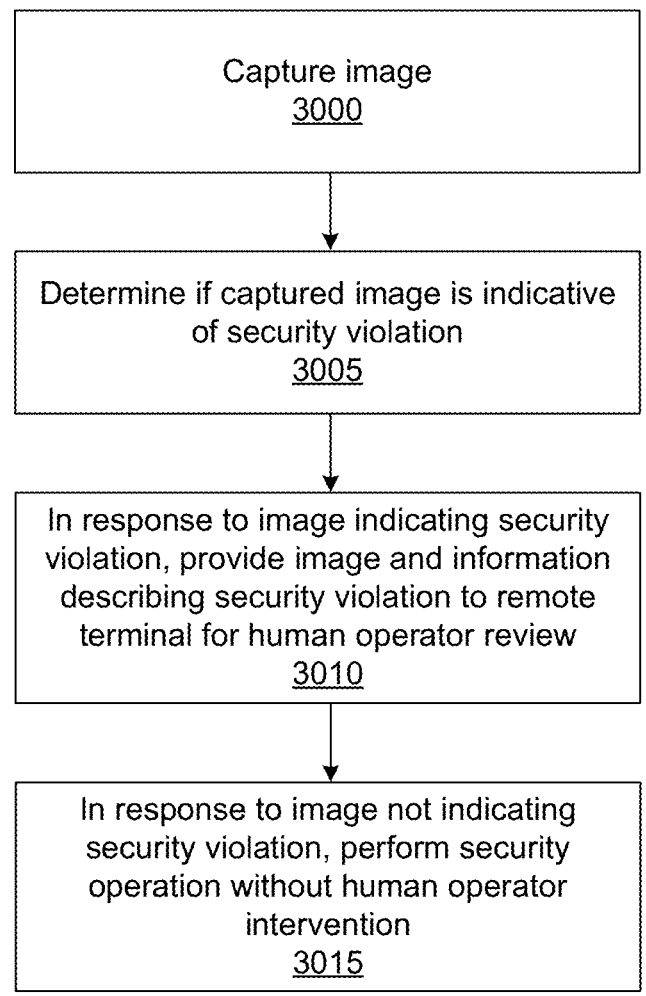
FIG. 30 is a flow chart illustrating a process for performing a security operation based on a detected candidate security violation, according to one embodiment.

FIG. 30 is a flow chart illustrating a process for performing a security operation based on a detected candidate security violation, according to one embodiment. A robot captures 3000 an image and determines 3005 if the captured image is indicative of a security violation. For instance, the robot can determine whether the image includes an unauthorized individual, represents a misplaced object, or shows an improperly open window or door. In response to the captured image indicating a security violation, the robot provides 3010 the captured image and information describing the security violation to a remote terminal for display to a human operator (for instance, via a security interface) for review. In response to the captured image not indicating a security violation, the robot can perform 3015 a security operation autonomously and without intervention or input by a human operator.

E. Security Interfaces for Robot Operators

As noted above, a human operator of one or more robots can monitor, control, and interact with one or more robots via a security interface displayed within a computing device display, security system display, mobile device display, and the like ("remote terminal" hereinafter). As also noted above, the security interface is a GUI that can display information related to or received from a robot, a location of a robot, a building or other area, and the like. For instance, the security interface can display a map of the area a building floor, a location of each robot within the building floor, a route that each robot is taking or has taken through the building floor, information about and locations of one or more objects or people within the building floor, or any other suitable information.

A human operator can interact with information displayed by a security interface, such as information provided by robots. For instance, a robot can provide information about people detected within an area for display within the security interface, and a human operator can affirmatively identify the people based on the information provided by the robot. Likewise, a robot can provide information about a status, configuration, or characteristic of the robot for display within the security interface, and a human operator can monitor and provide instructions to the robot based on the displayed information. In addition, the robot can provide information about the location of the robot and/or a route being taken by the robot for display within the security interface, and a human operator can provide instructions to the robot via the security interface.

Accordingly, in embodiments in which information received from a robot is displayed within a security interface, the display of such information can be optimized to reduce the amount of effort or time required from a human operator to review and interact with such information. In doing so, the operative burden on a human operator is beneficially reduced, enabling the human operator to focus on other security interfaces, other robots, or other security-related tasks.

Figure 31:
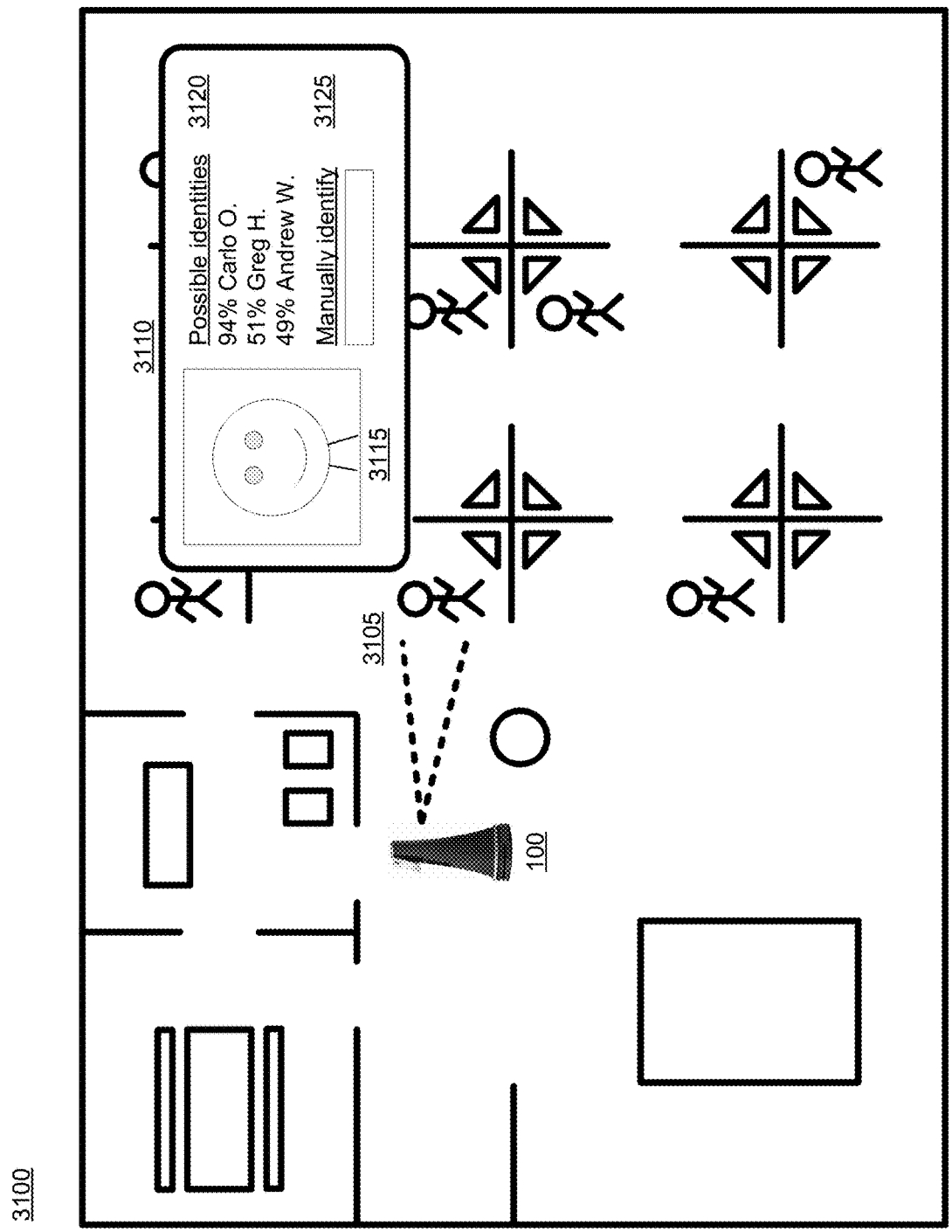
FIG. 31 illustrates a security interface for identifying a person detected by a robot, according to one embodiment.

FIG. 31 illustrates a security interface for identifying a person detected by a robot, according to one embodiment. In the embodiment of FIG. 31, a security interface 3100 is displayed to a human operator. The security interface displays a map of a building floor, including the location of a robot 100 and the location of a person 3105 detected by the robot. The robot can detect the person, for instance by capturing an image of the person while patrolling the building floor and identifying the presence of a face in the captured image.

The security interface 3100 of FIG. 31 also includes interface element 3110 that displays the image 3115 of the person 3105 captured by the robot 100. In embodiment of FIG. 31, the interface element is displayed as a pop-up window overlaid onto the map near a representation of the person displayed within the security interface. In other embodiments, the interface element can be displayed as a window adjacent to the security interface, as an entry within a feed interface, as a separate interface or page, or as any suitable interface element. In some embodiments, the interface element is displayed in response to the display of the security interface, in response to a request from a human operator, in response to a selection of an icon representative of the person, in response to the detection of the person by the robot, in response to the providing of the image of the person by the robot, or in response to any other suitable criteria.

In addition to the image 3115 of the person 3105 detected by the robot 100, the interface element 3110 includes candidate identities 3120 of the person. The candidates identities presented within the interface element can be determined based the performance of a facial recognition operation on the captured image, based on a comparison of the captured image to a facial database, based on historical presence of people within the building floor, based on any RFID tags present on the person, based on a location within the floor of the person, based on a voice sample captured from the user, and the like. The candidate identities can be determined by the robot itself, by the central system 210, by a security system 230, or by any other entity described herein. In some embodiments, each candidate identity is determined with a corresponding confidence, for instance represented by a confidence score. For instance, a facial recognition operation performed on the image of the person can output a number of candidate identities, each associated with a corresponding confidence score. Accordingly, the interface element can include the determined candidate identities "Carlo O.", "Greg H.", and "Andrew W.", and can include confidence scores associated with each (94%, 51%, and 49% respectively). Further, the interface element 3110 can include other associated with the person's identity, such as a picture of the person's badge, badge ready information within a building in which the person is located, and the like.

By displaying the candidate identities and corresponding confidence scores in conjunction the image 3115 of the person 3105 captured by the robot 100, the interface element 3110 can allow a human operator to quickly identify the person. For instance, the human operator can select one of the displayed candidate identities (e.g., by clicking on the displayed candidate identity). In the event that the human operator determines that the identity of the person is not one of the displayed candidate identities, the human operator can manually identify the person by entering the person's identity within the field 3125 of the interface element. The security interface, upon receiving the identity of the person, can modify the representation of the person with an indication of the identity of the person, can provide the identity of the person to the robot (which in turn can select and perform a security operation based on the identity of the person), can provide an instruction to the robot to perform a security operation (for instance, in response to determining that the person is not authorized to be in the building floor), or the like.

By displaying candidate identities 3120 and enabling a human operator to identify the person 3105 by viewing the image 3115 and selecting one of the candidate identities, the human operator is able to quickly provide the identity of the person, for instance by simply clicking a displayed candidate identity. Accordingly, by displaying the interface element 3110, the security interface 3100 can beneficially save the human operator time by simplifying the process of identifying the person.

Figure 32:
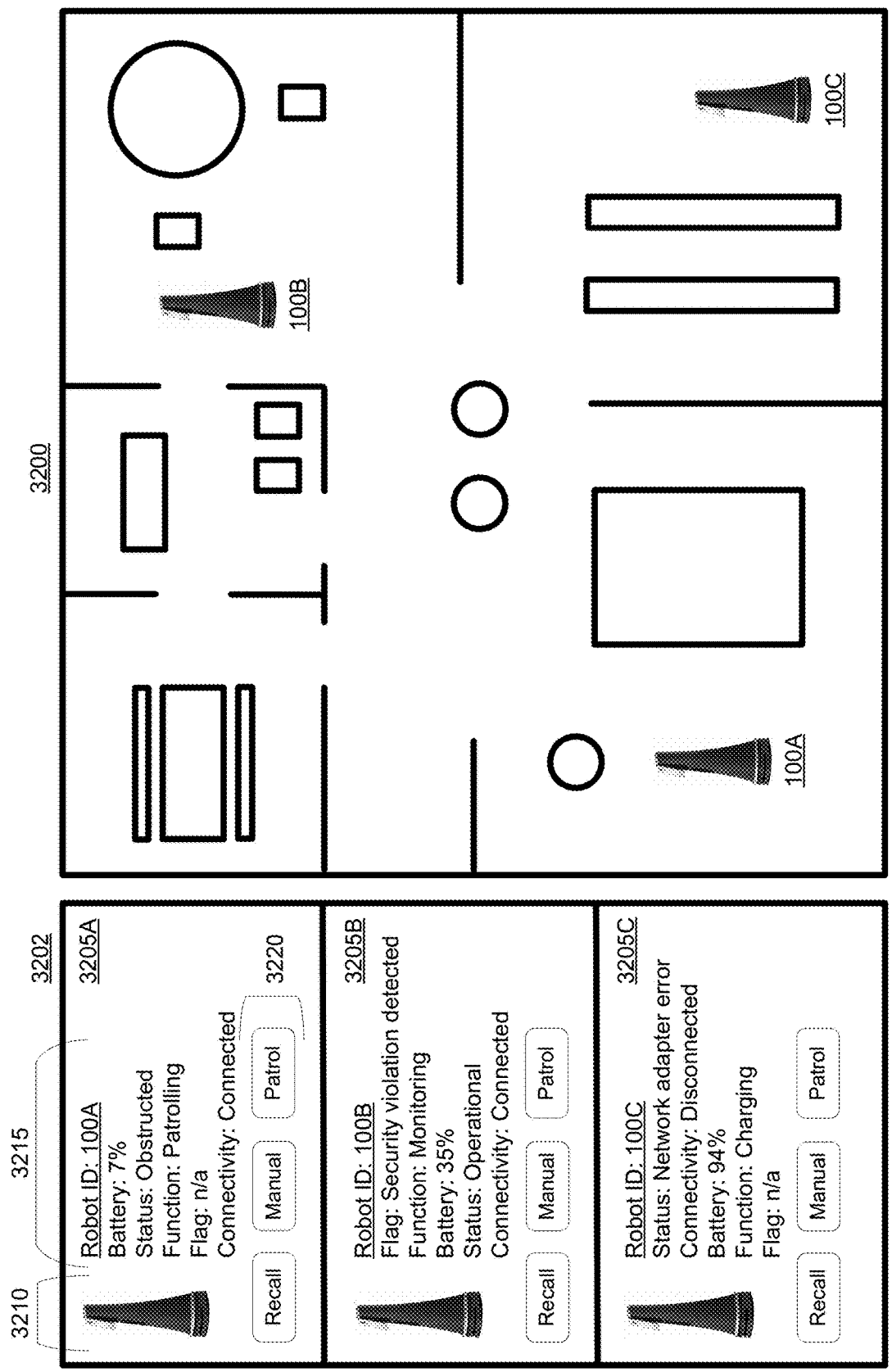
FIG. 32 illustrates a security interface for displaying robot fleet diagnostic information, according to one embodiment.

FIG. 32 illustrates a security interface for displaying robot fleet diagnostic information, according to one embodiment. The security interface 3200 displays a map of a building floor and indicates on the map the location of robots 100A, 100B, and 100C. Displayed next to the security interface is a diagnostic interface element 3202. The diagnostic interface element includes sub-elements 3205A, 3205B, and 3205C that each include diagnostic information associated with robots 100A, 100B, and 100C, respectively.

The diagnostic sub-element 3205A includes an image 3210 of the robot 100A, includes diagnostic information 3215 for the robot, and includes a set of buttons 3220. The diagnostic information 3215 can includes an identity of the robot 100A, a battery level of the robot (7%), a status of the robot ("Obstructed"), a function being performed by the robot ("Patrolling"), any security events flagged by the robot (none), and a connectivity status ("Connected"). The buttons include a "Recall" button, which instructs a robot to return to a predetermined location, such as a charging station; a "Manual" button, which allows a human operator to manually control the robot; and a "Patrol" button, which instructs the robot to patrol a route or area. In other embodiments, the diagnostic sub-element can include other diagnostic information (such as a configuration of the robot, any equipment issues the robot might have, any historical information associated with the robot, and the like), and can include other buttons (such as a "monitor" button to instruct the robot to monitor a person or location or any other suitable button).

The diagnostic information 3215 displayed within a diagnostic sub-element can be ordered based on any suitable criteria, for instance a default order or an order selected by the human operator. Likewise, in the embodiment of FIG. 32, the diagnostic information is ordered based on the diagnostic information itself, with the most urgent diagnostic information displayed on top. For instance, in diagnostic sub-element 3205A, the battery power for the robot 100A is low and the robot is obstructed by furniture (and thus isn't able to return to a docking station), and so the battery power and "Obstructed" status are listed first within the diagnostic information. Likewise, in diagnostic sub-element 3205B, a security event flag is set ("Security violation detection") and the robot 100B is monitoring the detected security violation, and so the security event flag and the "Monitoring" status are displayed first. For diagnostic sub-element 3205C, the robot 100C has lost connectivity with a building network due to a network adapter error, and so the "Network adapter error" status and the "Disconnected" connectivity status are listed first. In some embodiments, each category of diagnostic information is associated with a threshold or flagged status such that, when the category of diagnostic information is received from the robot, if the diagnostic information exceeds or falls below the threshold or if the diagnostic information includes the flagged status, the category of diagnostic information is prioritized over other diagnostic information within the listing of displayed diagnostic information.

By listing the most pressing, urgent, or risky diagnostic information first within each diagnostic sub-element within the diagnostic interface 3202, a human operator is able to quickly identify any issues associated with a robot and take an action in response. For instance, for a robot that is low on power, the human operator can instruct the robot to return to a docking station to recharge, and for detected security violations, the human operator can manually control a robot in order to monitor the security violation. Accordingly, the diagnostic interface can save the human operator time and effort when monitoring multiple robots by prioritizing the display of diagnostic information determined to be most useful or important to the human operator.

Figure 33:
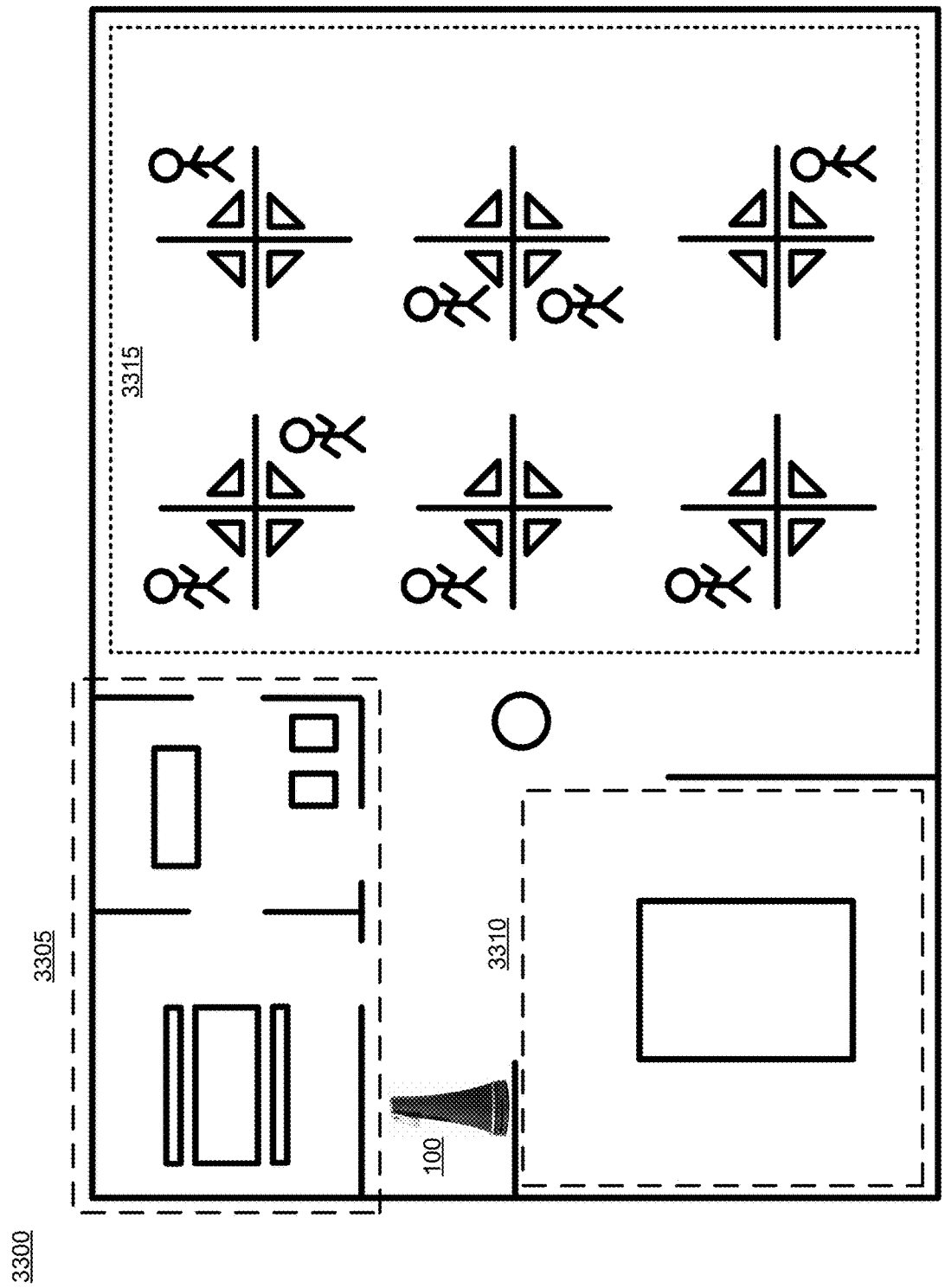
FIG. 33 illustrates a security interface enabling the creation of exclusion and inclusion geofences for robots, according to one embodiment.

FIG. 33 illustrates a security interface enabling the creation of exclusion and inclusion geofences for robots, according to one embodiment. The security interface 3300 of the embodiment of FIG. 33 displays a map of a building floor and indicates on the map the location of a robot 100. The security interface can be displayed on a monitor or other display that enables a human operator to interface with the security interface. For instance, in the embodiment of FIG. 33, the security interface enables a human operator to create one or more exclusion geofences or inclusion geofences, for instance by selecting an area of the map displayed by the security interface corresponding to a geofence boundary and identifying a type of geofence. In some embodiments, a human operator can draw a geofence boundary on a touch-sensitive monitor or display, while in other embodiments, a human operator can define the geofence boundary using a mouse or other input mechanism or device.

As used herein, an "exclusion geofence" refers to a bounded area that a patrolling robot 100 will not enter. Likewise, an "inclusion geofence" refers to a bounded area that a patrolling robot will enter and focus on (e.g., spend more time within than a predefined route might otherwise require) or remain within (e.g., not leave until the passage of a predetermined amount of time, until a security event is detected, until an instruction is received to leave, or the like). After selecting a geofence boundary, the human operator can select "inclusion geofence" or "exclusion geofence", for instance using an interface element displayed within the security interface 3300 (not illustrated in FIG. 33).

In the embodiment of FIG. 33, the geofences 3305 and 3310 are inclusion geofences. These geofences may be drawn by a human operator in response to determining that a robot has not monitored or patrolled within the portions of the building floor represented by the inclusion geofences. The robot 100, in response to receiving these inclusion geofences, will autonomously patrol the portions of the building floor within one or both of the boundaries associated with these geofences. For instance, if the robot was patrolling a route prior to receiving the inclusion geofences, the robot can modify the route such that the robot enters one or both of the boundaries associated with the geofences.

In the embodiment of FIG. 33, the geofence 3315 is an exclusion geofence. This geofence may be drawn by a human operator, for instance in response to detecting the presence of several people within the portion of the building floor corresponding to the geofence in order to avoid disturbing the people to the extent possible. The robot 100, in response to receiving the exclusion geofence, will autonomously avoid entering the portion of the building floor corresponding to the exclusion geofence boundary. For instance, if the robot was patrolling a route that entered the boundary associated with the geofence, the robot can modify the route such that the robot does not enter the boundary of the geofence. For example, if the embodiment of FIG. 33, the robot may patrol a route adjacent to the geofence boundary, may capture images of the people within the boundary in order to determine if any unauthorized personnel are present, and may scan for RFID badges of the people within the boundary, but will not enter the boundary unless a subsequent instruction is received from a human operator to enter the area.

By enabling a human operator to quickly define geofences that robots can autonomously navigate (e.g., autonomously modifying a route to include or exclude an area associated with a geofence), the security interface 3300 can save the human operator time that otherwise might be required to manually alter a robot patrol route to include or exclude a particular location.

F. Spill/Leak Detection

Robots can autonomously identify leaks and spills within an area, for instance without human operator intervention or input. Once a candidate leak or spill is detected by a robot 100, the robot can determine whether the candidate leak or spill is a false positive, and can update a semantic map to flag the location of the false positive leak or spill. When a robot subsequently identifies the candidate leak or spill, the robot can query the semantic map with the location of the candidate leak or spill, and can determine from the semantic map that the candidate leak or spill is a false positive leak or spill without having to take further action and without requiring input from a human operator. Likewise, when the robot identifies a candidate leak or spill and determines that the candidate leak or spill is not a false positive, the robot can perform a security operation in response to the leak or spill without requiring intervention or input from the human operator. By autonomously detecting leaks or spills, disregarding false positive leaks or spills, and performing security operations in response to detected leaks or spills, the operative burden of a human operator of the robot is reduced, freeing up time and resources of the human operator that might otherwise be spent controlling the robot in response to the detected spill or leak. It should be noted that in some embodiments, the robot can detect leaks by explicitly monitoring areas where leaks might be expected, such as areas with pipes, sinks, and appliances.

Figure 34:
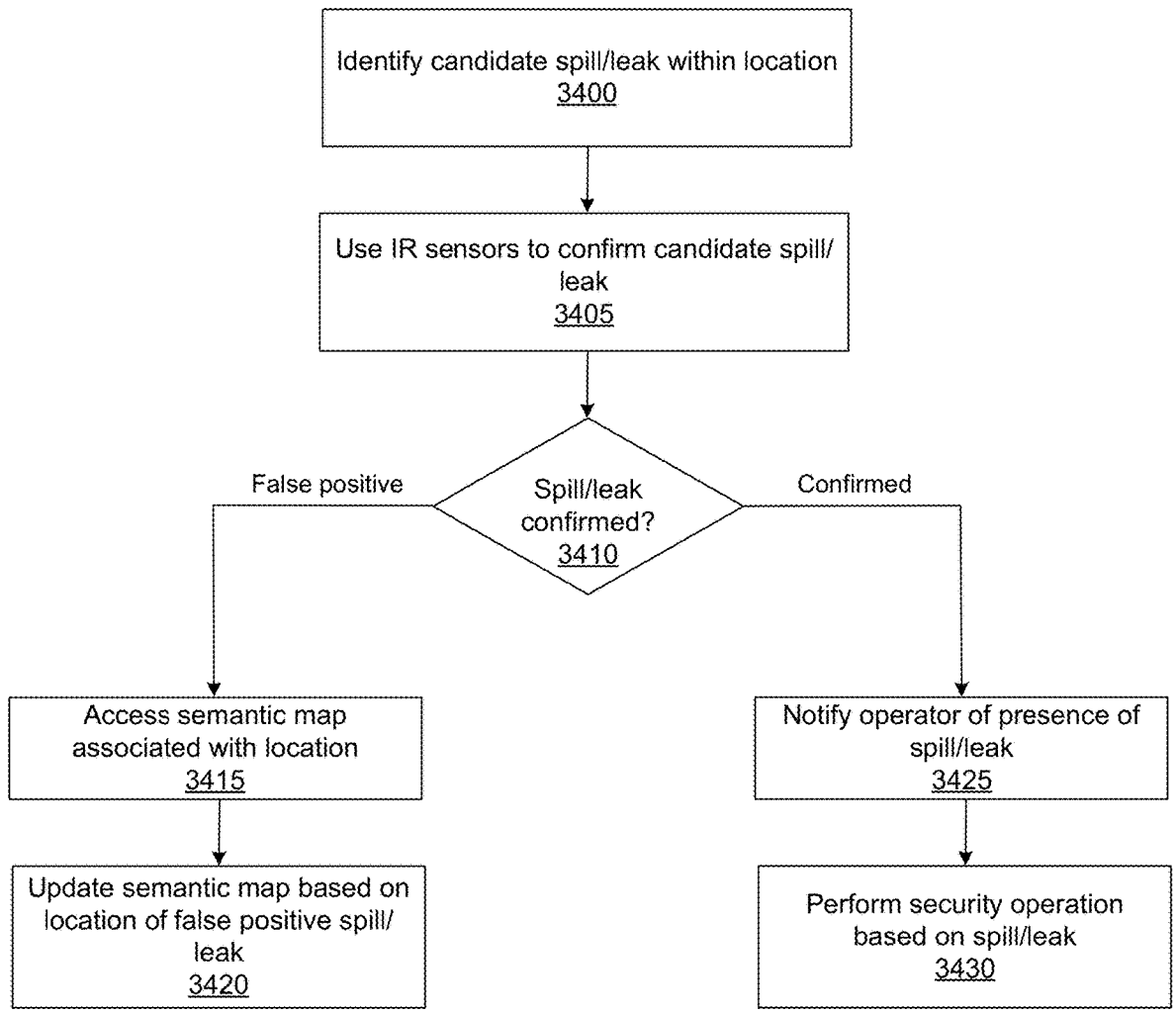
FIG. 34 is a flow chart illustrating a process for identifying spills and leaks by a robot, according to one embodiment.

FIG. 34 is a flow chart illustrating a process for identifying spills and leaks by a robot, according to one embodiment. A candidate spill or leak is identified 3400 by a robot within a location, such as a building floor. The candidate spill or leak can be identified based on a comparison of an image captured by the robot to images of spills and leaks. Likewise, the candidate spill or leak can be identified based on a detected reflectivity of a surface within a captured image (for instance, a reflectivity of spilled water or another fluid). In some embodiments, the robot can detect candidate spills or leaks by detecting the presence of a fluid in an area (e.g., by detecting slippage of a robot wheel, unexpected resistance to robot movement, and the like), by detecting the presence of a gas or fumes within an area (e.g., using a gas sensor), or by identify a temperature anomaly caused by the spill (for instance, because water evaporation causes cooling within the air, a spill might cool a floor temperature, and the like).

The robot can confirm 3405 the presence of a candidate leak or spill using an IR sensor. For instance, the robot can evaluate the thermal properties of the candidate leak or spill using the IR sensor. Generally, the temperature of leaked or spilled fluids is different than the adjacent surfaces on which the fluids are leaked or spilled. Likewise, water and other fluids tend to evaporate at room temperature, and the temperature of the evaporated water or fluid differs from the surrounding air. Finally, the temperature of leaked gases also tends to differ from the air surrounding the leaked gas. Accordingly, the robot can use the IR sensor to evaluate whether a temperature differential exists between the candidate leak or spill, and can flag the candidate leak or spill as a false positive or can confirm the leak or spill in response to the evaluation.

In the event that the robot determines that the candidate leak or spill is a false positive, the robot can access 3415 a semantic map associated with the location of the robot. The robot can then autonomously update 3420 the accessed semantic map to include the location of the false positive leak or spill, without requiring human input or intervention. The robot can then provide the updated semantic map to a central system for distribution to other robots, or for display to a human operator. It should be noted that in some embodiments, a human operator can classify the candidate leak or spill as a false positive, for instance by manually observing the spill through the robot.

In the event that the robot confirms the candidate leak or spill, the robot can optionally notify 3425 a human operator of the presence of the leak or spill, enabling the human operator to take action in response to the leak or spill. The robot can also perform a security operation 3430 in response to the leak or spill, for instance autonomously or in response to receiving an instruction to perform the security operation from the human operator. Examples of security operations include notifying building personnel of the leak or spill, preventing people from entering an area associated with the leak or spill, and interacting with one or more building systems (such as a water or gas value) to prevent further leakage or spillage.

G. Security Event Feed

As noted above, a security interface can be displayed to a human operator via remote terminal or other computing device, and can include information received from more or more robots being monitored by the human operator. The information received from a robot can include an identity of the robot, a location of the robot, a timestamp associated with the information provided by the robot, a status of the robot, images or video captured by the robot, and the like. The information can be received from multiple robots, and can be displayed within a dedicated feed interface, for instance a feed that is updated in real-time as additional information is received from the robots.

The feed interface can display each individual or discrete portion of information received from a robot as a distinct feed entry. In some embodiments, each robot provides an information update to a central system in response to detecting a security event, and the provided information update comprises information representative of the detected security event. The feed interface can then order the received updates chronologically, by location associated with the received updates, by update type (e.g., the type or category of security event associated with each received update), by robot, or by any other suitable factor.

Figure 35:
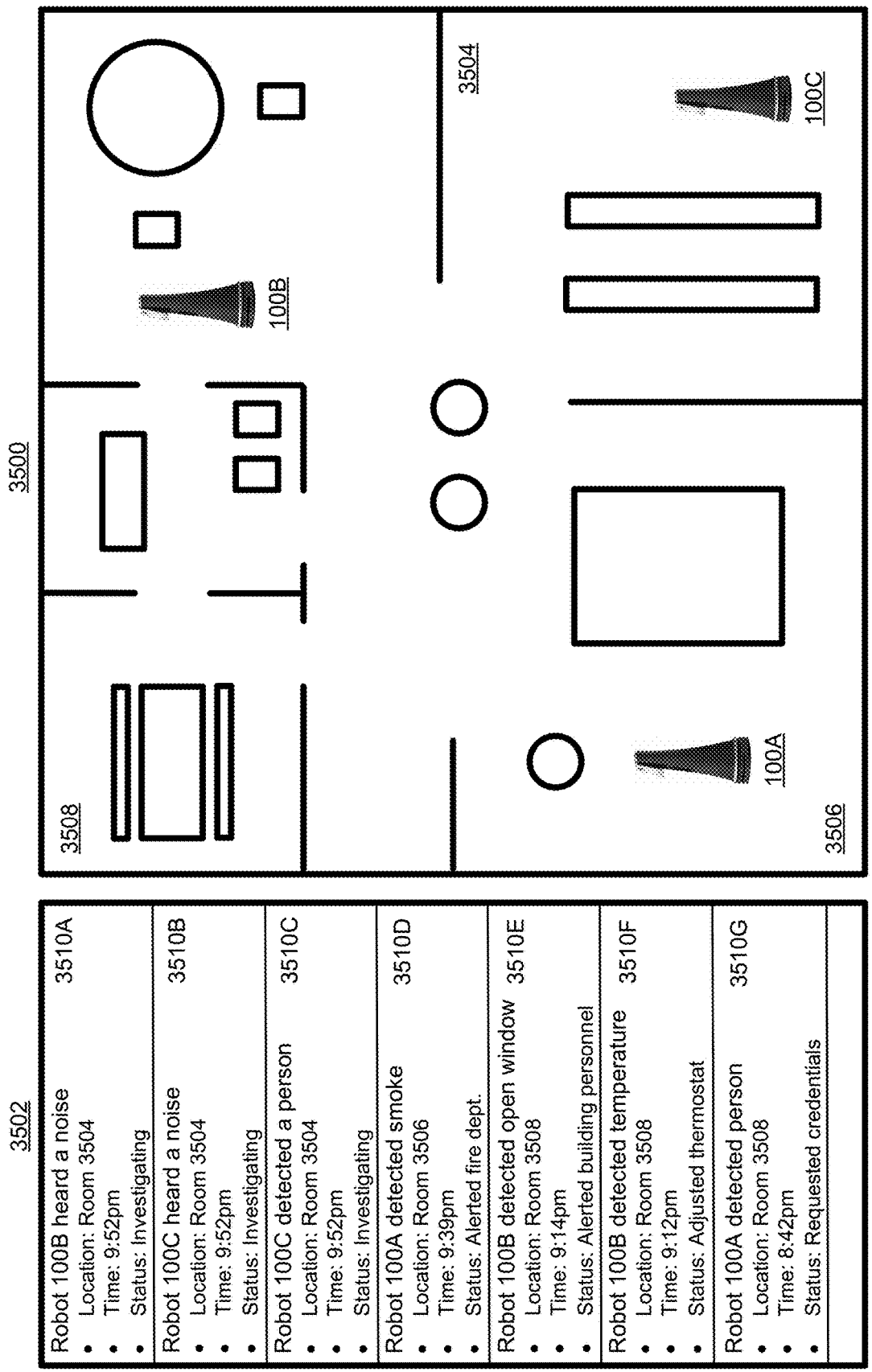
FIG. 35 illustrates a security interface displaying a feed for information received from a robot fleet, according to one embodiment.

FIG. 35 illustrates a security interface displaying a feed for information received from a robot fleet, according to one embodiment. In the embodiment of FIG. 35, a security interface 3500 includes a map with rooms 3504, 3506, and 3508, and indicates a location of robots 100A, 100B, and 100C. Displayed next to the security interface is the feed interface 3502, which includes entries 3510A, 3510B, 3510C, 3510D, 3510E, 3510F, and 3510G. Each feed interface entry includes information received from a robot about a particular security event. For instance, feed entry 3510A includes information received from robot 100B in response to the robot detecting a noise. The feed entry 3510A includes the text "Robot 100B heard a noise" to identify the robot and to identify the security event detected by the robot. The feed entry 3510A also includes the location in which the noise was heard ("Room 3504"), the time the noise was heard ("9:52 pm"), and a status of the robot 100B ("Investigating" the noise).

The feed entry 3510B includes information about the same security event but received from robot 100C, a different robot. The feed entry 3510B includes the text "Robot 100C heard a noise", identifying the robot from which the information was received and the security event that prompted the robot to send the information. The feed entry 3510 also includes a location of the detected noise, a time the noise was heard, and a status of the robot. Likewise, the feed entry 3510C includes information associated with the detection of a person by the robot 100C, including the location in which the person was detected, a time the person was detected, and a status of the robot.

Feed entry 3510D indicates that the robot 100A detected smoke in room 3506 at 9:39 pm, and that the robot 100A alerted the fire department in response. Feed entry 3510E indicates that the robot 100B detected an open window in room 3508 and 9:14 pm and alerted building personnel about the open window (for instance, in response to determining that the window should not be open). Feed entry 3510F indicates that a below-threshold temperature was detected by robot 100B in room 3508 at 9:12 pm, just before the robot 100B detected the open window. Finally, feed entry 3510G indicates that the robot 100A detected a person in room 3508 at 8:42 pm, and that the robot 100A requested security credentials from the detected person.

The feed interface 3502 displays information received from robots chronologically, based on the timestamps included within the information provided by the robots. However, it should be noted that in other embodiments, the information displayed as entries within the feed interface can be ordered in any suitable way. In some embodiments, by selecting a feed entry, a human operator can opt to view more information associated with the robot that provided the information displayed within the feed entry, can provide a security operation instruction to a corresponding robot, or can perform any other suitable action.

As the number of robots being monitored by a human operator increases, the amount of time required for the human operator to monitor every individual feed entry increases. As many feed entries displayed within the feed interface may be associated with the same security event, combining multiple feed entries associated with a common security event for display as a single feed entry can beneficially reduce the human operator's burden by reducing the number of feed entries the human operator is presented with.

Figure 36:
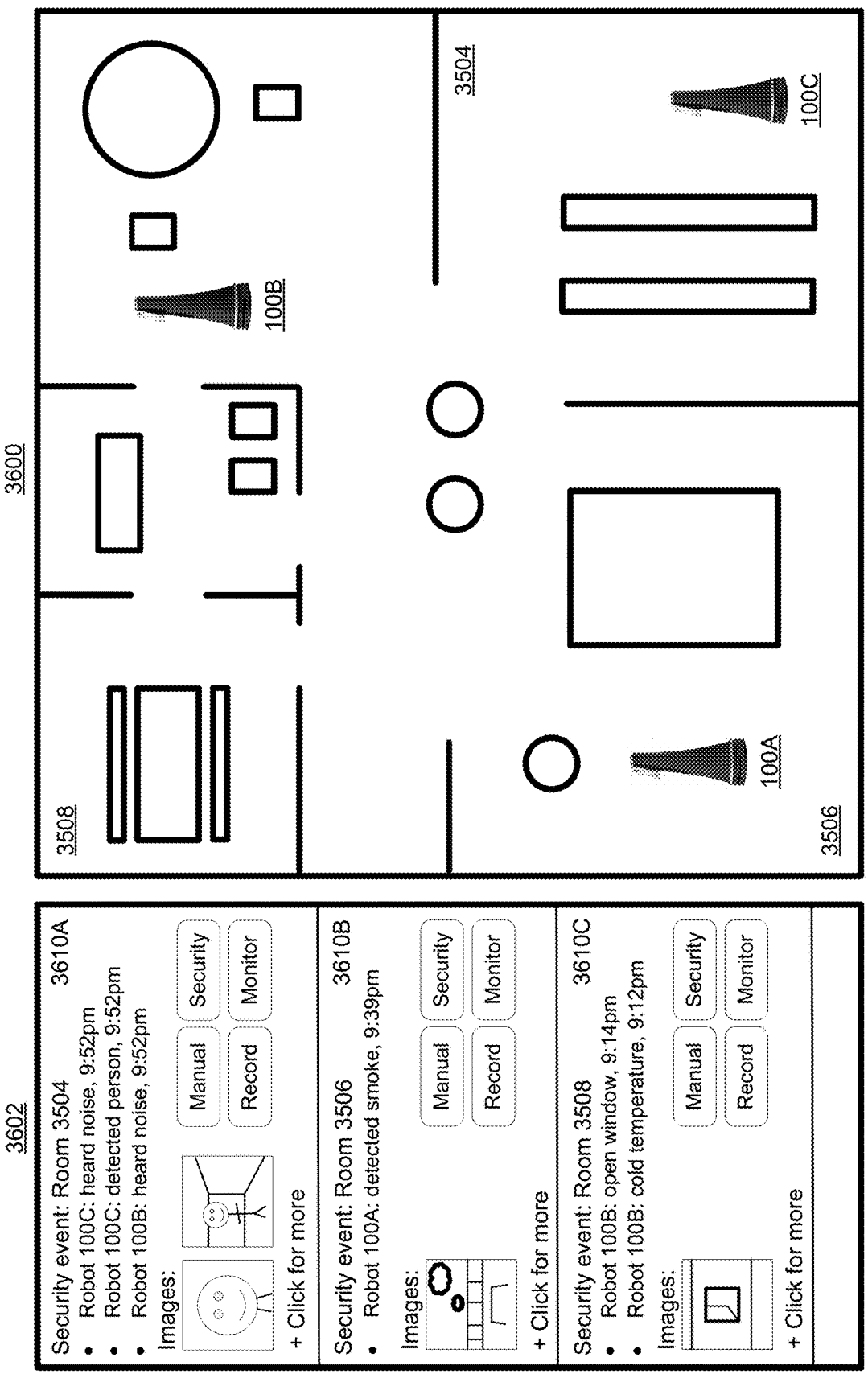
FIG. 36 illustrates a security interface displaying a feed with information received from a robot fleet aggregated by security event, according to one embodiment.

FIG. 36 illustrates a security interface displaying a feed with information received from a robot fleet aggregated by security event, according to one embodiment. In the embodiment of FIG. 36, a security interface 3600 is displayed with the same information displayed within the security interface 3500 of FIG. 35. Likewise, a feed interface 3602 is displayed adjacent to the security interface, and includes a representation of the same information received from the robots 100A, 100B, and 100C that is displayed within the feed interface 3502 of FIG. 35. However, in the feed interface 3602, the feed entries include information aggregated by security event.

For instance, feed entry 3610A of security interface 3602 includes aggregated information associated with the detection of a noise caused by a detected person for display. In feed entry 3610A, information describing a location of the security event (room 3504) is displayed, along with information describing the individual detections of the security event by the corresponding robots ("Robot 100C: heard noise, 9:52 pm", "Robot 100C: detected person, 9:52 pm", and "Robot 100B: heard noise, 9:52 pm"). In addition, the feed entry 3610A displays images received from the corresponding robots. The feed entry 3610A displays a first button, "Manual", that when selected, configures one or more robots associated with the security event (robots 100B and 100C) to be manually controlled by a human operator. A second displayed button, "Security", alerts security personnel (such as building personnel, police personnel, and the like). A third button, "Record" configures robots associated with the security event to record video or audio, or to capture more images of objects, people, or locations associated with the security event. A fourth button, "Monitor", configures robots associated with the security event to monitor objects, people, or locations associated with the security event. Finally, the feed entry 3610A includes a "+click for more" interface element that, when selected, causes more information associated with the security event to be shown (for instance by expanding the feed entry 3610A, within a pop-up window, and the like).

The feed entry 3610B of security interface 3602 includes aggregated information associated with the detection of smoke in room 3506. For instance, the feed entry 3610B includes text indicating that robot 100A detected the smoke at 9:39 pm, includes an image captured by robot 100A or by a nearby security camera, includes buttons that configure robot 100A when selected, and includes a "+click for more" interface element. The feed entry 3610C of security interface 3602 includes aggregated information associated with the detection of an open window and the resulting low temperatures. For instance, the feed entry 3610C includes text indicating that the open window was detected by robot 100B at 9:14 pm, and text indicating that a cold temperature was detected by the robot 100B at 9:12 pm. The feed entry 3610C further includes an image of the open window captured by the robot 100B, the buttons that configure robot 100B when selected, and the "+click for more" interface element described above.

Information received from a set of robots based on a set of security events detected by the robots can be aggregated by detecting a common security event for one or more of the set of security events. In some embodiments, a common security event can be identified based on a location of security events detected by one or more robots. For instance, all security events detected by one or more robots within a common room can be determined to be associated with a common security event. In some embodiments, a common security event can be identified based on a time of security events detected by one or more robots. For instance, all security events detected by one or more robots within a particular time window (e.g., 1 minute, 5 minutes, and the like) can be determined be associated with a common security event. In some embodiments, a common security event can be identified based on a type of security event detected. For instance, if a first robot and a second robot each detect smoke, the security events (the detection of smoke) can be determined to be a common security due to a likelihood of having a common cause. In some embodiments, a common security event can be identified based on an object, person, or entity associated with security events detected by one or more robots. For instance, a first security event detected by a first robot and a second security event detected by a second robot each associated with a common person can be determined to be a common security event. In some embodiments, any combination of the above factors can be used to identify a common security event. For instance, security events detected by multiple robots in a same location and within a particular time window can be determined to be associated with a common security event.

Once a common security event is identified, information associated with the associated set of security events received from one or more robots is identified and prioritized. For instance, each portion of information associated with a security event of the set of security events is identified, and each identified portion of information is ranked, for instance based on a type of security event associated with the identified portion of information, a time of the security event associated with the identified portion, a location of the security event associated with the identified portion, a status of the robot from which the identified portion is received, an identity of the robot from which the identified portion is received, and the like. The top ranked information portions are displayed within the corresponding feed entry, and the remaining information portions can be displayed once the "+click for more" interface element is selected. In some embodiments, information portions associated with the set of security events are ranked or selected such that a diversity of information is presented within the feed entry. For instance, the information can be selected for inclusion in a feed entry such that the number of different robots associated with the common security event and from which corresponding information is displayed is maximized.

In some embodiments, the central system aggregates information by common security event for display within the feed interface 3602, while in other embodiments, the remote terminal or computing device used by a human operator to view the feed interface aggregates the information by common security event. It should be noted that although information is aggregated by common security event in the embodiment of FIG. 36, in other embodiments, information can be aggregated by common robot, by common time, by common location, or based on any other suitable factor.

Figure 37:
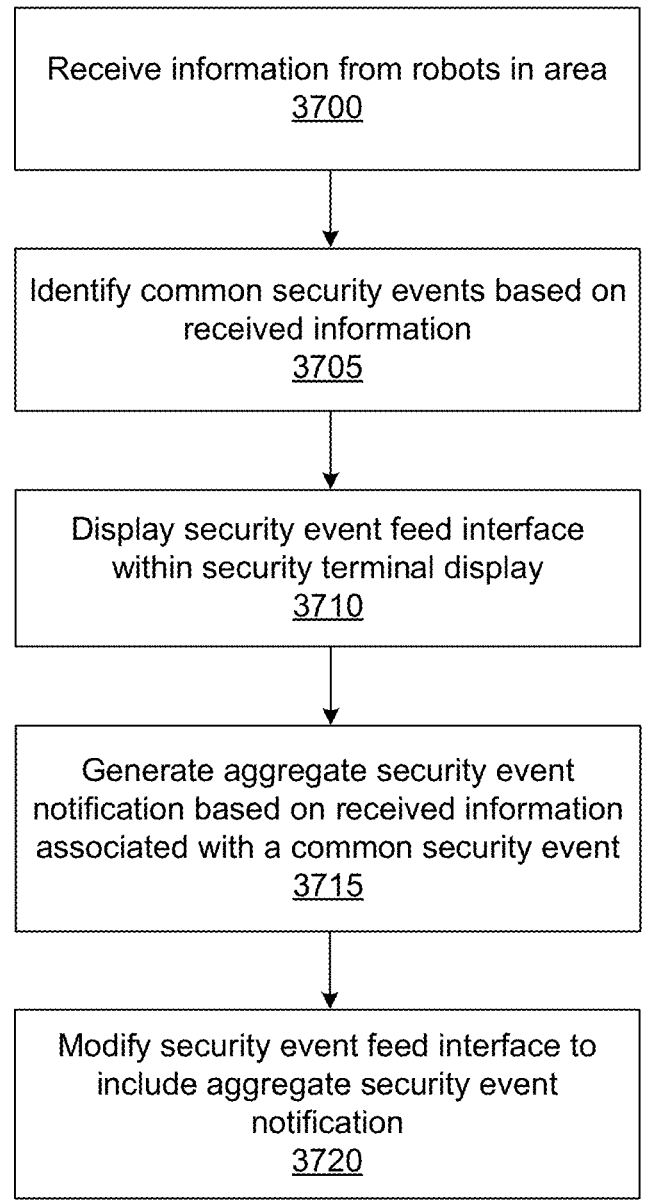
FIG. 37 is a flow chart illustrates a process for aggregating information received from a robot fleet by security event for display within a security interface feed, according to one embodiment.

FIG. 37 is a flow chart illustrates a process for aggregating information received from a robot fleet by security event for display within a security interface feed, according to one embodiment. Information is received 3700 from a one or more robots within an area. Common security events are identified 3705 based on the received information. A security event feed interface is displayed 3710 within a display of a remote terminal or computing device of a human operator. An aggregate security event notification is generated 3715 for a common security event based on received information associated with the common security event. The security event feed interface is then modified 3720 to include the aggregate security event notification 3720.

It should be noted that the feed interface described herein can display additional information, including one or more of: a running average of people detected in a particular location or while patrolling a particular route, playable detected sounds and locations of the sounds, icons representative of a type of detected person (such as an employee, a contractor, a guest, an unidentified person, and the like), icons or shading/illustration of a location being observed by a robot, icons or shading/illustration indicating a person being identified, and the like.

SUMMARY

It should be noted that in various embodiments described herein, data captured by a robot can be stored and used for future machine-learning applications, to trained prediction models, to enable accountability (e.g., providing auditable logs), and the like. Some or all of this captured data can be provided to customers to enable customer-initiated analysis and auditing. This captured data can further be used to enhance various functions described herein, for instance by strengthening a semantic map (by including more detail within the map).

It should also be noted that although much of the functionality described herein is in reference to the performance of one or more security operations and functions, any type of operation or function can be performed and enabled, for instance facility operations, ES&H operations, and the like.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, for instance, within a robot or robot system. Furthermore, it has also proven convenient at times, to refer to these arrangements of operations as modules or engines, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Further, the functionalities described herein can be performed by a hardware processor or controller located within the robot.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A mobile robot, comprising:
   a motorized base configured to move the mobile robot within a building;
   a wireless transceiver configured to access data describing one or more historic routes previously taken by the mobile robot through the building; and
   a controller configured to:
      select a next route through the building based on the historic routes through the building;
      autonomously navigate the mobile robot along the selected next route using the motorized base without human operator intervention, wherein the mobile robot is configured to move at a first speed; and
      as the mobile robot is autonomously navigating the selected next route:
         receive a definition of an inclusion geofence corresponding to a portion of the building, the definition including a boundary of the inclusion geofence, wherein the mobile robot is configured to detect an individual approaching the boundary and in response to determining the individual is unauthorized to be within the inclusion geofence, notify the individual of the boundary, and
         modify the selected next route to move the mobile robot within a proximity of a location associated with a historic security event within the inclusion geofence, wherein the mobile robot operates in a high alert mode within the proximity of the location associated with the historical security event, wherein the mobile robot, when operating in the high alert mode, is configured to move at a second speed slower than the first speed and request security credentials from people encountered.

2. The mobile robot of claim 1, wherein selecting a next route through the building comprises selecting a route different from the one or more historic routes.

3. The mobile robot of claim 1, wherein selecting a next route through the building comprises modifying a historic route.

4. The mobile robot of claim 3, wherein modifying a historic route comprises applying a random change in direction to the historic route.

5. The mobile robot of claim 1, wherein the next route is selected based on a distance associated with the historic routes.

6. The mobile robot of claim 1, wherein the next route is selected based on, for each historic route, a time that the historic route was last taken by the mobile robot.

7. The mobile robot of claim 1, wherein the controller is further configured to: project a laser in a line on a surface of the building to notify the individual of the boundary, the line corresponding to at least a portion of the boundary.

8. The mobile robot of claim 1, wherein the controller is further configured to:
   while determining whether the individual is authorized to be within the inclusion geofence, autonomously navigate the robot to follow the individual as the individual moves through the inclusion geofence.

9. A mobile robot, comprising:
   a motorized base configured to move the mobile robot within a building;
   a wireless transceiver configured to access building data from an external source describing one or more characteristics of the building, the building data including wifi coverage information of the building; and
   a controller configured to:
      select a route through the building based on the accessed building data;
      autonomously navigate the mobile robot along the selected route using the motorized base without human operator intervention;
      as the mobile robot is autonomously navigating the selected route:
         receive a definition of an inclusion geofence corresponding to a portion of the building, the definition including a boundary of the inclusion geofence, wherein the mobile robot is configured to detect an individual approaching the boundary and in response to determining the individual is unauthorized to be within the inclusion geofence, notify the individual of the boundary, and
         modify the selected route to move the mobile robot to a room within the inclusion geofence that has not been visited by the mobile robot within a threshold amount of time;

querying a semantic map associated with the building to determine a historical wifi coverage in the room prior to entering the room; and responsive to the historical wifi coverage in the room being below a threshold, switch from a wifi network to a mobile phone network prior to entering the room.

10. The mobile robot of claim 9, wherein the accessed building data describes portions of the building associated with an above-threshold wifi coverage, and wherein selecting a route comprises selecting a route through one or more of the portions of the building associated with strong wifi coverage.

11. The mobile robot of claim 9, wherein the accessed building data describes portions of the building associated with wifi deadzones, and wherein selecting a route comprises selecting a route that avoids one or more of the portions of the building associated with wifi dead zones.

12. The mobile robot of claim 9, wherein the accessed building data describes portions of the building associated with above-threshold foot traffic, and wherein selecting a route comprises selecting a route that avoids one or more of the portions of the building associated with heavy foot traffic.

13. The mobile robot of claim 9, wherein the accessed building data describes portions of the building associated with an above-threshold number of employees, and wherein selecting a route comprises either selecting a route through one or more of the portions of the building associated with an above-threshold number of employees or selecting a route that avoids one or more of the portions of the building associated with an above-threshold number of employees.

14. The mobile robot of claim 9, wherein the accessed building data describes obstacles within the building, and wherein selecting a route comprises selecting a route that avoids one or more of the obstacles within the building.

15. The mobile robot of claim 9, wherein the accessed building data describes portions of the building associated with security incidents, and wherein selecting a route comprises selecting a route through one or more of the portions of the building associated with the security incidents.

16. The mobile robot of claim 9, wherein the accessed building data describes portions of the building associated with an above-threshold level of security, and wherein selecting a route comprises selecting a route through one or more of the portions of the building associated with above-threshold levels of security.

17. The mobile robot of claim 9, wherein the accessed building data describes entrances and exits of the building, and wherein selecting a route comprises selecting a route through portions of the building associated one or more entrances or exits.

18. The mobile robot of claim 9, wherein the accessed building data comprises a map of the building identifying one or more objects within the building, and identifying a location of each identified object within the building.

* * * * *